(12) United States Patent
Takahashi

(10) Patent No.: US 11,947,221 B2
(45) Date of Patent: Apr. 2, 2024

(54) PHASE DIFFERENCE COMPENSATION ELEMENT, LIQUID CRYSTAL DISPLAY ELEMENT, AND LIQUID CRYSTAL PROJECTOR

(71) Applicant: FUJIFILM CORPORATION, Tokyo (JP)

(72) Inventor: Hiroki Takahashi, Saitama (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 18/067,017

(22) Filed: Dec. 16, 2022

(65) Prior Publication Data
US 2023/0205012 A1    Jun. 29, 2023

(30) Foreign Application Priority Data
Dec. 28, 2021   (JP) .................. 2021-214956

(51) Int. Cl.
| | | |
|---|---|---|
| G02F 1/13363 | (2006.01) | |
| G02F 1/1337 | (2006.01) | |
| G03B 21/00 | (2006.01) | |

(52) U.S. Cl.
CPC .. *G02F 1/133632* (2013.01); *G02F 1/133634* (2013.01); *G02F 1/133734* (2013.01); *G03B 21/006* (2013.01); *G02F 2413/01* (2013.01); *G02F 2413/12* (2013.01)

(58) Field of Classification Search
CPC ......... G02F 1/133632; G02F 1/133634; G02F 1/133734; G02F 2413/12
See application file for complete search history.

(56) References Cited

U.S. PATENT DOCUMENTS

| | | | |
|---|---|---|---|
| 2009/0009702 A1* | 1/2009 | Chidate | G02F 1/13363 349/120 |
| 2010/0026918 A1 | 2/2010 | Nakagawa et al. | |
| 2010/0231835 A1 | 9/2010 | Nakagawa et al. | |

FOREIGN PATENT DOCUMENTS

| | | |
|---|---|---|
| JP | 2009-075459 A | 4/2009 |
| JP | 4744606 B2 | 8/2011 |

* cited by examiner

*Primary Examiner* — Alexander P Gross
(74) *Attorney, Agent, or Firm* — SOLARIS Intellectual Property Group, PLLC

(57) ABSTRACT

The phase difference compensation element that is used in combination with a liquid crystal cell provided with a liquid crystal layer in which an optical axis of liquid crystal molecules is inclined and that compensates for a phase difference of light generated in the liquid crystal layer, the phase difference compensation element includes a substrate and a phase difference film having at least one oblique vapor deposition layer on at least one substrate surface of the substrate, and the phase difference compensation element is disposed in an aspect in which an intersecting angle between a slow-axis direction of the phase difference film and a fast-axis direction of the liquid crystal layer, which is a direction perpendicular to a direction in which the inclined optical axis of the liquid crystal molecules is projected onto the substrate surface, is −25° to +25°.

9 Claims, 27 Drawing Sheets

PROJECTION VAPOR DEPOSITION DIRECTION

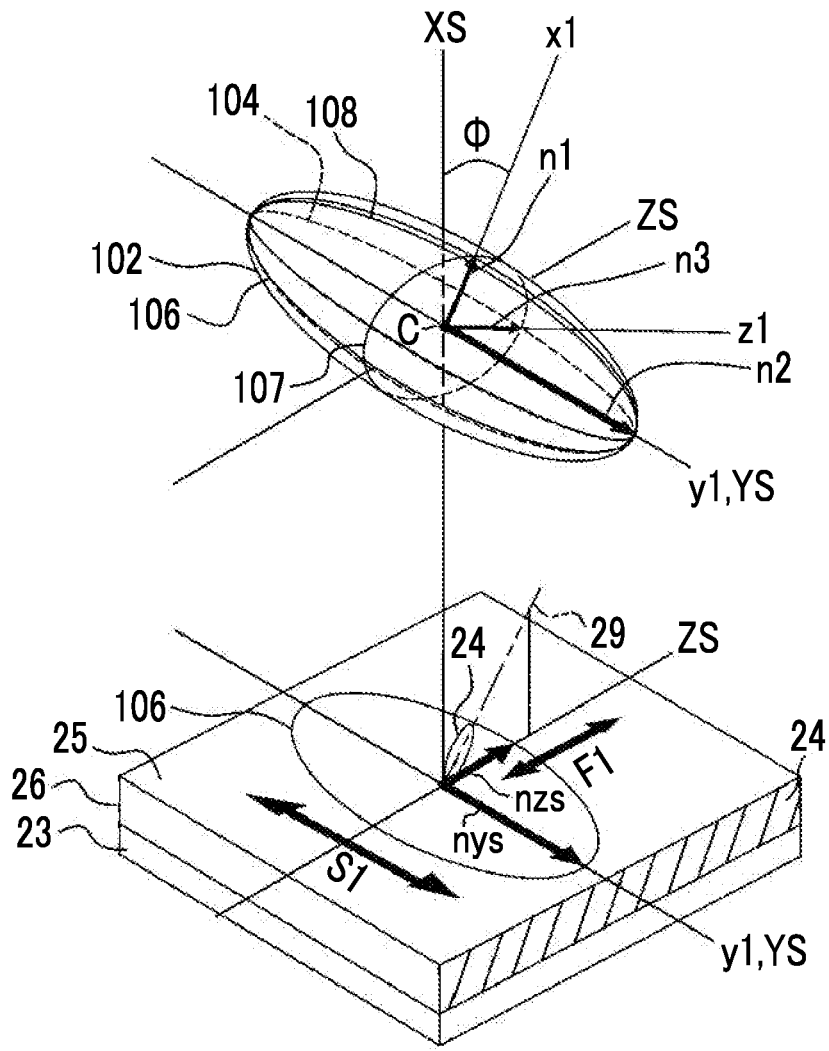
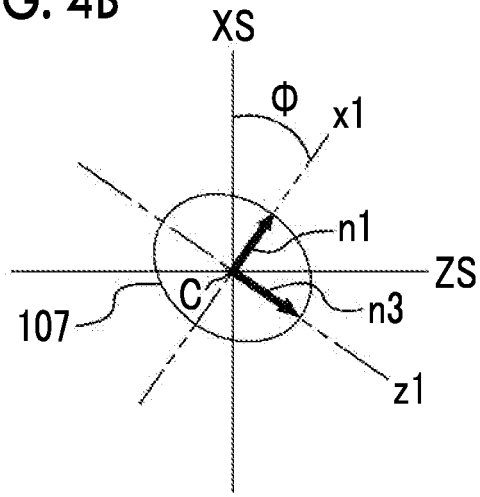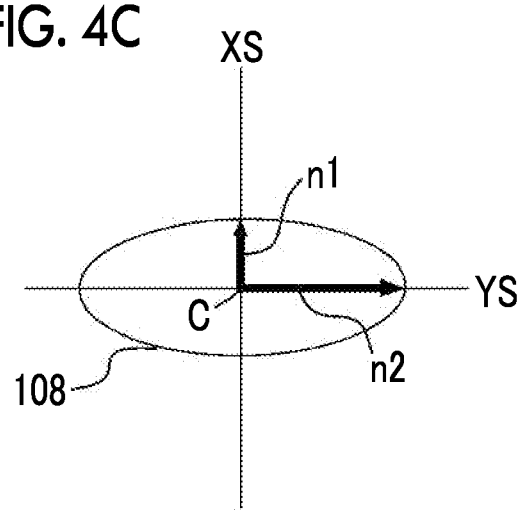

[RELATED ART]

REFRACTIVE INDEX ELLIPSOID OF LIQUID CRYSTAL LAYER

REFRACTIVE INDEX ELLIPSOID OF OBLIQUE VAPOR DEPOSITION LAYER

[RELATED ART]

PHASE DIFFERENCE COMPENSATION ELEMENT, LIQUID CRYSTAL DISPLAY ELEMENT, AND LIQUID CRYSTAL PROJECTOR

CROSS REFERENCE TO RELATED APPLICATIONS

This application claims priority from Japanese Application No. 2021-214956, filed on Dec. 28, 2021, the entire disclosure of which is incorporated herein by reference.

BACKGROUND

Technical Field

The present disclosure relates to a phase difference compensation element, a liquid crystal display element, and a liquid crystal projector.

The Related Art

A phase difference compensation element is used, for example, in a vertical alignment (VA) mode liquid crystal display device (see JP4744606B). In the VA mode liquid crystal display device, a polarizer and an analyzer sandwiching a liquid crystal layer are arranged in a crossed nicol arrangement in which respective transmission axes for transmitting light are perpendicular to each other, and an alignment of the liquid crystal layer in a low voltage state is perpendicular to a substrate surface. Therefore, in the low voltage state, linearly polarized light transmitted through the polarizer is transmitted through the liquid crystal layer while maintaining a direction of the polarization axis, and is incident on the analyzer. Since the polarization axis of the linearly polarized light incident on the analyzer and the transmission axis of the analyzer are perpendicular to each other, theoretically, no light is transmitted through the analyzer and the display is displayed in black. However, since the liquid crystal layer has refractivity anisotropy (also called birefringence) due to the oblique alignment component, the light passing through the liquid crystal layer produces a phase difference between mutually orthogonal linearly polarized light (s wave and p wave). Since the light incident on the analyzer is elliptically polarized in a case where there is a phase difference between the linearly polarized lights, even in the low voltage state, some light is transmitted through the analyzer. This results in a decrease in contrast by reducing the amount of transmitted light in black display. In addition, a phase difference occurs in the light incident obliquely to the liquid crystal layer in accordance with the incidence angle, and the contrast decreases as the incidence angle increases.

The phase difference compensation element compensates for the phase difference occurring in the liquid crystal layer. That is, the phase difference compensation element reduces the amount of light transmitted through the analyzer by generating a phase difference which cancels the phase difference caused by the liquid crystal layer. The phase difference compensation element has a function of improving the contrast by reducing the amount of transmitted light in black display. In addition, it is known that the phase difference compensation element has a function of widening a viewing angle.

In a liquid crystal projector, light incident on a liquid crystal display element inside the projector and modulated is incident on each pixel from a direction inside a cone having a polar angle of approximately 15° from a normal direction of the liquid crystal display. Light projected to the positions of the corresponding pixels on a screen is light obtained by superimposing all rays incident on the cone. Therefore, in a case where even a small amount of light which is obliquely incident on the liquid crystal layer is transmitted through the liquid crystal display element during displaying black, the contrast on the screen is remarkably decreased. Therefore, for the liquid crystal display element installed in the liquid crystal projector, it has been known that, by applying the phase difference compensation element used for widening the viewing angle described above, the contrast of a projected image is improved as a result.

JP4744606B and JP2009-75459A disclose a phase difference compensation element having an oblique vapor deposition layer formed by obliquely vapor-depositing an inorganic material onto a substrate. The oblique vapor deposition layer has a columnar structure body extending in a direction inclined with respect to a normal line of a deposition surface. A refractive index ellipsoid of the oblique vapor deposition layer disclosed in JP4744606B and JP2009-75459A, exhibiting refractivity anisotropy, has a maximum principal refractive index in the extending direction of the columnar structure body.

SUMMARY

An object of one aspect of the present disclosure is to provide a phase difference compensation element which compensates for a phase difference caused by a liquid crystal layer and can increase a contrast more than before, a liquid crystal display element, and a liquid crystal projector.

A phase difference compensation element according to an aspect of the present disclosure is a phase difference compensation element that is used in combination with a liquid crystal cell provided with a liquid crystal layer in which an optical axis of liquid crystal molecules is inclined and that compensates for a phase difference of light generated in the liquid crystal layer, the phase difference compensation element including a substrate and a phase difference film having at least one oblique vapor deposition layer on at least one substrate surface of the substrate, in which the oblique vapor deposition layer exhibits refractivity anisotropy represented by a biaxial refractive index ellipsoid as an optical characteristic by having a columnar structure body inclined with respect to a normal line of the substrate surface, in three principal refractive indices in the refractive index ellipsoid, in a case where a principal refractive index of the columnar structure body in a longitudinal direction is defined as $n1$, and in an ellipse perpendicular to the longitudinal direction of the columnar structure body, in a case where a principal refractive index in a major-axis direction is defined as $n2$ and a principal refractive index in a minor-axis direction is defined as $n3$, $n2$ is a largest among the three principal refractive indices, the major-axis direction is a direction in a plane of the oblique vapor deposition layer, which is perpendicular to an axis obtained by projecting the longitudinal direction of the columnar structure body onto a surface of the oblique vapor deposition layer, in a case where the oblique vapor deposition layer is one layer, a slow axis of the phase difference film is parallel to the major-axis direction, in a case where the oblique vapor deposition layer is a plurality of layers, the slow axis of the phase difference film has a magnitude of $n2$ which is a maximum principal refractive index in each oblique vapor deposition layer, in a case where a vector along the major-axis direction is a directional vector, the slow axis of the phase difference film is parallel to a combined vector obtained by combining the directional vectors of the oblique vapor deposition layers, and the phase difference compensation element is disposed in an aspect in which an intersecting angle between a slow-axis direction of the phase difference film and a fast-axis direction of the liquid crystal layer, which is a direction perpendicular to a direction in which the inclined optical axis of the liquid crystal molecules is projected onto the substrate surface, is −25° to +25°.

In the phase difference compensation element according to the aspect of the present disclosure, it is preferable that a relationship between magnitudes of the three principal refractive indices of the refractive index ellipsoid is $n2 > n3 > n1$.

In the phase difference compensation element according to the aspect of the present disclosure, it is preferable that the phase difference film includes a plurality of the oblique vapor deposition layers, and in a case where an orientation of the slow axis is defined as ηs, a phase difference value Re(15)ηs in the orientation ηs with respect to light having a wavelength of 550 nm, which is incident on the surface of the oblique vapor deposition layer at a polar angle of 15°, is defined as α, a phase difference value Re(15)(ηs+180) in an orientation ηs+180° with respect to the light incident on the surface of the oblique vapor deposition layer at the polar angle of 15° is defined as β, and A=α−β, each of a phase difference value Re(15)(ηs+60) in an orientation ηs+60° with respect to the light incident on the surface of the oblique vapor deposition layer at the polar angle of 15° and a phase difference value Re(15)(ηs−60) in an orientation ηs−60° with respect to the light incident on the surface of the oblique vapor deposition layer at the polar angle of 15° is within a range of (A/2−β)±5 nm.

In the phase difference compensation element according to the aspect of the present disclosure, it is preferable that the phase difference compensation element further includes a C-plate which is a structural birefringence body composed of multilayer thin films in which a thin film consisting of a high refractive index material and a thin film consisting of a low refractive index material are alternately laminated.

A liquid crystal display element according to an aspect of the present disclosure is a liquid crystal display element including a liquid crystal cell provided with a liquid crystal layer in which an optical axis of liquid crystal molecules is inclined and a phase difference compensation element for compensating for a phase difference of light generated in the liquid crystal layer, in which the phase difference compensation element includes a substrate and a phase difference film having at least one oblique vapor deposition layer on at least one substrate surface of the substrate, the oblique vapor deposition layer exhibits refractivity anisotropy represented by a biaxial refractive index ellipsoid as an optical characteristic by having a columnar structure body inclined with respect to a normal line of the substrate surface, in three principal refractive indices in the refractive index ellipsoid, in a case where a principal refractive index of the columnar structure body in a longitudinal direction is defined as n1, and in an ellipse perpendicular to the longitudinal direction of the columnar structure body, in a case where a principal refractive index in a major-axis direction is defined as n2 and a principal refractive index in a minor-axis direction is defined as n3, n2 is a largest among the three principal refractive indices, the major-axis direction is a direction in a plane of the oblique vapor deposition layer, which is perpendicular to an axis obtained by projecting the longitudinal direction of the columnar structure body onto a surface of the oblique vapor deposition layer, in a case where the oblique vapor deposition layer is one layer, a slow axis of the phase difference film is parallel to the major-axis direction, in a case where the oblique vapor deposition layer is a plurality of layers, the slow axis of the phase difference film has a magnitude of n2 which is a maximum principal refractive index in each oblique vapor deposition layer, in a case where a vector along the major-axis direction is a directional vector, the slow axis of the phase difference film is parallel to a combined vector obtained by combining the directional vectors of the oblique vapor deposition layers, and the liquid crystal display element is disposed in an aspect in which an intersecting angle between a slow-axis direction of the phase difference film and a fast-axis direction of the liquid crystal layer, which is a direction perpendicular to a direction in which the inclined optical axis of the liquid crystal molecules is projected onto the substrate surface, is −25° to +25°.

A liquid crystal projector according to an aspect of the present disclosure includes the liquid crystal display element according to the aspect of the present disclosure and a projection optical system for enlarging and projecting an image displayed by the liquid crystal display element.

BRIEF DESCRIPTION OF THE DRAWINGS

FIGS. 4A to 4C are explanatory diagrams of a refractive index ellipsoid representing an optical property of the oblique vapor deposition layer, in which FIG. 4A is a diagram showing an overall image of the refractive index ellipsoid, FIG. 4B is a diagram showing an XS-ZS cross section of the refractive index ellipsoid, and FIG. 4C is a diagram showing an XS-YS cross section of the refractive index ellipsoid.

FIGS. 12A to 12C are explanatory diagrams of a refractive index ellipsoid in the related art, representing an optical property of the oblique vapor deposition layer, in which FIG. 12A is a diagram showing an overall image of the refractive index ellipsoid, FIG. 12B is a diagram showing an XZ cross section of the refractive index ellipsoid, and FIG. 12C is a diagram showing an XY cross section of the refractive index ellipsoid.

DESCRIPTION OF EMBODIMENTS

Figure 1:
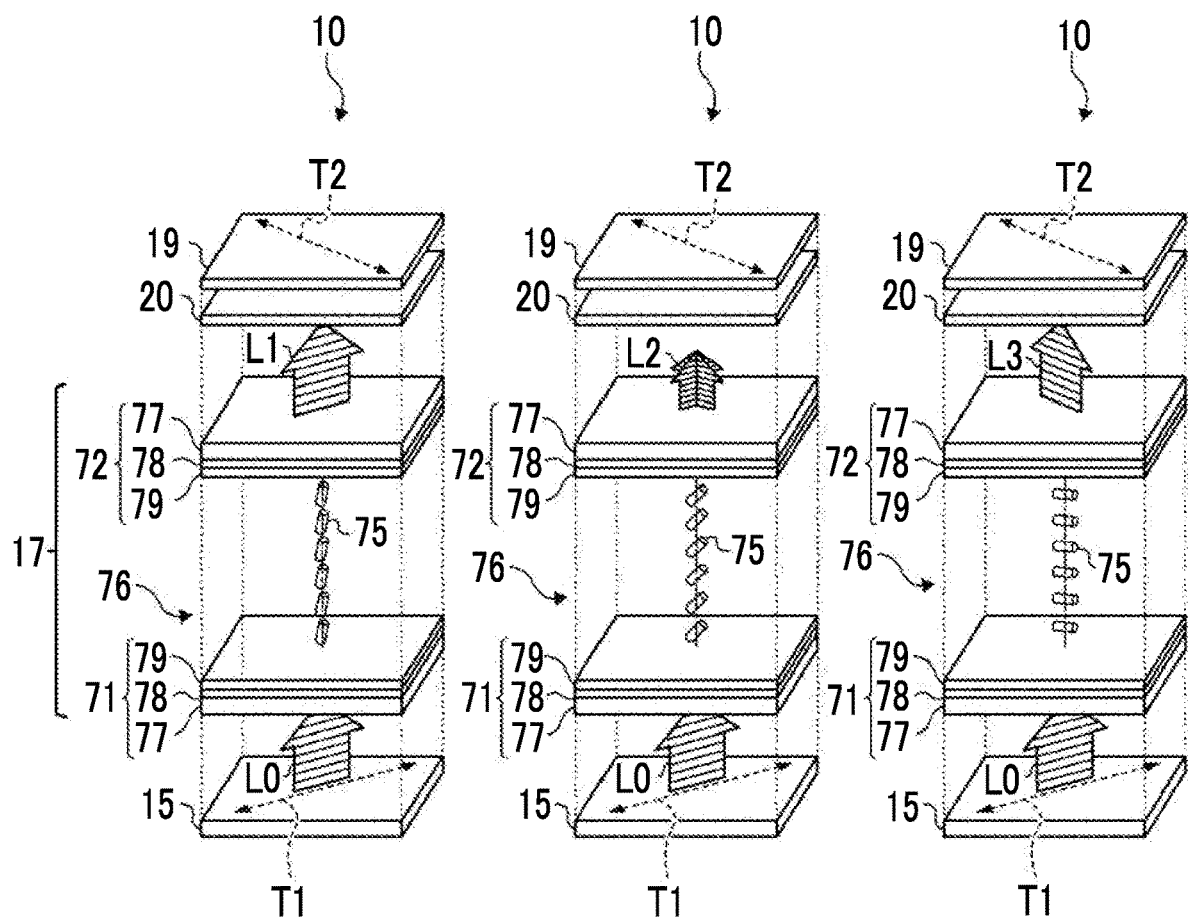
FIGS. 1A to 1C are diagrams showing a schematic configuration of a liquid crystal display element and a function of a phase difference compensation element.

Hereinafter, embodiments of the present disclosure will be described with reference to the drawings. In the present specification, the numerical ranges shown using "to" indicate ranges including the numerical values described before and after "to" as the lower limit value and the upper limit value. Regarding numerical ranges that are described stepwise in the present disclosure, an upper limit value or a lower limit value described in a numerical range may be replaced with an upper limit value or a lower limit value of another stepwise numerical range. In addition, in the numerical ranges described in the present disclosure, an upper limit value and a lower limit value disclosed in a certain range of numerical values may be replaced with values shown in Examples.

Liquid Crystal Display Element

First, a liquid crystal display element 10 including a phase difference compensation element 20 according to one embodiment of the present disclosure will be described with reference to FIGS. 1A to 1C. The liquid crystal display element 10 is provided in, for example, a liquid crystal projector 110 (see FIGS. 29 and 30) described later.

The liquid crystal display element 10 is a transmission type VA mode liquid crystal display element. That is, in a liquid crystal layer of the liquid crystal display element 10, liquid crystal molecules which are aligned substantially perpendicular to a surface of the element in a no-voltage state are sealed. In the liquid crystal display element 10, an alignment of the liquid crystal molecules is changed by adjusting a voltage applied to the liquid crystal layer for each pixel. As a result, a polarization state of light transmitted through each pixel is controlled to display an image.

As shown in FIGS. 1A, the liquid crystal display element 10 includes a polarizer 15, a liquid crystal cell 17, and an analyzer 19 in this order from a light source side, and a phase difference compensation element 20 is provided between the liquid crystal cell 17 and the analyzer 19.

The polarizer 15 is a polarizing plate which transmits only a polarization component of incidence light in a direction of a transmission axis T1 indicated by an arrow to the liquid crystal cell 17 side. That is, the light incident on the liquid crystal cell 17 is only an incidence light L0 in which an electric field vibrates in a direction parallel to the transmission axis T1.

The analyzer 19 is a polarizing plate which transmits only a polarization component of light which passes through the liquid crystal cell 17 and is phase-compensated by the phase difference compensation element 20 in a direction of a transmission axis T2 indicated by an arrow. The analyzer 19 is disposed such that the transmission axis T2 is perpendicular to the direction of the transmission axis T1 of the polarizer 15. That is, the analyzer 19 and the polarizer 15 are arranged in so-called crossed nicols. Therefore, the liquid crystal display element 10 is a normally black transmissive liquid crystal panel which displays black in a no-voltage state.

The liquid crystal cell is composed of transparent substrates 71 and 72, and a liquid crystal layer 76 including rod-like liquid crystal molecules 75 enclosed between the transparent substrates 71 and 72.

In addition, the transparent substrates 71 and 72 are composed of, for example, a glass substrate 77, a transparent electrode 78, an alignment film 79, and the like. In the transparent substrate 71, the glass substrate 77, the transparent electrode 78, and the alignment film 79 are arranged in this order from the light source side. On the contrary, in the transparent substrate 72, the alignment film 79, the transparent electrode 78, and the glass substrate 77 are arranged in this order from the light source side.

The transparent electrode 78 is connected to a thin film transistor (TFT) circuit provided on the transparent substrate 71. The TFT circuit controls an alignment state of the liquid crystal molecules 75 by controlling a voltage between the transparent electrode 78 on the transparent substrate 71 and the transparent electrode 78 on the transparent substrate 72, which is a common electrode.

In this example, the alignment films 79 are arranged such that an alignment direction thereof is at an angle of 45 degrees with the direction of the transmission axis T1 of the polarizer 15. The liquid crystal molecules 75 sandwiched between the pair of alignment films 79 are inclined and aligned according to the alignment direction of the alignment films 79.

The liquid crystal molecules 75 are rod-like liquid crystal molecules having negative dielectric anisotropy, and are aligned substantially perpendicular to the surface of the liquid crystal display element 10 in the no-voltage state. In this case, the liquid crystal molecules 75 do not substantially affect a phase of the light transmitted through the liquid crystal layer 76. That is, the light transmitted through the liquid crystal layer 76 in the no-voltage state passes through the liquid crystal layer 76 without changing the polarization direction thereof.

For example, as shown in FIG. 1A, in a case where the liquid crystal layer 76 is in a no-voltage state, an information light L1 having substantially the same polarization direction as the incidence light L0 is incident on the phase difference compensation element 20 from the liquid crystal layer 76. Since the information light L1 is light polarized in a direction perpendicular to the transmission axis T2 of the analyzer 19, the information light L1 cannot pass through the analyzer 19. Therefore, black is displayed by setting the pixels of the liquid crystal display element 10 in a no-voltage state.

On the other hand, in a case where a voltage is applied between the transparent electrode 78 of the transparent substrate 71 and the transparent electrode 78 of the transparent substrate 72, the liquid crystal molecules 75 are inclined in the alignment direction of the alignment film 79. In this case, the liquid crystal molecules 75 change the phase of the light transmitted through the liquid crystal layer 76 according to an inclined angle thereof. That is, in the light transmitted through the liquid crystal layer 76, the polarization direction is changed according to the inclined angle of the liquid crystal molecules 75.

For example, as shown in FIG. 1B, in a case where a voltage is applied to the liquid crystal layer 76, many liquid crystal molecules 75 are inclined in the alignment direction of the alignment film 79. In this case, in the light transmitted through the liquid crystal layer 76, the polarization direction is changed by the liquid crystal molecules 75 inclined and aligned, and as a result, an information light L2 includes both a polarization component in the same direction as the incidence light L0 and a polarization component perpendicular to the incidence light L0. The information light L2 is so-called elliptically polarized light, and includes the polarization component parallel to the transmission axis T2 of the analyzer 19 and the polarization component perpendicular to the transmission axis T2. Among these, only the polarization component parallel to the transmission axis of the analyzer 19 transmits through the analyzer 19. Therefore, by adjusting the pixels of the liquid crystal display element 10 to an appropriate voltage, the amount of light transmitted through the analyzer 19 is controlled, and a halftone color is displayed.

In addition, for example, as shown in FIG. 1C, in a case where a sufficient voltage is applied to the liquid crystal layer 76, many liquid crystal molecules 75 are largely inclined in the alignment direction of the alignment film 79, and are aligned substantially parallel to the surface of the liquid crystal display element 10. In this case, in the light transmitted through the liquid crystal layer 76, the polarization direction is changed by a birefringence of the liquid crystal molecules 75 aligned substantially horizontally, and an information light L3 is polarized in a direction forming an angle of 90 degrees with the incidence light L0. Since the information light L3 is light polarized in a direction parallel to the transmission axis T2 of the analyzer 19, the information light L3 passes through the analyzer 19. Therefore, by applying a sufficient voltage to the pixels of the liquid crystal display element 10, the brightest display is performed.

In order to compensate for the phase difference of the information light transmitted through the liquid crystal layer 76, the phase difference compensation element 20 is provided between the liquid crystal layer 76 and the analyzer 19 as described above. Details of the phase difference compensation element 20 will be described later.

Figure 2:
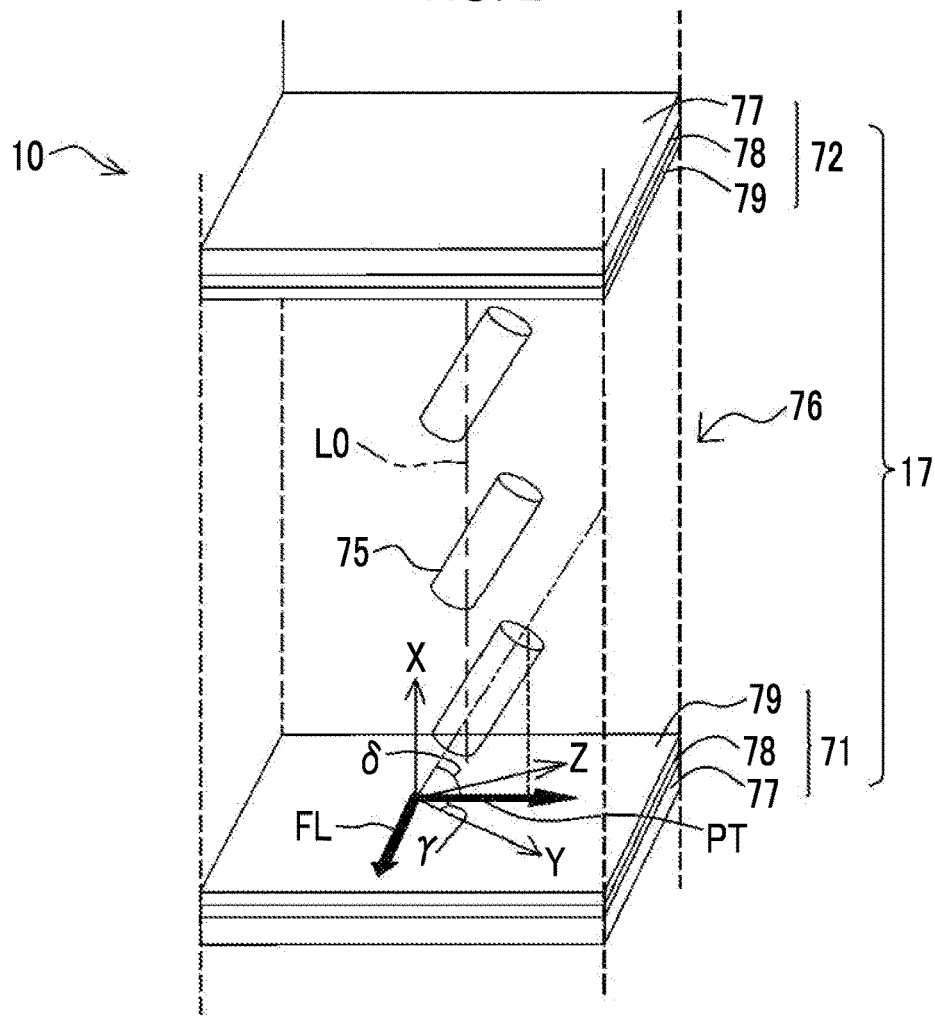
FIG. 2 is an explanatory diagram of a pre-tilt of liquid crystal molecules in the liquid crystal display element.

As described above, in a case where the pixels of the liquid crystal display element 10 are in the no-voltage state, the liquid crystal molecules 75 are aligned substantially perpendicular to the surface of the liquid crystal display element 10. However, in reality, as shown in FIG. 2, the liquid crystal molecules 75 are intentionally inclined in advance by approximately 5° from a vertical direction even in the no-voltage state. The inclined arrangement is performed in order to suppress occurrence of an alignment defect of the liquid crystal molecules 75, which is called a reverse tilt domain. The reverse tilt domain is a disturbance of the alignment state of the liquid crystal molecules 75 generated by an electric field exerted between adjacent pixels.

Here, as shown in FIG. 2, a Y-axis and a Z-axis are defined in a plane parallel to the surface of the liquid crystal display element 10, and an X-axis is defined in a direction perpendicular to the surface of the liquid crystal display element 10, that is, parallel to an optical axis (transmission optical axis) L0 of the light transmitted through the liquid crystal layer 76, with a traveling direction of light being positive. In addition, the Y-axis and the Z-axis are defined to be parallel to the transmission axes of the analyzer 19 and the polarizer 15, respectively. Therefore, as shown in FIG. 2, in this example, an angle γ formed by a tilt direction of the liquid crystal molecules 75 with the Y-axis is 45°.

In this case, an angle formed by the liquid crystal molecules 75 with respect to a Y-Z plane is a tilt angle δ of the liquid crystal molecules 75. The tilt angle δ changes in a range of approximately 0° or more and 85° or less depending on a magnitude of the voltage applied to each pixel. In a case where the tilt angle δ is approximately 0°, a sufficient voltage is applied to the liquid crystal layer 76, and the liquid crystal molecules 75 are aligned in parallel with the Y-Z plane as shown in FIG. 1C. On the other hand, in a case where the tilt angle δ is 85°, this is a no-voltage state as shown in FIG. 1A. The tilt angle δ in this no-voltage state is the pretilt angle, and along the alignment direction of the alignment film 79, the liquid crystal molecules 75 are inclined by approximately 5° with respect to the X-axis, that is, the transmission optical axis L0. The optical axis of the rod-like liquid crystal molecules 75 coincides with the longitudinal direction of the liquid crystal molecules, and the fact that the liquid crystal molecules 75 are inclined is synonymous with the fact that the optical axis of the liquid crystal molecules 75 is inclined.

In addition, in a case where the liquid crystal molecules 75 are pre-tilted as described above, for example, even in a pixel displaying black, a birefringence occurs due to the pre-tilt of the liquid crystal molecules 75, and a part of light passes through the analyzer 19. Therefore, it is not possible to display a completely black state, and a contrast of the projected image is lowered. A direction perpendicular to a pre-tilt orientation PT, which is a direction in which the inclined optical axis of the liquid crystal molecules 75 in the liquid crystal layer 76 is projected onto the substrate surface, is a direction of a fast axis FL of the liquid crystal layer 76. The fast axis FL refers to an axis along an orientation in which a refractive index is relatively low and a phase of light is relatively advanced in a medium which transmits light. Hereinafter, the fast axis FL of the liquid crystal layer 76 due to the pre-tilt component of the liquid crystal molecules 75 is simply referred to as a fast axis FL of the liquid crystal layer 76. A direction perpendicular to the fast axis FL in the substrate surface is a slow axis, and the slow axis refers to an axis along an orientation in which a refractive index is relatively high and a phase of light is relatively delayed in a medium which transmits light, which is opposite to the fast axis.

The phase difference compensation element 20 compensates for a phase difference of the information light transmitted through the liquid crystal layer 76 by generating a phase difference opposite to the phase difference generated in the liquid crystal display element 10. Therefore, the phase difference compensation element 20 is disposed such that a slow axis SP of the phase difference compensation element 20 coincides with the fast axis FL of the liquid crystal layer 76. In a case where the slow axis SP of the phase difference compensation element 20 is disposed to match the fast axis FL of the liquid crystal layer 76, the phase difference caused by the pre-tilt of the liquid crystal molecules 75 and the phase difference caused by the phase difference compensation element 20 have opposite polarities, so that the phase difference caused by the pre-tilt of the liquid crystal molecules 75 can be compensated. Details will be described later, but in the technology of the present disclosure, it is sufficient to be an aspect in which an intersecting angle of the slow axis SP of the phase difference compensation element 20 and the fast axis FL of the liquid crystal layer 76 is −25° to +25°.

Hereinafter, a phase difference compensation element 21 according to an embodiment of the present disclosure, which is applied as the phase difference compensation element 20 of the liquid crystal display element 10 described above, will be described.

Phase Difference Compensation Element According to First Embodiment

Figure 3:
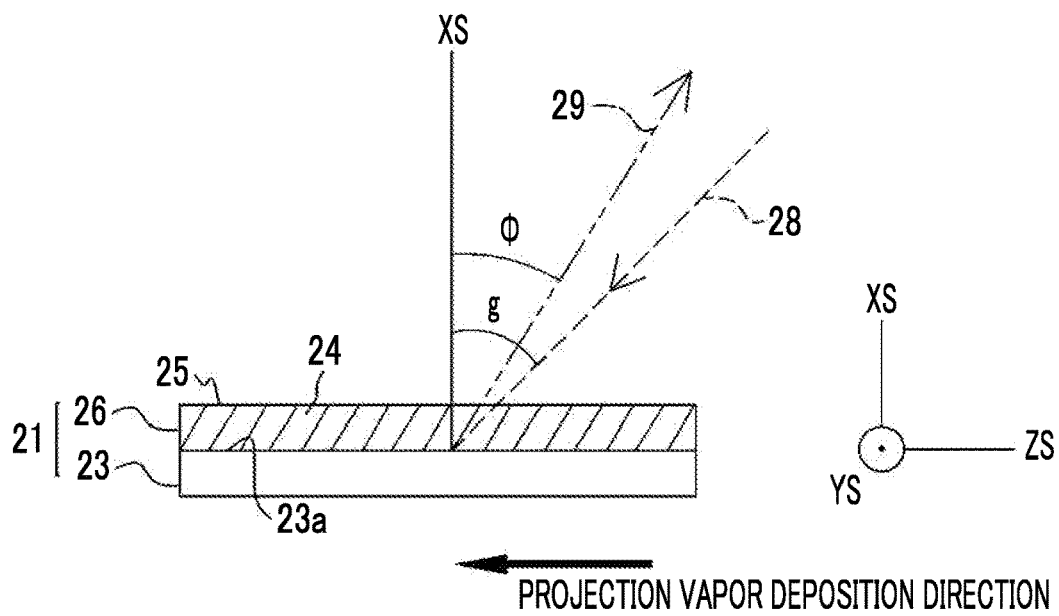
FIG. 3 is a cross-sectional view of a phase difference compensation element according to a first embodiment.

As shown in FIG. 3, a phase difference compensation element 21 according to a first embodiment is a plate-like member including a substrate 23 and a phase difference film 26. The phase difference film 26 has at least one oblique vapor deposition layer 25 on at least one substrate surface 23a of the substrate 23. In the example shown in FIG. 3, the phase difference film 26 is composed of one oblique vapor deposition layer 25.

The oblique vapor deposition layer 25 is produced by vapor-depositing an inorganic material such as $Ta_2O_5$ on the substrate 23 from an oblique direction by a so-called oblique vapor deposition method. By obliquely entering the vapor deposition material onto the substrate surface 23a, the columnar structure body 24 inclined in accordance with an incidence direction (hereinafter, referred to as a vapor deposition direction) 28 of the vapor deposition material with respect to the substrate surface 23a grows, and the oblique vapor deposition layer 25 having a structure in which the columnar structure bodies 24 stand is formed. The growth direction of the columnar structure body 24 is the longitudinal direction 29 of the columnar structure body 24. An angle formed by a vapor deposition direction 28 and a normal line XS of the substrate surface 23a is referred to as a vapor deposition angle g. In general, as shown in FIG. 3, the vapor deposition direction 28 with respect to the normal line Xs to the substrate surface does not match the longitudinal direction 29 of the columnar structure body 24, but a growth angle φ between the columnar structure body 24 and the normal line XS of the substrate surface 23a of the substrate 23 has a positive correlation with the vapor deposition angle g. That is, as the vapor deposition angle g increases, the growth angle φ of the columnar structure body increases, and as the vapor deposition angle g decreases, the growth angle φ of the columnar structure body also decreases. In reality, the longitudinal direction 29 of the columnar structure body 24 tends to be a direction rising from the substrate surface 23a rather than the vapor deposition direction 28, and the growth angle φ is smaller than the vapor deposition angle g (φ<g). Since the oblique vapor deposition layer 25 has the columnar structure body 24 which is inclined with respect to the normal line XS of the substrate surface 23a, the oblique vapor deposition layer 25 has biaxial refractivity anisotropy as an optical characteristic. That is, due to the columnar structure in which the columnar structure bodies 24 stand, the oblique vapor deposition layer 25 and functions as an O-plate. Hereinafter, an axial direction in which the vapor deposition direction 28 is projected onto the substrate surface is referred to as a projection vapor deposition direction.

As shown in FIGS. 4A to 4C, the refractivity anisotropy of the oblique vapor deposition layer 25 is conceptually represented by a biaxial refractive index ellipsoid 102 having three principal refractive indices of n1, n2, and n3 as axes. In the three principal refractive indices in the refractive index ellipsoid exhibiting the optical characteristic of the oblique vapor deposition layer 25, an axis corresponding to the longitudinal direction 29 of the columnar structure body 24 is defined as an x1-axis, and a principal refractive index along this axis is defined as n1. In addition, a major-axis direction of the ellipse 104 passing through a center C of the refractive index ellipsoid 102 and perpendicular to the longitudinal direction (x1-axis) of the structural body is defined as a y1-axis, and the minor-axis direction thereof is defined as a z1-axis. The principal refractive index in the y1-axis direction is defined as n2, and the principal refractive index in the z1-axis direction is defined as n3. In this case, in the three principal refractive indices n1, n2, and n3, n2 is the largest.

It is sufficient that a relationship between the principal refractive indices n1, n2, and n3 is n2>n3 and n2>n1, and either n3 or n1 may be larger, but it is preferable that n2>n3>n1. Here, a case where n2>n3>n1 will be described.

FIG. 4A shows a relationship of each axis of the refractive index ellipsoid 102 with respect to the film surface of the oblique vapor deposition layer 25. As shown in FIG. 4A, the normal line of the film surface of the oblique vapor deposition layer 25 is defined as an XS-axis, and a YS-axis and a ZS-axis are determined in planes perpendicular to the XS-axis. An axis obtained by projecting the y1-axis which is the major-axis direction onto the film surface is defined as the YS-axis, and a direction perpendicular to the YS-axis is defined as the ZS-axis. That is, the y1-axis which is the major-axis direction is a direction in a plane of the oblique vapor deposition layer 25, which is perpendicular to the axis (ZS-axis) obtained by projecting the longitudinal direction 29 of the columnar structure body 24 onto a surface of the oblique vapor deposition layer 25. In this case, the x1-axis of the refractive index ellipsoid 102 is in an XS-ZS plane and is inclined by φ from the XS-axis. The ZS-axis coincides with an axis obtained by projecting the x1-axis onto the substrate surface 23a.

In the refractive index ellipsoid 102, FIG. 4B is a view of an ellipse 107 having cross section cut along the XS-ZS plane passing through the center C and viewed from the YS-axis direction. In addition, in the refractive index ellipsoid 102, FIG. 4C is a view of an ellipse 108 having cross section cut along the XS-YS plane passing through the center C and viewed from the ZS-axis direction. As described above, the x1-axis and the z1-axis of the refractive index ellipsoid 102 exhibiting the refractivity anisotropy of the phase difference film 26 are rotated by φ about the YS-axis with respect to the XS-axis and the ZS-axis of the phase difference compensation element.

In a case of cutting the refractive index ellipsoid 102 with a plane passing through the center C of the refractive index ellipsoid 102 and parallel to the film surface, as shown in FIG. 4A, a cross section thereof is an ellipse 106 which has a refractive index nys corresponding to a major axis radius in the YS-axis direction and a refractive index nzs corresponding to a minor axis radius in the ZS-axis direction. Therefore, the oblique vapor deposition layer 25 exhibits birefringence having the refractive index nys in the YS-axis direction and the refractive index nzs in the ZS-axis direction with respect to light incident along the XS-axis. The refractive index nys is larger than the refractive index nzs. That is, the phase difference film 26 has a slow axis S1 in the YS-axis direction, which is the maximum refractive index with respect to light incident from the XS-axis direction. The phase difference film 26 has a fast axis F1 in the ZS-axis direction orthogonal to the slow axis S1. The slow axis S1 is perpendicular to the axis (ZS-axis) obtained by projecting the x1-axis which coincides with the longitudinal direction 29 of the columnar structure body 24 onto the film surface. Since the projection vapor deposition direction (see FIG. 3) coincides with the ZS-axis, the fast axis F1 is parallel to the projection vapor deposition direction and the slow axis S1 is perpendicular to the projection vapor deposition direction.

Since the phase difference film 26 according to the present embodiment includes the single-layer oblique vapor deposition layer 25, the slow axis S1 and the fast axis F1 of the oblique vapor deposition layer 25 are the slow axis SP and the fast axis FP of the phase difference film 26.

Figure 5:
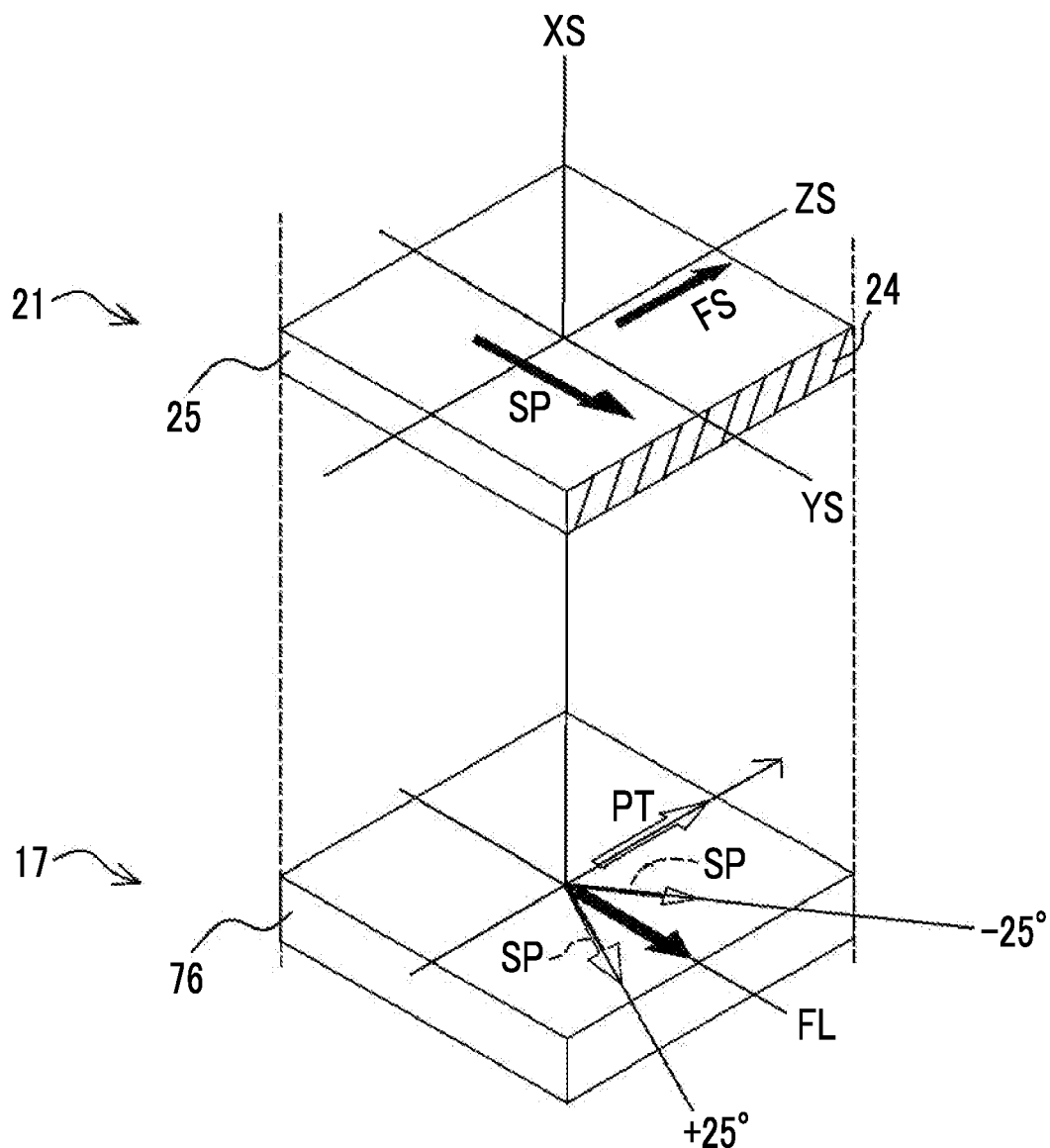
FIG. 5 is a diagram showing a relationship between a slow axis of the oblique vapor deposition layer and a fast axis of the liquid crystal layer.

As shown in FIG. 5, in the liquid crystal display element 10, the phase difference compensation element 21 having the oblique vapor deposition layer 25 as described above is disposed in an aspect in which an intersecting angle between the slow axis SP of the phase difference film and the fast axis FL which is a direction perpendicular the tilt orientation of the liquid crystal molecules 75 is −25° to +25°. The intersecting angle is preferably −10° to +10°, and more preferably −5° to +5°. As a result, as described above, the phase difference caused by the pre-tilt of the liquid crystal molecules 75 and the phase difference caused by the phase difference compensation element 21 have opposite polarities, so that the phase difference can be compensated.

Production Method of Oblique Vapor Deposition Layer

Figure 6:
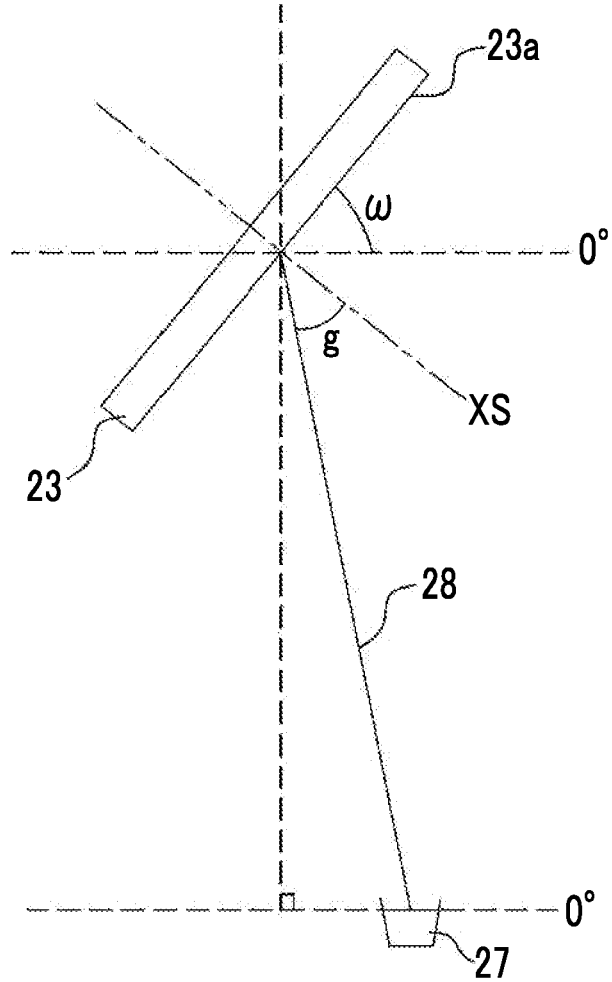
FIG. 6 is an explanatory diagram with an oblique vapor deposition method.

A production method of the oblique vapor deposition layer 25 will be described. As shown in FIG. 6, the oblique vapor deposition refers to a vapor deposition in which, while the substrate 23 is held in a posture in which the substrate surface 23a of the substrate 23 is inclined with respect to a vapor deposition source 27, a vapor deposition material from the vapor deposition source 27 is obliquely incident on the substrate surface 23a of the substrate 23. In a case where the vapor deposition source 27 is disposed on a horizontal floor surface, an angle formed by a horizontal plane (plane parallel to the horizontal floor surface) indicated by a dotted line in FIG. 6 and the substrate surface 23a is referred to as an installation angle ω of the substrate 23. That is, the installation angle ω in a case where the substrate 23 is installed horizontally is 0°, and the installation angle ω in a case where the substrate 23 is installed perpendicular to the horizontal is 90°.

As described above, in the oblique vapor deposition layer 25 including the phase difference compensation element 20 according to the present embodiment, n2 among the three principal refractive indices of the refractive index ellipsoid is the largest. A shape of the refractive index ellipsoid representing the refractivity anisotropy of the oblique vapor deposition layer 25 changes depending on film forming conditions of the oblique vapor deposition layer. Here, two specific production methods of the oblique vapor deposition layer which has the refractivity anisotropy represented by the refractive index ellipsoid of n2>n3>n1 will be described.

As a material of the oblique vapor deposition layer 25, an oxide containing at least one of Si, Nb, Zr, Ti, La, Al, Hf, or Ta can be used. That is, the oblique vapor deposition layer 25 can include an oxide containing at least one of Si, Nb, Zr, Ti, La, Al, Hf, or Ta. By using these materials, an oblique vapor deposition layer composed of a good columnar structure body can be obtained.

First Production Method

Figure 7:
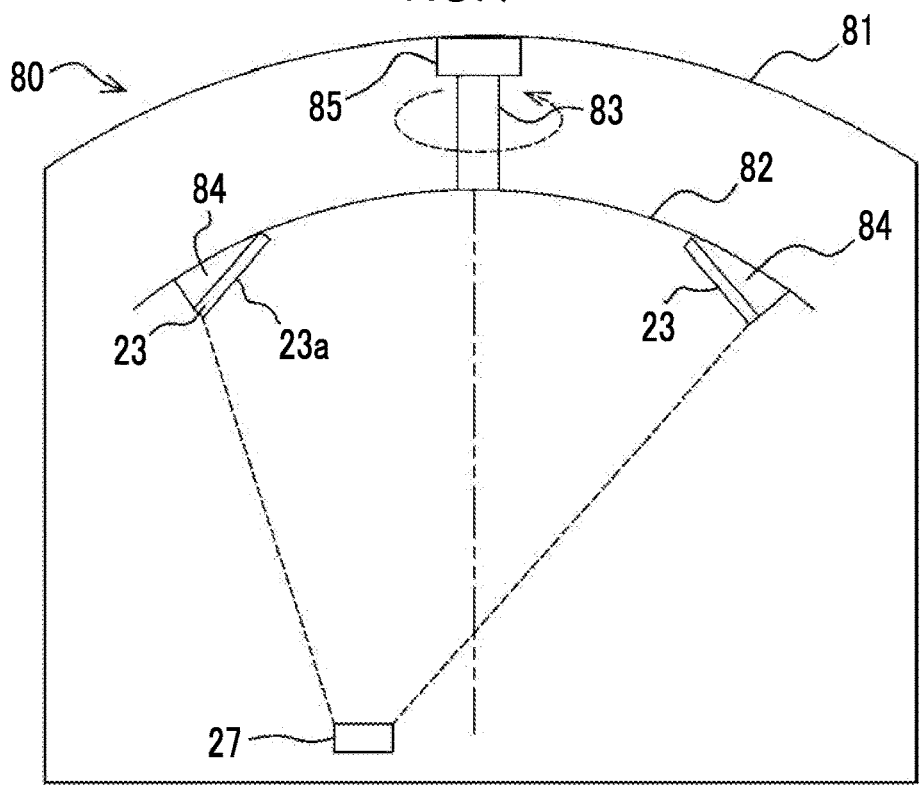
FIG. 7 is a diagram showing a configuration of a vapor deposition equipment for performing a first production method of the oblique vapor deposition layer.

FIG. 7 shows a schematic configuration of a vapor deposition equipment 80 used in the first production method. The vapor deposition equipment 80 includes a vacuum chamber 81, a seat 82, a rotation shift 83, a substrate holder 84, a rotation mechanism 85, and a vapor deposition source 27. The seat 82 has a concavely curved dome shape in a case of being viewed from a direction of the vapor deposition source 27, and a plurality of substrate holders 84 are provided on the concave surface. In addition, the vapor deposition source 27 is disposed at a predetermined distance from the rotation shift 83 of the seat 82. That is, the vapor deposition source 27 is provided at a position eccentric from a center of rotation of the seat 82.

As shown in FIG. 7, this vapor deposition equipment 80 is an equipment in which, while the substrate 23 is held in a posture in which the substrate surface 23a of the substrate 23 is inclined with respect to a vapor deposition source 27, a vapor deposition material from the vapor deposition source 27 is obliquely incident on the substrate surface 23a of the substrate 23 to perform a vapor deposition. In the vapor deposition equipment 80, as shown in FIG. 6, while the substrate 23 is held in a posture in which the substrate surface 23a of the substrate 23 is inclined with respect to a vapor deposition source 27, a vapor deposition material from the vapor deposition source 27 is obliquely incident on the substrate surface 23a of the substrate 23 to perform a vapor deposition. By obliquely vapor-depositing the vapor deposition material on the substrate surface 23a of the substrate 23, the columnar structure body 24 inclined in accordance with an incidence direction (hereinafter, referred to as a vapor deposition direction) 28 of the vapor deposition material with respect to the substrate surface 23a grows, and the oblique vapor deposition layer 25 having a structure in which the columnar structure bodies 24 stand is formed. In this case, an angle formed by the vapor deposition direction 28 and the normal line XS of the substrate surface 23a is referred to as a vapor deposition angle g. In addition, in a case where the vapor deposition source 27 is disposed on a horizontal floor surface, an angle formed by a horizontal plane (plane parallel to the horizontal floor surface) indicated by a dotted line in FIG. 6 and the substrate surface 23a is referred to as an installation angle ω of the substrate 23. That is, the installation angle ω in a case where the substrate 23 is installed horizontally is 0°, and the installation angle ω in a case where the substrate 23 is installed perpendicular to the horizontal is 90°. The substrate holder 84 provided in the seat 82 is configured to be able to hold the substrate 23 by adjusting the installation angle ω.

The rotation mechanism 85 revolves the substrate 23 with respect to the vapor deposition source by rotating the substrate 23 along a circular orbit. The rotation mechanism 85 includes a motor (not shown) which drives the rotation shift 83, a control circuit (not shown) which controls the motor, and the like. The rotation shift 83 is provided in a direction perpendicular to the rotation center of the upper surface of the seat 82, and the seat 82 is rotated by the rotation of the rotation shift 83. The substrate rotates along the circular orbit together with the seat 82 while maintaining a posture in which the vapor deposition surface is inclined with the vapor deposition source. In the vapor deposition equipment 80, ON and OFF of the rotation of the seat by the rotation mechanism 85 can be optionally performed.

Figure 8:
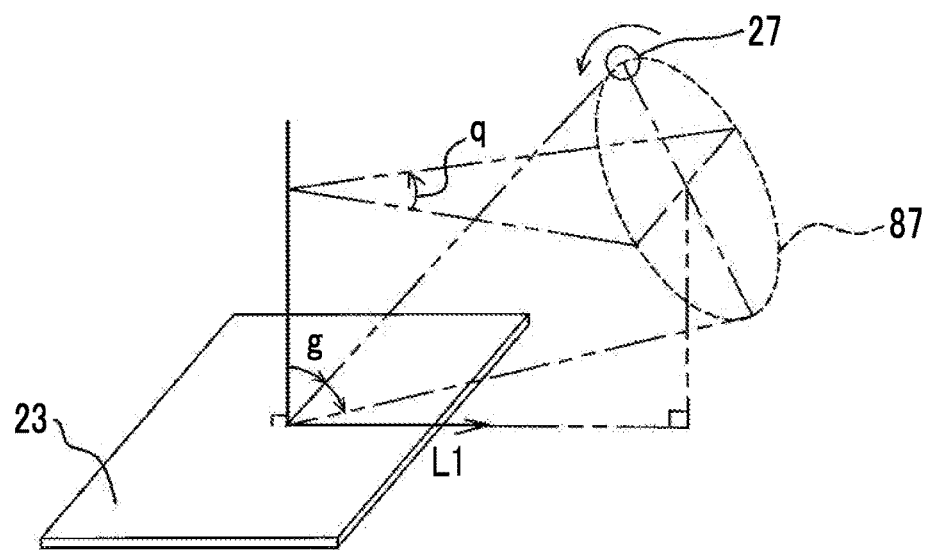
FIG. 8 is an explanatory diagram for explaining a vapor deposition method to a rotating substrate.

In a case where the oblique vapor deposition is performed while the substrate 23 is revolved by the rotation mechanism 85, as shown in FIG. 8, the vapor deposition source 27 seen from the substrate 23 goes around a circular orbit 87 in a predetermined direction. Therefore, the vapor deposition angle g changes vibrationally within a predetermined angle range, and an azimuthal angle q also changes vibrationally within a predetermined angle range. In this way, by continuously vapor-depositing a vapor deposition material from different azimuthal angles q within a predetermined range, the deposition progresses in a direction of the principal refractive index n2 with a spread, and as a result, the value of the principal refractive index n2 increases. In addition, in a case where a rotation speed of the seat 82 is sufficiently faster than a deposition speed of the vapor deposition material, a physical fine structure of the oblique vapor deposition layer to be produced is a structure which is not distorted in a helical shape and in which a direction of the principal refractive index n3 is inclined with a time-averaged direction (average vapor deposition orientation) of the position of the vapor deposition source 27.

In a case where, using the vapor deposition equipment described above, the oblique vapor deposition layer is formed by changing the substrate installation angle ω and the ON and OFF condition of the rotation of the seat (that is, the presence or absence of the substrate revolution with respect to the vapor deposition source), shapes of the obtained refractive index ellipsoids are summarized in Table 1. Here, a tantalum oxide is used as the material of the oblique vapor deposition layer.

TABLE 1

| Sample No. | Substrate revolution | Substrate installation angle ω [deg.] | Shape of refractive index ellipsoid of oblique vapor deposition layer |
|---|---|---|---|
| 1 | Y | 20 | n2 > n3 > n1 |
| 2 | Y | 40 | n2 > n3 > n1 |
| 3 | Y | 60 | n2 > n3 > n1 |
| 4 | Y | 80 | n2 > n3 > n1 |
| 5 | Y | 85 | n1 > n2 > n3 |
| 6 | N | 20 | n2 > n3 > n1 |
| 7 | N | 40 | n2 > n3 > n1 |
| 8 | N | 60 | n2 > n3 > n1 |
| 9 | N | 80 | n1 > n2 > n3 |
| 10 | N | 85 | n1 > n2 > n3 |

In the samples 1 to 4 and 6 to 8 of the present vapor deposition equipment 80, the oblique vapor deposition layer which has the refractivity anisotropy represented by the refractive index ellipsoid of n2>n3>n1 is obtained. That is, under the film forming conditions that the substrate is revolved at a substrate installation angle of 20° to 80° or that the substrate is not revolved at an installation angle of 20° to 60°, the oblique vapor deposition layer which has the refractivity anisotropy represented by the refractive index ellipsoid of n2>n3>n1 is obtained.

Since other parameters such as a distance between the substrate and the vapor deposition source in the vapor deposition equipment can also change the shape of the refractive index ellipsoid of the oblique vapor deposition layer to be produced, the relationship between the film forming conditions shown in Table 1 and the shape of the refractive index ellipsoid is not uniquely determined. However, the substrate installation angle and the presence or absence of the substrate revolution are dominant parameters which determine the shape of the refractive index ellipsoid. Therefore, even in a case of using a vapor deposition equipment with a different distance between the substrate and the vapor deposition source than the vapor deposition equipment examined above, by forming a plurality of different oblique vapor deposition layers by changing the conditions of the substrate installation angle and the presence or absence of the substrate revolution, it is possible to specify the appropriate conditions of the substrate installation angle and the presence or absence of the substrate revolution, so that the refractive index elliptical shape of n2>n3>n1 is obtained.

Figure 9:
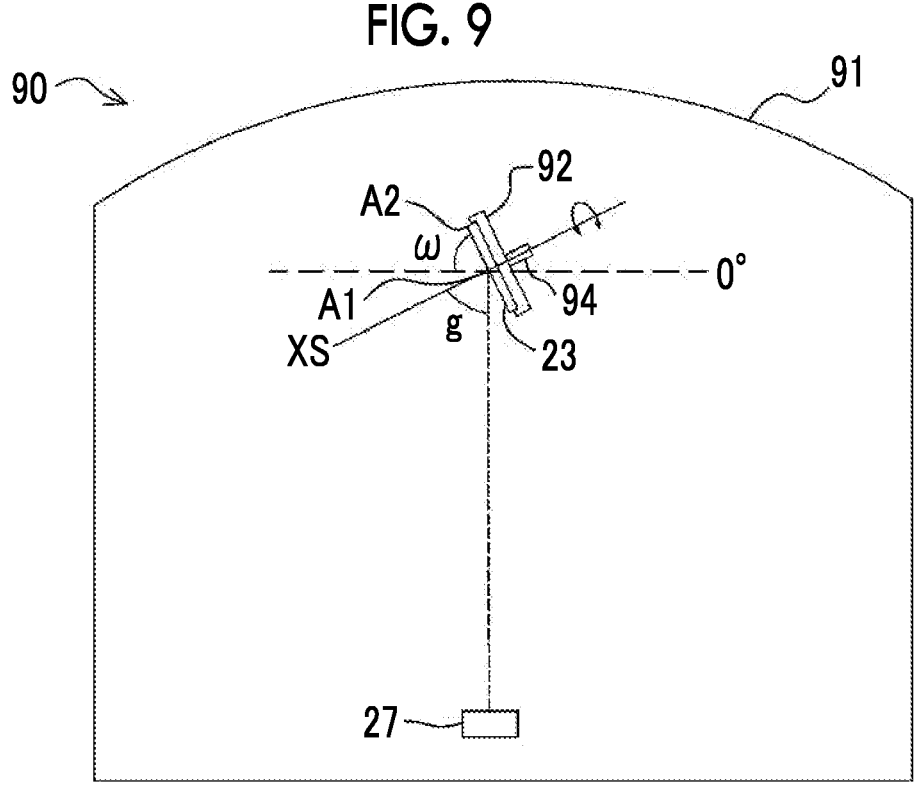
FIG. 9 is a diagram showing a configuration of a vapor deposition equipment for performing a second production method of the oblique vapor deposition layer.

Second production method FIG. 9 shows a schematic configuration of a vapor deposition equipment 90 used in the second production method. The vapor deposition equipment 90 shown in FIG. 9 includes a vacuum chamber 91, a vapor deposition source 27, a substrate holder 92, a rotation shift 94 extending in a normal direction of a supporting surface of the substrate holder 92, and a rotation mechanism (not shown) which rotates the rotation shift 94. Even in the vapor deposition equipment 90, as shown in FIG. 6, while the substrate 23 is held in a posture in which the substrate surface 23*a* of the substrate 23 is inclined with respect to a vapor deposition source 27, a vapor deposition material from the vapor deposition source 27 is obliquely incident on the substrate surface 23*a* of the substrate 23 to perform a vapor deposition.

As shown in FIG. 9, in the vapor deposition equipment 90, the supporting surface of the substrate holder 92 is disposed at an angle ω inclined from a horizontal. The vapor deposition source 27 is provided directly below the substrate 23, and an angle formed by the vapor deposition direction with respect to the substrate surface 23*a* from the vapor deposition source 27 and the normal line XS of the substrate surface 23*a* is the vapor deposition angle g. Since the vapor deposition direction is a direction perpendicular to the horizontal, in the vapor deposition equipment 90, the substrate installation angle ω and the vapor deposition angle g are the same. The substrate holder 92 is provided rotatably about an axis perpendicular to a paper plane (not shown), and by rotating the substrate holder 92, the vapor deposition angle g can be freely adjusted.

In addition, the substrate holder 92 is provided rotatably about the rotation shift 94. By rotating the substrate holder 92 about the rotation shift 94 during the vapor deposition, while maintaining a constant vapor deposition angle g, the angle (azimuthal angle) q of a flying direction of a vapor deposition material relative to a predetermined reference position of the substrate 23 can be freely changed.

In the vapor deposition equipment 90 configured as described above, the substrate 23 is moved on a curved orbital axis about the normal line XS of the substrate 23, and by changing the azimuthal angle q during the vapor deposition, a phase difference compensation element satisfying each of the above-described conditions is produced. It is preferable that the change mode of the azimuthal angle q during the vapor deposition is a vibrational reciprocating rotation (hereinafter, a swing) within a predetermined angle range. In addition, the angle range of the swing is preferably a range of more than 0° and 90° or less, and more preferably 10° or more. Furthermore, it is particularly preferable to be 10° or more and 60° or less.

Figure 10A:
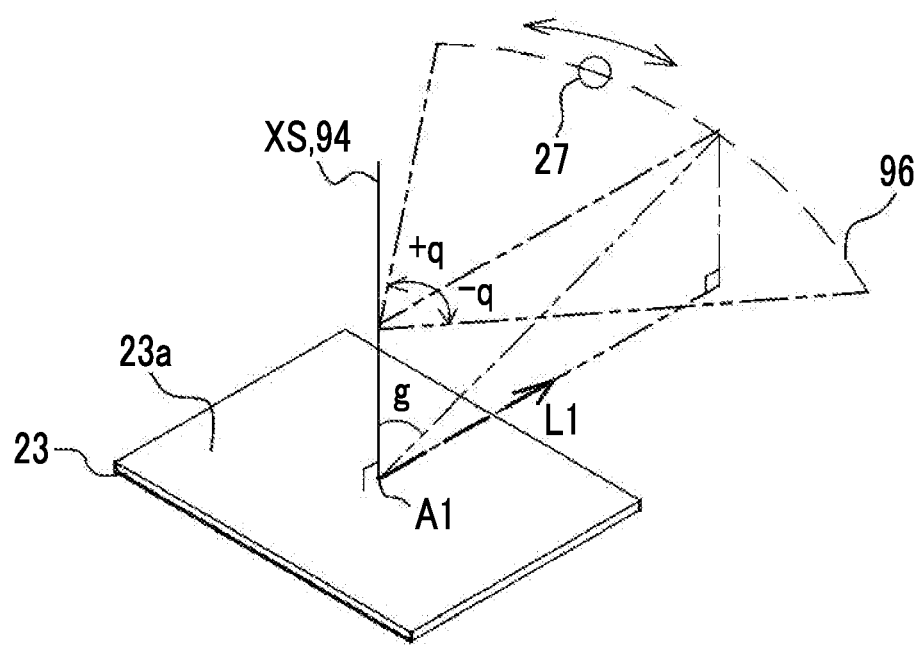
FIG. 10A is a perspective view showing a vapor deposition direction on a substrate swinging around a point A1.

In a case where the oblique vapor deposition is performed with the above-described vapor deposition equipment 90, as shown in FIG. 10A, the vapor deposition source 27 seen from the substrate 23 oscillates on an arc orbit 96 passing through a center A1 of the substrate surface 23*a* of the substrate 23 and centering on the rotation shift 94 parallel to the normal line XS. In this case, the vapor deposition source 27 swings within a predetermined azimuthal angle q range while maintaining a constant vapor deposition angle g with respect to the substrate 23 (see FIG. 10B). That is, the vapor deposition material continuously flies and deposits within the range of the azimuthal angle q while keeping the vapor deposition angle g of the vapor deposition material with respect to the substrate 23 substantially constant. By the process, the deposition progresses in a direction of the principal refractive index n2 with a spread, and as a result, the value of the principal refractive index n2 increases. In addition, in a case where the swing speed is sufficiently faster than the deposition speed, a physical fine structure of the oblique vapor deposition layer to be produced is a structure which is not distorted in an S-shape and in which a direction of the principal refractive index n1 is inclined with a time-averaged direction (average vapor deposition orientation) L1 of the position of the vapor deposition source.

Figure 10B:
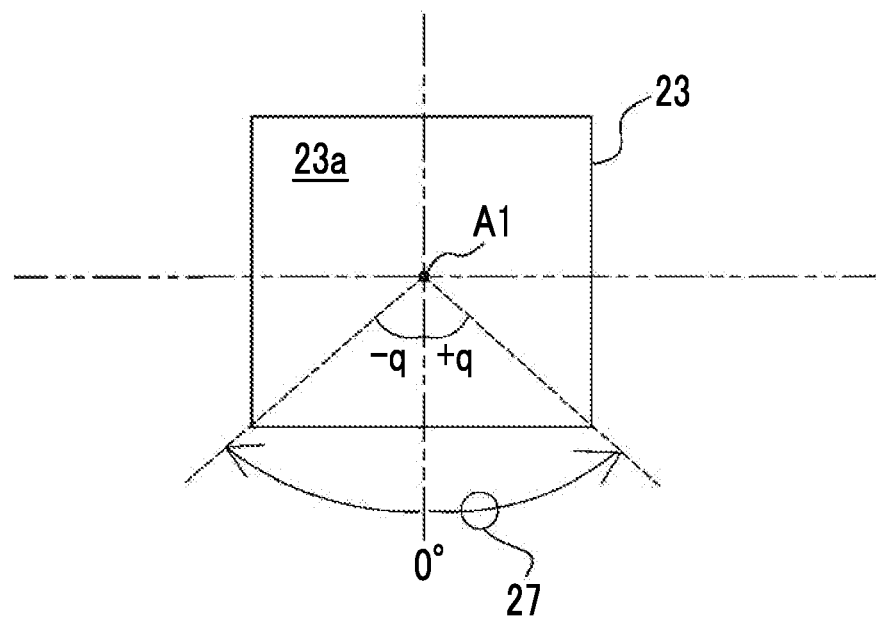
FIG. 10B is a plan view showing an azimuthal angle of the vapor deposition on a substrate surface around the point A1.
Figure 11:
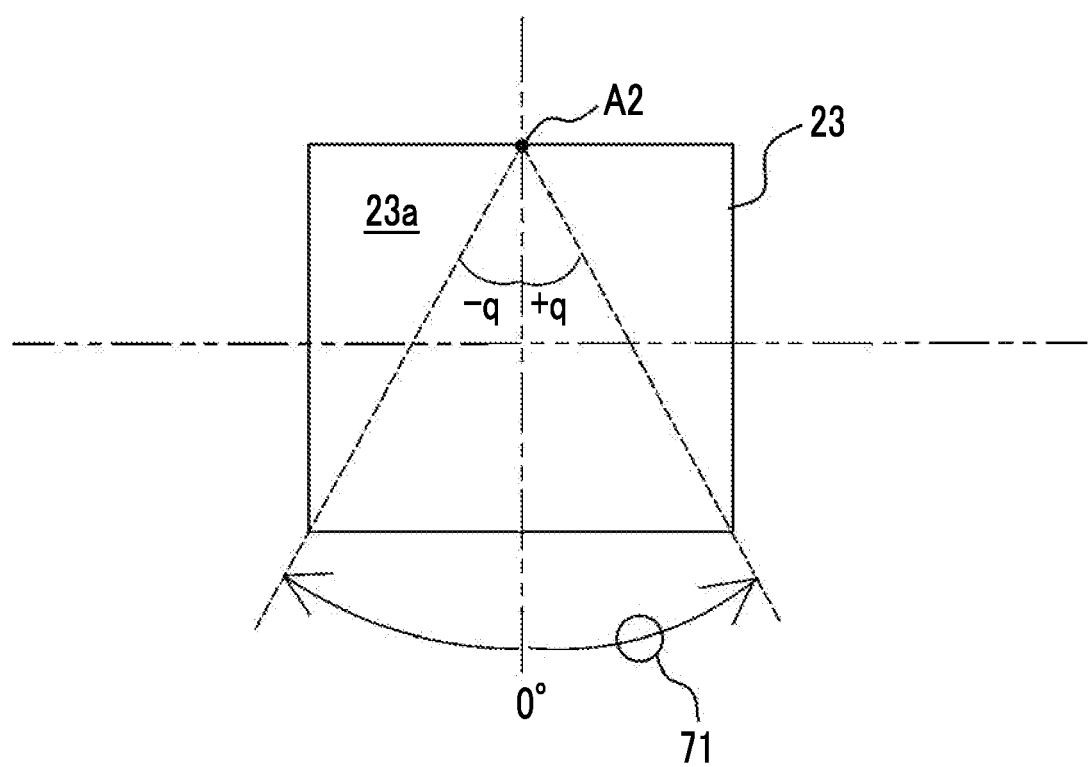
FIG. 11 is a plan view showing an azimuthal angle of the vapor deposition to a substrate swinging around a point A2.

In FIG. 9 and FIGS. 10A and 10B, the rotation shift 94 rotating the substrate 23 is located at the center A1 of the substrate 23, but as shown in FIG. 11, the rotation shift 94 may be configured to set at a center A2 of one side of the substrate 23, which is the farthest from the vapor deposition source 27, and configured such that the substrate 23 swings in the range of q azimuthal angles around an axis passing through A2. In the following, a case of rotating the substrate 23 in FIGS. 10A and 10B with the center A1 as the rotation axis is regarded as Type I, and a case of rotating around the center A2 of one side of the substrate 23 shown in FIG. 11 is regarded as Type II.

In a case where, using the vapor deposition equipment 90 described above, the oblique vapor deposition layer is formed by changing the substrate installation angle ω, shapes of the obtained refractive index ellipsoids are summarized in Table 2. Here, a tantalum oxide is used as the material of the oblique vapor deposition layer. Both Type I and Type II have the same results. The substrate swings from 0° to 90° in both the +q direction and the −q direction with respect to the orientation of 0°. That is, the substrate swings in a range of the azimuthal angle −90° to +90°.

TABLE 2

| Sample No. | Substrate revolution | Substrate installation angle ω [deg.] | Range of substrate swing angle q [deg.] | Shape of refractive index ellipsoid of oblique vapor deposition layer |
|---|---|---|---|---|
| 11 | Y | 20 | 0 ≤ q ≤ 90 | n2 > n3 > n1 |
| 12 | Y | 40 | 0 ≤ q ≤ 90 | n2 > n3 > n1 |
| 13 | Y | 60 | 0 ≤ q ≤ 90 | n2 > n3 > n1 |
| 14 | Y | 70 | 0 ≤ q ≤ 90 | n2 > n3 > n1 |
| 15 | Y | 80 | 0 ≤ q ≤ 90 | n1 > n2 > n3 |
| 16 | Y | 85 | 0 ≤ q ≤ 90 | n1 > n2 > n3 |

In the samples 11 to 14 of the present vapor deposition equipment, the oblique vapor deposition layer which has the refractivity anisotropy represented by the refractive index ellipsoid of n2>n3>n1 is obtained. That is, under the film forming conditions that the substrate installation angle is 20° to 70° and the substrate swings at ±90°, the oblique vapor deposition layer which has the refractivity anisotropy represented by the refractive index ellipsoid of n2>n3>n1 is obtained.

Since other parameters such as a distance between the substrate 23 and the vapor deposition source 27 in the vapor deposition equipment 90 can also change the shape of the refractive index ellipsoid of the oblique vapor deposition layer to be produced, the relationship between the film forming conditions shown in Table 2 and the shape of the refractive index ellipsoid is not uniquely determined. However, the substrate installation angle is a dominant parameter which determines the shape of the refractive index ellipsoid. Therefore, even in a case of using a vapor deposition equipment with a different distance between the substrate 23 and the vapor deposition source 27 than the vapor deposition equipment 90 examined above, by forming a plurality of different oblique vapor deposition layers by changing the condition of the substrate installation angle ω, it is possible to specify the appropriate condition of the substrate installation angle, so that the refractive index elliptical shape of n2>n3>n1 is obtained.

The aspect of forming the oblique vapor deposition layer 25 by the oblique vapor deposition method has been described, but the method for forming the oblique vapor deposition layer 25 is not limited to the above-described method. Any forming method may be used as long as the columnar structure body 24 can be grown on the substrate surface 23a of the substrate 23 in a direction inclined from the normal line XS to obtain the oblique vapor deposition layer 25. The vapor deposition method is not limited to the vacuum vapor deposition, and electron beam vapor deposition, ion plating, or the like can be used. In addition, chemical vapor deposition (CVD) may be used. Furthermore, a sputtering method, a reactive sputtering method, or the like can also be used.

Figure 13A:
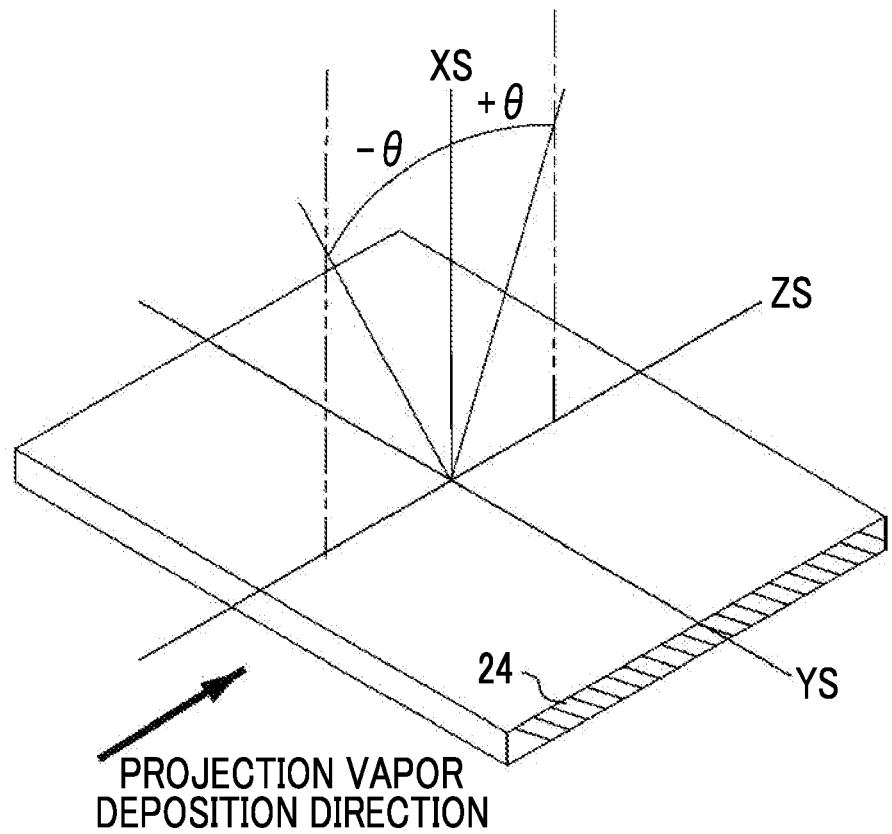
FIG. 13A is a perspective view for explaining a measuring method for an incidence angle dependence of the phase difference of the oblique vapor deposition layer.
Figure 13B:
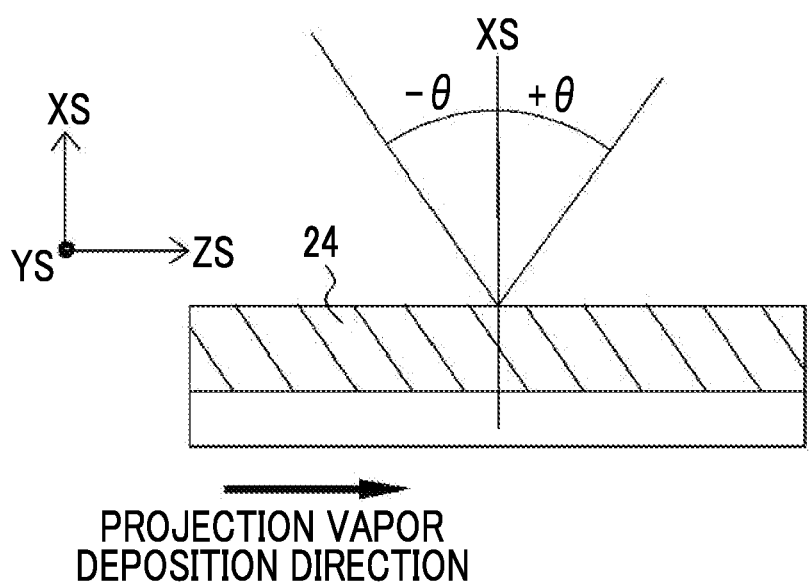
FIG. 13B is a cross-sectional view thereof.
Figure 14:
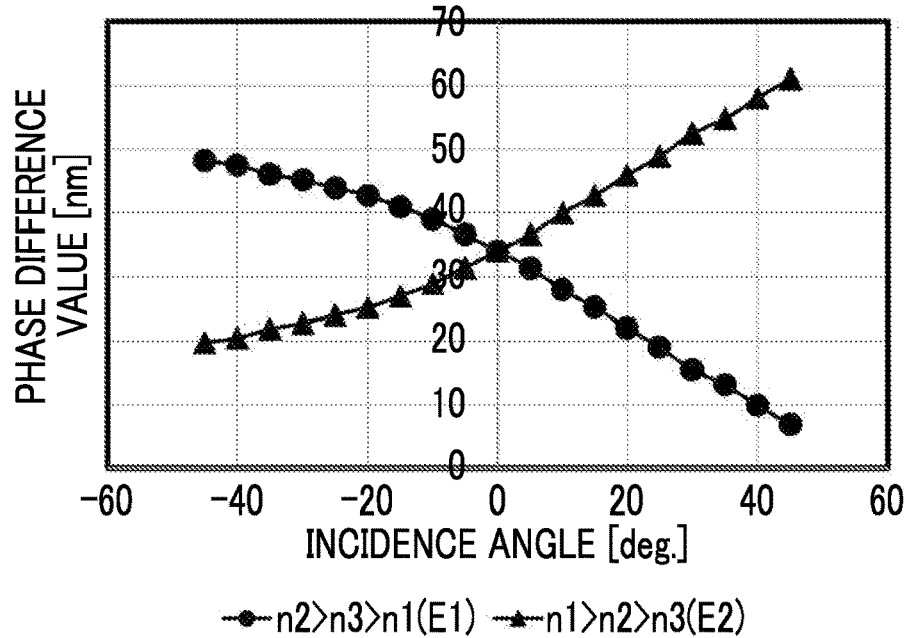
FIG. 14 is a diagram showing an incidence angle dependence of a phase difference value.

Here, features of the oblique vapor deposition layer provided in the phase difference compensation element according to the embodiment of the present disclosure will be described in comparison with features of the oblique vapor deposition layer provided in the phase difference compensation element in the related art. Here, an oblique vapor deposition layer E1 provided in the phase difference compensation element according to the embodiment of the present disclosure and an oblique vapor deposition layer E2 provided in the phase difference compensation element in the related art are produced under the conditions shown in Table 3.

deposition layer E1 and the oblique vapor deposition layer E2, as shown in FIGS. 13A and 13B, along the projection vapor deposition direction of the oblique vapor deposition layers E1 and E2, that is, in the XS-ZS plane, the phase difference value Re(θ) is measured by changing the incidence angle θ of measurement light from −45° to +45°. Here, as shown in FIGS. 13A and 13B, an incidence angle in a direction in which the columnar structure body 24 is inclined toward the longitudinal direction 29 (see FIGS. 4A to 4C) side with respect to the XS-axis which is the normal direction of the oblique vapor deposition layer E1 is regarded as negative, and an incidence angle in a direction inclined opposite to the longitudinal direction 29 of the columnar structure body 24 is regarded as positive. The incidence angle of the measurement light is an angle (polar angle) formed by the incidence direction and the normal line XS of the film surface, and hereinafter, the incidence angle may be called as the polar angle. FIG. 14 shows the measurement results of the phase difference value Re(θ) of the oblique vapor deposition layer E1 and the oblique vapor deposition layer E2.

As shown in FIG. 14, in the oblique vapor deposition layer E2 in the related art, showing the refractive index ellipsoid of n1>n2>n3, the phase difference value mono-

|  | Shape of refractive index ellipsoid | Substrate revolution | Substrate installation angle | Substrate | Film thickness of phase difference layer |
| --- | --- | --- | --- | --- | --- |
| Oblique vapor deposition layer E1 | n2 > n3 > n1 | Y | 70° | Quartz | 0.6 μm |
| Oblique vapor deposition layer E2 | n1 > n2 > n3 | N | 80° | Quartz | 0.6 μm |

Figure 12A:
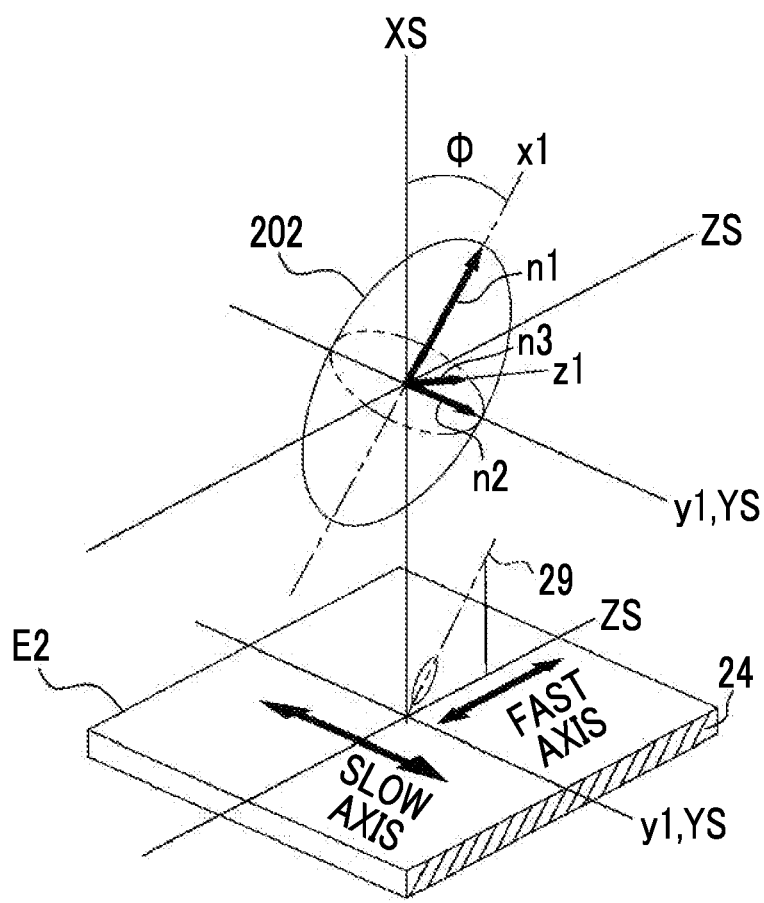
Figure 12B:
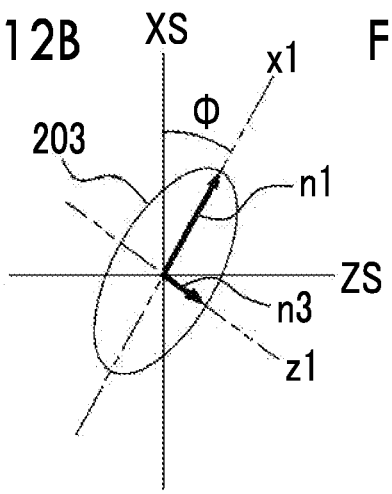
Figure 12C:
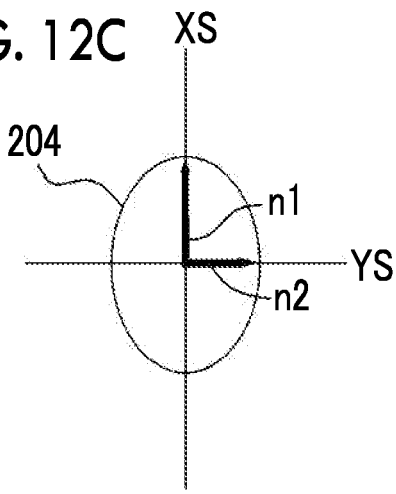

The oblique vapor deposition layer E1 has the refractivity anisotropy represented by the refractive index ellipsoid having the principal refractive indices of n2>n3>n1 as shown in FIGS. 4A to 4C. On the other hand the oblique vapor deposition layer E2 has refractivity anisotropy represented by a refractive index ellipsoid 202 having principal refractive indices of n1>n2>n3 as shown in FIG. 12A. As shown in FIG. 12A, the refractivity anisotropy of the oblique vapor deposition layer E2 is represented by the refractive index ellipsoid 202 having a shape in which a rugby ball is placed upright with respect to the oblique vapor deposition layer. In the refractive index ellipsoid 202, FIG. 12B is a view of an ellipse 203 having cross section cut along the XS-ZS plane passing through the center C and viewed from the YS-axis direction. In addition, in the refractive index ellipsoid 202, FIG. 12C is a view of an ellipse 204 having cross section cut along the XS-YS plane passing through the center C and viewed from the ZS-axis direction. As shown in FIG. 12A, a slow axis of the oblique vapor deposition layer E2 having the refractivity anisotropy represented by the refractive index ellipsoid 202 is perpendicular to an axis obtained by projecting the longitudinal direction 29 of the columnar structure body onto the film surface.

In the oblique vapor deposition layers E1 and E2, the columnar structure body 24 is inclined in a cross section along the vapor deposition direction. Therefore, even in a case where the incidence angles θ of light incident on the film surface are the same but the incidence orientations are different from each other, the phase difference that light receives in a case of passing through the columnar structure body 24 is different. With regard to the oblique vapor tonically increases in the range of incidence angles −45° to +45°. On the other hand, in the oblique vapor deposition layer E1 showing the refractive index ellipsoid of n2>n3>n1, the phase difference value monotonically decreases in the range of incidence angles −45° to +45°, which is opposite to that of the oblique vapor deposition layer E2.

A phase difference compensation by using the phase difference compensation element 21 according to the embodiment of the present disclosure will be described with reference to a conceptual diagram.

The phase difference compensation of the liquid crystal layer 76 is to impart a phase difference to the refractive index ellipsoid of the liquid crystal layer 76 by the phase difference compensation element 20, and to make the shape of the refractive index ellipsoid obtained by combining both spherical (or close to spherical). In the spherical refractive index ellipsoid, the principal refractive indices of all three axes have the same value, and no phase difference occurs at any viewing angle (incidence angle). Since the phase difference which occurs as the refractive index ellipsoid is closer to a spherical shape is smaller, in the phase difference compensation of the liquid crystal layer 76, a phase difference compensation element which can realize a more spherical shape of the refractive index ellipsoid in a case of being combined with the refractive index ellipsoid of the liquid crystal layer 76 is desirable.

Figure 15:
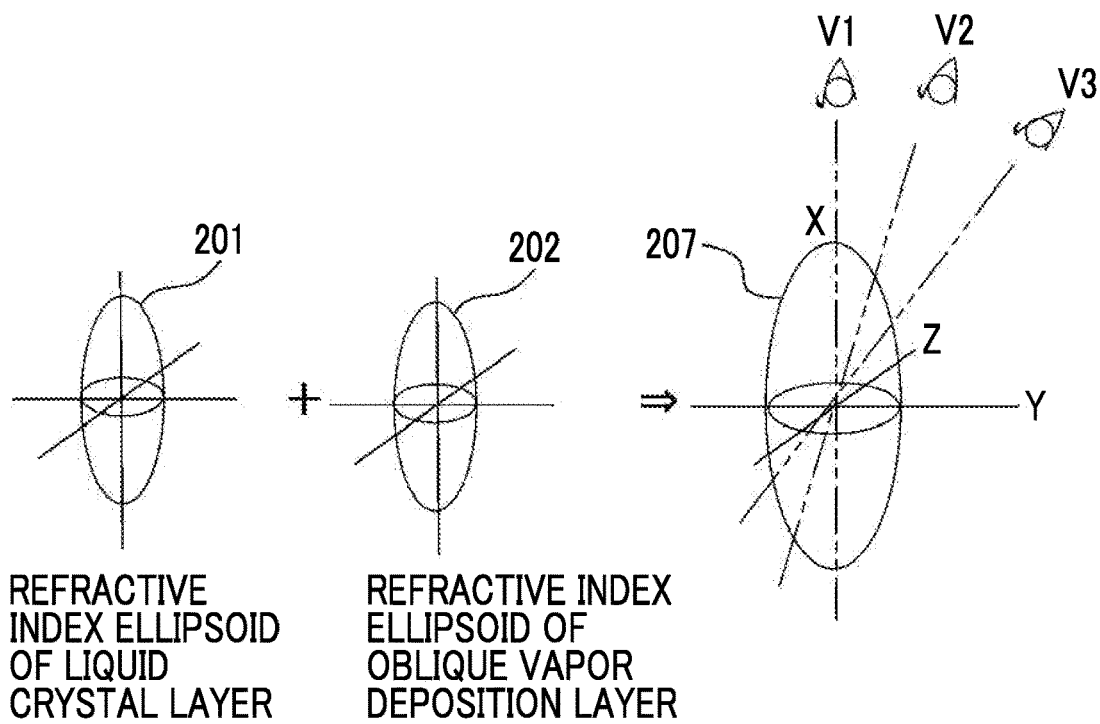
FIG. 15 is a conceptual diagram for explaining a phase difference compensation in the related art.

As shown in FIG. 15, a refractive index ellipsoid 201 having a VA mode liquid crystal layer 76 has a shape of a standing rugby ball (referred to as a vertical rugby ball).

In addition, the refractive index ellipsoid of the phase difference compensation element disclosed in JP4744606B and JP2009-75459A, exhibiting refractivity anisotropy, satisfies n1>n2>n3 and has a maximum principal refractive index in the extending direction of the columnar structure body. That is, as shown in FIGS. 12A to 12C, the refractive index ellipsoid 202 of the oblique vapor deposition layer in the related art has the shape of the vertical rugby ball, same as the refractive index ellipsoid 201 of the liquid crystal cell.

As shown in FIG. 15, a refractive index ellipsoid 207 obtained by combining the refractive index ellipsoid 201 of the liquid crystal layer 76, represented by the vertical rugby ball, and the refractive index ellipsoid 202 of the phase difference compensation element in the related art, represented by the vertical rugby ball, remains the vertical rugby ball and is not a spherical refractive index ellipsoid which is ideal for the phase difference compensation.

Figure 16:
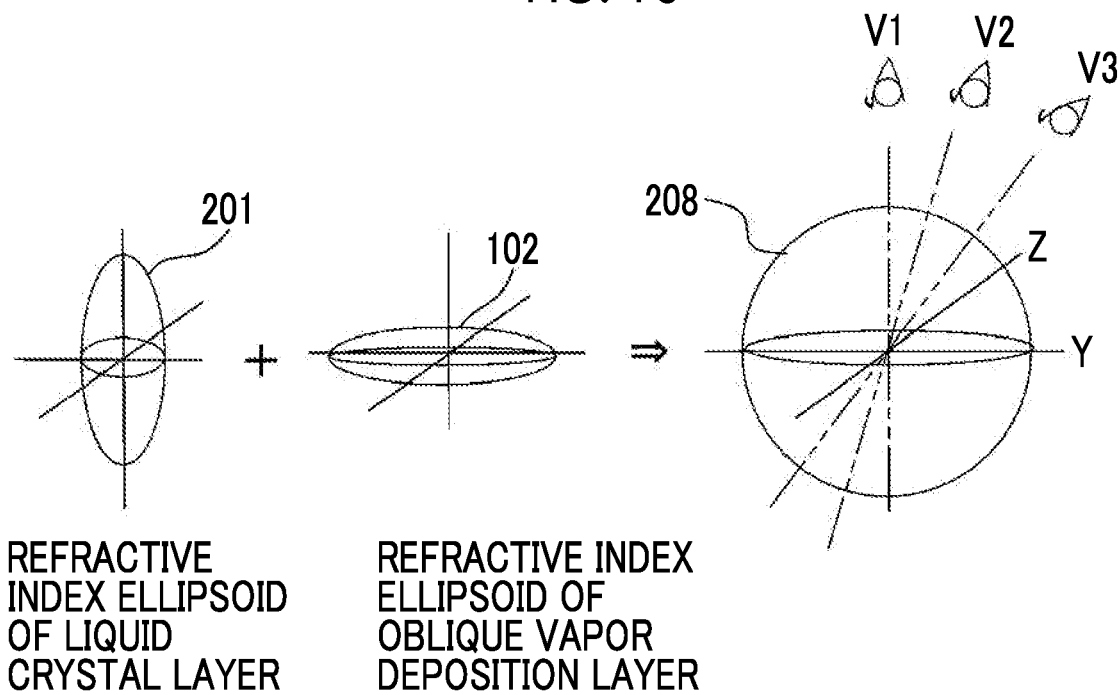
FIG. 16 is a conceptual diagram for explaining a phase difference compensation in the technology of the present disclosure.

On the other hand, as shown in FIG. 16, the refractive index ellipsoid 102 of the phase difference compensation element 20 according to the present embodiment has a fallen rugby ball shape in which the major axis of the rugby ball is horizontal (referred to as a horizontal rugby ball). Since the refractive index ellipsoid 201 of the liquid crystal layer 76, represented by the vertical rugby ball, and the refractive index ellipsoid 102 represented by the horizontal rugby ball are combined, a shape of a refractive index ellipsoid 208 obtained by the combination is more spherical than in the case of the phase difference compensation element in the related art. Therefore, a change in cross section of the refractive index elliptical shape observed in a case where viewpoint changes from V1 to V3 and the viewing angle changes is smaller than that in the related art, and the shape looks more circular. That is, the phase difference which occurs at any viewing angle (incidence angle) can be reduced. Accordingly, since the amount of light passing through the analyzer can be reduced at any viewing angle (incidence angle), the contrast is improved.

Even in a case where the oblique vapor deposition layer having a refractive index ellipsoid of n2>n1≥n3 is provided, due to the refractive index ellipsoid of the horizontal rugby ball, in a case of being combined with the refractive index ellipsoid 201 of the vertical rugby ball, the contrast can be improved as compared with the related art. However, in the case of the refractive index ellipsoid of n2>n3>n1, the shape of the refractive index ellipsoid obtained in combination with the refractive index ellipsoid of the vertical rugby ball can be more spherical that the case of n2>n1≥n3, and the effect of improving the contrast is high.

The phase difference compensation element according to the embodiment of the present disclosure is not limited to the configuration in which the phase difference film 26 includes only one oblique vapor deposition layer 25 as in the above-described phase difference compensation element 20, and the phase difference film 26 may include two or more oblique vapor deposition layers 25 laminated.

Figure 17:
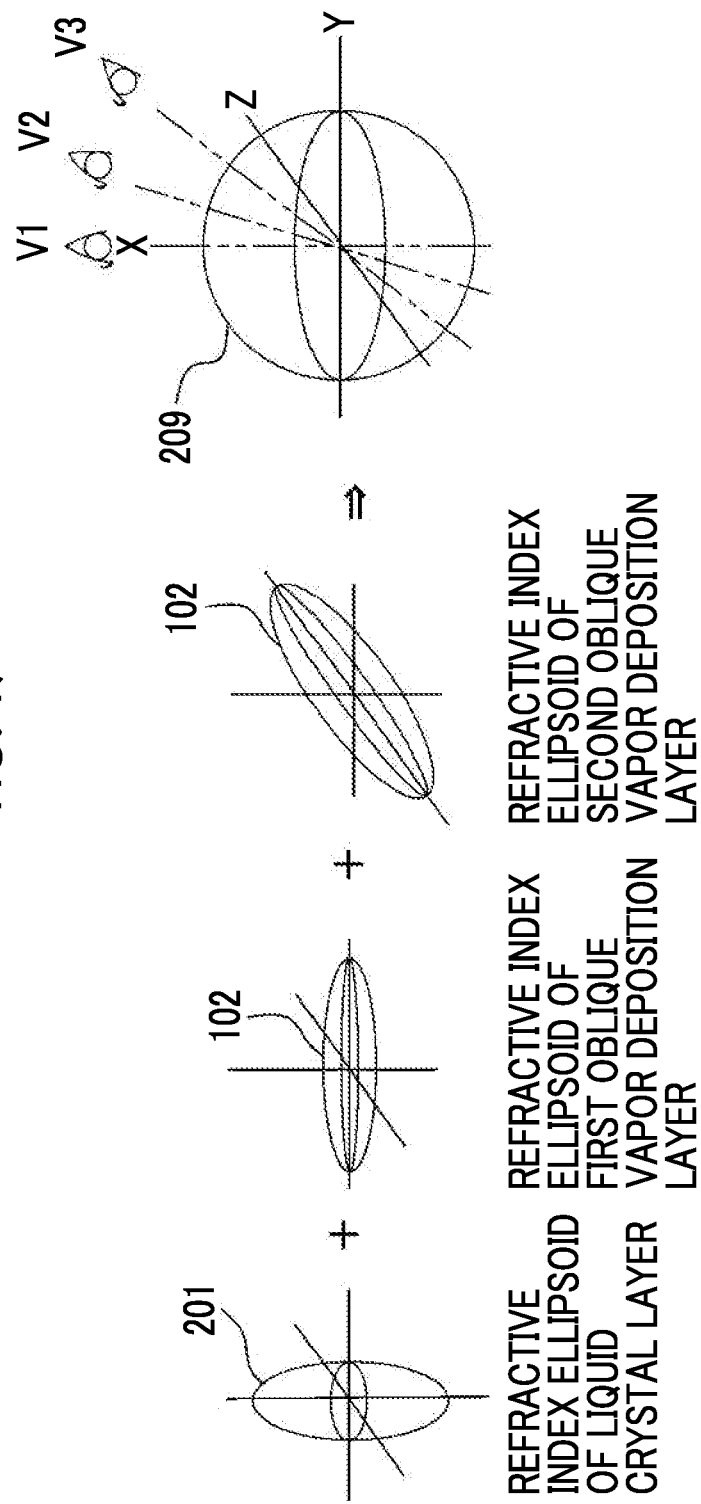
FIG. 17 is a conceptual diagram for explaining a phase difference compensation in the technology of the present disclosure.

In a case where two oblique vapor deposition layers are provided as in a phase difference compensation element according to a second embodiment described later, as shown in FIG. 17, in a case where a major axis of a refractive index ellipsoid of two oblique vapor deposition layers intersect each other, that is, in a case where the refractive index ellipsoids 102 of two horizontal rugby balls are arranged with their longitudinal directions intersecting each other, a shape of a refractive index ellipsoid 209 obtained in combination with the refractive index ellipsoid 201 of the liquid crystal layer can be brought closer to a spherical shape. That is, a higher effect of improving the contrast can be obtained.

Phase Difference Compensation Element According to Second Embodiment

As a phase difference compensation element according to a second embodiment, an aspect in which two layers of the oblique vapor deposition layer are provided will be described. In the following drawings, the same constitutional components as those in the above-described drawings are designated by the same reference numerals, and detailed description thereof will be omitted.

Figure 18:
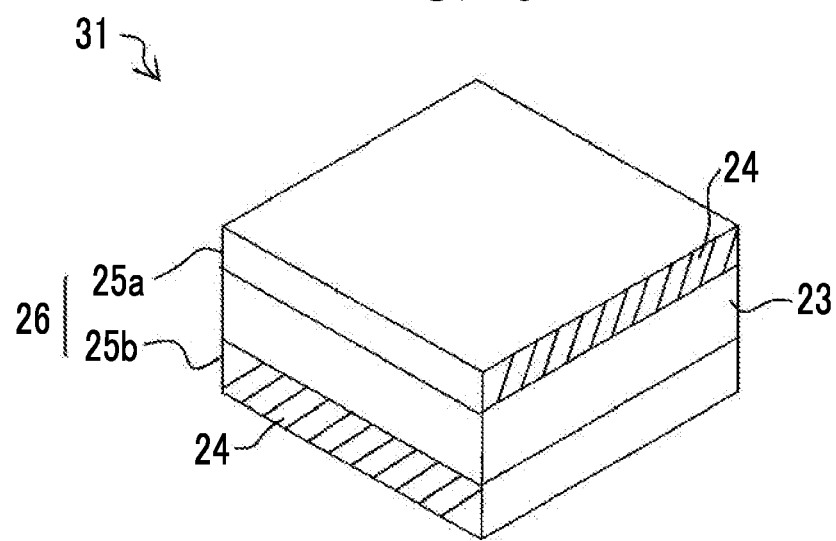
FIG. 18 is a perspective view of a phase difference compensation element according to a second embodiment.
Figure 19:
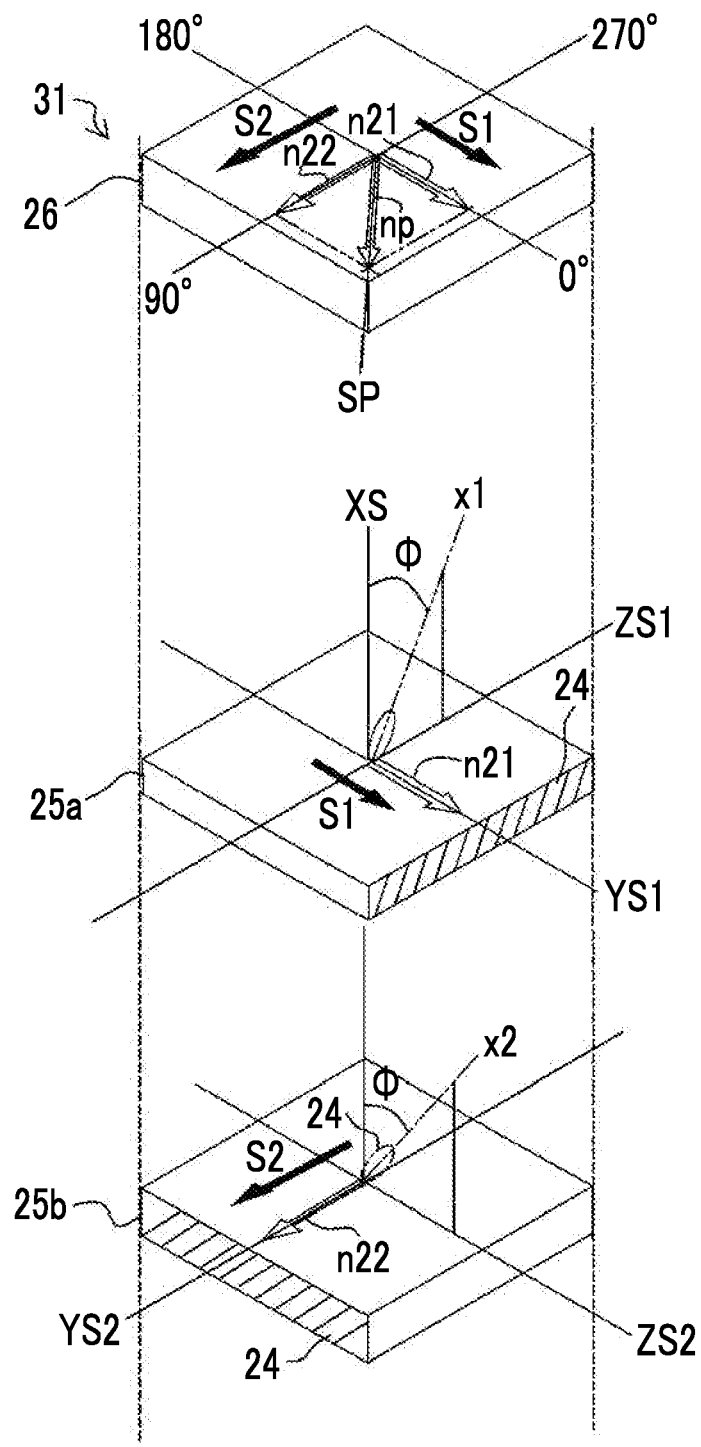
FIG. 19 is an explanatory diagram for explaining a slow axis of the phase difference compensation element according to the second embodiment.

As shown in FIG. 18, in the phase difference compensation element 31 according to the present embodiment, a first oblique vapor deposition layer 25a is provided on one surface of a substrate 23, and a second oblique vapor deposition layer 25b is provided on the other surface. That is, the phase difference film 26 includes the first oblique vapor deposition layer 25a and the second oblique vapor deposition layer 25b. FIG. 19 is an explanatory diagram of a slow axis of the phase difference film 26.

The first oblique vapor deposition layer 25a and the second oblique vapor deposition layer 25b in the present embodiment are produced in the same manner as the above-described oblique vapor deposition layer 25, and optical properties and the like are thereof also the same. That is, same as the oblique vapor deposition layer 25 shown in FIGS. 4A to 4C, since the first oblique vapor deposition layer 25a and the second oblique vapor deposition layer 25b have the columnar structure body 24 inclined with respect to the normal line of the substrate surface 23a, the first oblique vapor deposition layer 25a and the second oblique vapor deposition layer 25b exhibit the refractivity anisotropy represented by the biaxial refractive index ellipsoid as an optical characteristic. In three principal refractive indices n1, n2, and n3 in the refractive index ellipsoid, in a case where a principal refractive index of the columnar structure body 24 in the longitudinal direction 29 is defined as n1, and in an ellipse perpendicular to the longitudinal direction 29 of the columnar structure body 24, in a case where a principal refractive index in a major-axis direction is defined as n2 and a principal refractive index in a minor-axis direction is defined as n3, n2 is the largest among the three principal refractive indices. In addition, the major-axis direction is a direction in a plane of each of the oblique vapor deposition layers 25a and 25b, which is perpendicular to the axis obtained by projecting the longitudinal direction 29 of the columnar structure body 24 onto a surface of the oblique vapor deposition layers 25a and 25b. Hereinafter, with regard to the principal refractive index n2, in a case of distinguishing between the first oblique vapor deposition layer 25a and the second oblique vapor deposition layer 25b, a sub-reference numeral 1 or 2 is attached to distinguish between principal refractive indices n21 and n22.

Here, as shown in FIG. 19, an orientation is set such that the orientation of the slow axis SP of the phase difference film 26 is 45°. In the first oblique vapor deposition layer 25a, a major-axis direction YS1 indicating the maximum principal refractive index n21 of the refractive index ellipsoid is a direction perpendicular to a ZS1-axis obtained by projecting an x1-axis along the longitudinal direction of the columnar structure body onto the film surface. A slow axis S1 of the first oblique vapor deposition layer 25a is along the major-axis direction YS1. Here, the slow axis S1 of the first oblique vapor deposition layer 25a is set to 90°, 180°, and 270° clockwise with an orientation of 0°.

In the second oblique vapor deposition layer 25b, a major-axis direction YS2 indicating the maximum principal refractive index n22 of the refractive index ellipsoid is a direction perpendicular to a ZS2-axis obtained by projecting an x2-axis along the longitudinal direction of the columnar structure body onto the film surface. A slow axis S2 of the second oblique vapor deposition layer 25b is along the major-axis direction YS2. In the example shown in FIG. 19, the second oblique vapor deposition layer 25b is disposed such that the slow axis S2 has an orientation of 90°. However, it is preferable that the second oblique vapor deposition layer 25b is disposed such that the slow axis S2 deviates from the orientation of 90° by approximately ±3°. By slightly displacing the slow axes S1 and S2 of the first oblique vapor deposition layer 25a and the second oblique vapor deposition layer 25b from perpendicular to each other, a front phase difference can be generated, and a component of the front phase difference of the liquid crystal layer 76 can be compensated. It is preferable that the slow axis S2 of the second oblique vapor deposition layer 25b deviates from the orientation of 90° by ±3°, but the deviation amount is not limited to ±3°.

The slow axis SP of the phase difference film 26 of the phase difference compensation element 31 is parallel to a combined vector np which is obtained by combining a directional vector n21 along the major-axis direction YS1, having a magnitude of n21 which is the maximum principal refractive index in the first oblique vapor deposition layer 25a, and a directional vector n22 along the major-axis direction YS2, having a magnitude of n22 which is the maximum principal refractive index in the second oblique vapor deposition layer 25b.

Figure 20:
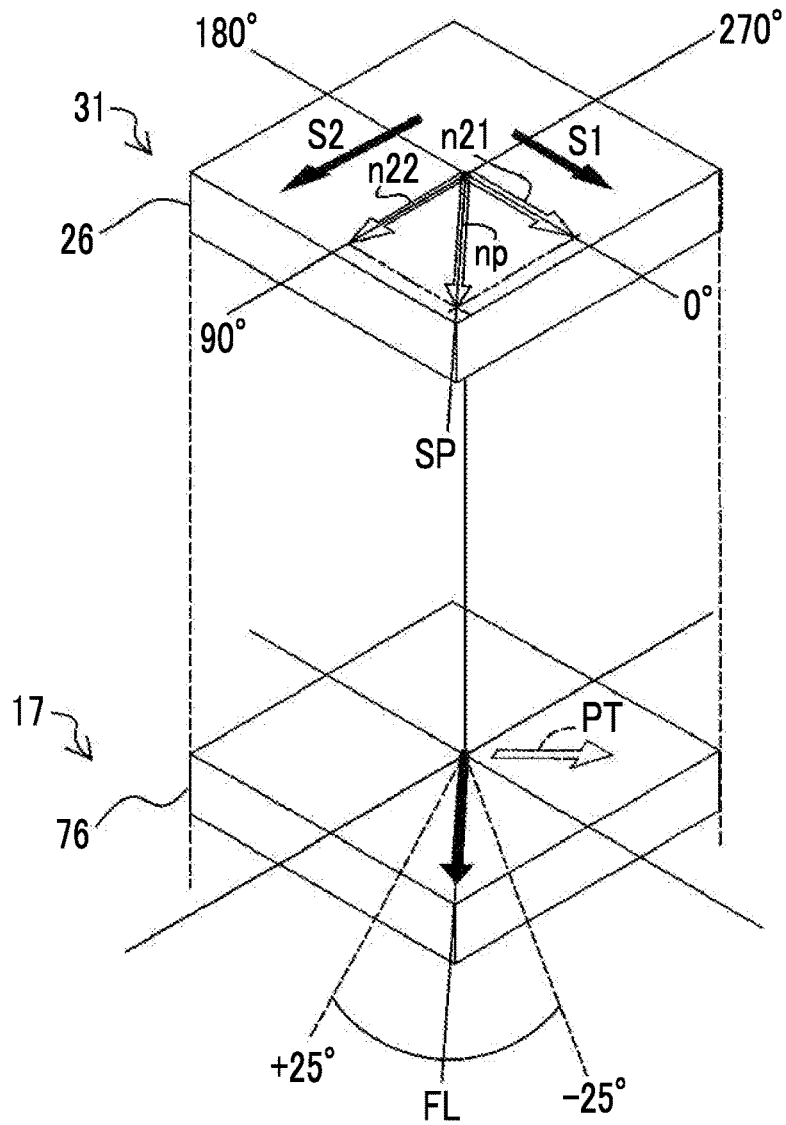
FIG. 20 is a diagram showing a relationship between the slow axis of the oblique vapor deposition layer and a fast axis of the liquid crystal layer with regard to the phase difference compensation element according to the second embodiment.

In the liquid crystal display element 10, the phase difference compensation element 31 having the oblique vapor deposition layers 25a and 25b as described above is disposed in an aspect in which an intersecting angle between the slow axis SP of the phase difference film 26 as shown in FIG. 20 and the fast axis FL of the liquid crystal layer 76, which is a direction perpendicular the tilt orientation of the liquid crystal molecules 75, is −25° to +25°. That is, the slow axis SP of the phase difference compensation element 31 coincides with the fast axis FL of the liquid crystal layer 76 within a range of ±25. As a result, as described above, the phase difference caused by the pre-tilt of the liquid crystal molecules 75 and the phase difference caused by the phase difference compensation element 31 have opposite polarities, so that the phase difference can be compensated.

In addition, as shown in FIGS. 19 and 20, it is preferable that the first oblique vapor deposition layer 25a and the second oblique vapor deposition layer 25b are arranged so that the slow axes S1 and S2 intersect each other with a deviation of approximately ±3° from the orthogonal. It is preferable that, with the refractive index ellipsoid of the horizontal rugby ball of the first oblique vapor deposition layer 25a and the refractive index ellipsoid of the horizontal rugby ball of the second oblique vapor deposition layer 25b, the first oblique vapor deposition layer 25a and the second oblique vapor deposition layer 25b are arranged so that the refractive index ellipsoid as the phase difference film 26 has a shape close to a bread roll. In a case where the refractive index ellipsoid as the phase difference film 26 is a bread roll shape, the refractive index ellipsoid as a whole is more spherical in a case of being combined with the refractive index ellipsoid of the vertical rugby ball of the liquid crystal layer 76, so that the contrast can be further enhanced (see FIG. 17).

Example of Design Modification

An example of design modification of the phase difference compensation element provided with the two-layer oblique vapor deposition layer will be described with reference to FIGS. 21 to 23. In addition, in FIGS. 21 and 23, the same elements as the constitutional components described above are designated by the same reference numerals.

Figure 21:
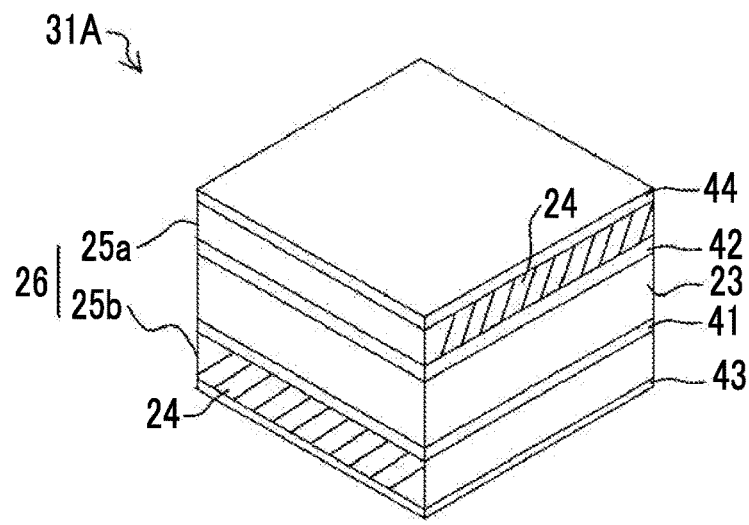
FIG. 21 is a diagram showing a phase difference compensation element which is provided with an oblique vapor deposition layer of one layer on both surfaces one by one and is provided with an antireflection film.

In the above-described phase difference compensation element 31 according to the second embodiment, as a phase difference compensation element 31A shown in FIG. 21, it is preferable that antireflection films 41 and 42 are provided on both surfaces of the substrate 23 and antireflection films 43 and 44 are provided on one surface of the first oblique vapor deposition layer 25a and on one surface of the second oblique vapor deposition layer 25b, the surfaces being the outermost surfaces of the phase difference compensation element 31, respectively. By providing the antireflection films 41, 42, 43, and 44, it is possible to suppress reflection of the incidence light at each interface and increase the transmittance.

Figure 22:
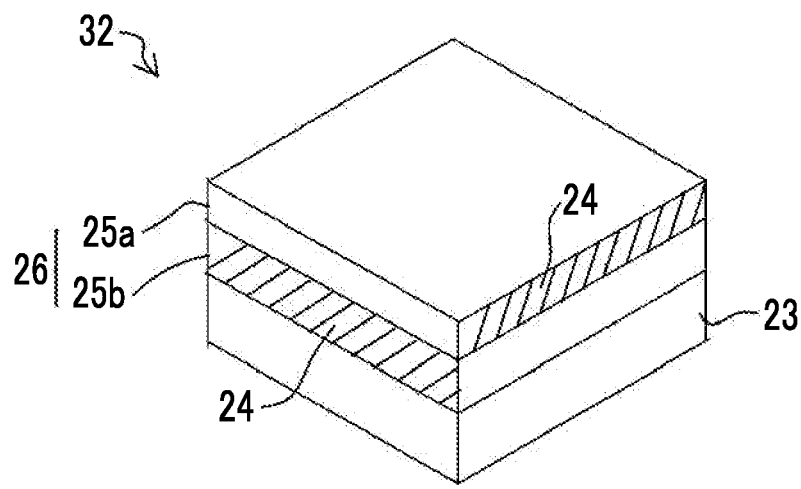
FIG. 22 is a diagram showing a phase difference compensation element provided with a two-layer oblique vapor deposition layer on one surface.
Figure 23:
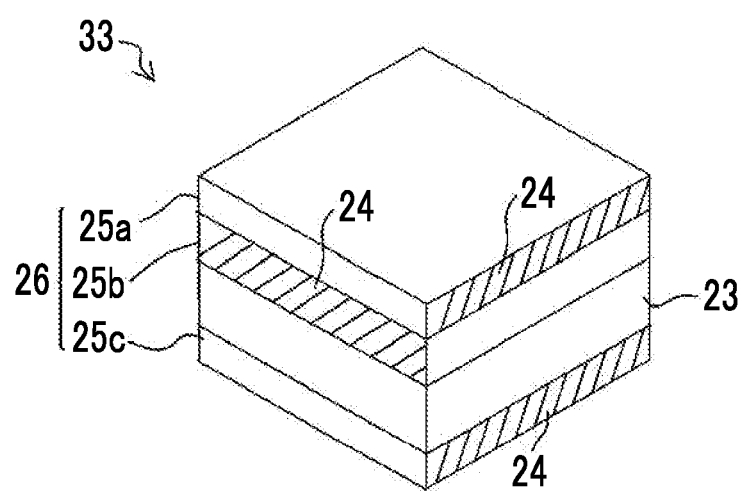
FIG. 23 is a diagram showing a layer configuration of an example of a phase difference compensation element provided with a three-layer oblique vapor deposition layer.

As an aspect in which two or more layers of the oblique vapor deposition layer 25 are laminated, as a phase difference compensation element 32 shown in FIG. 22, the two-layer oblique vapor deposition layers 25a and 25b may be formed on one surface of the substrate 23.

Even in a case where the two-layer oblique vapor deposition layers 25a and 25b are laminated on one surface of the substrate 23, it is preferable that both surfaces of the substrate 23 and one surface of the first oblique vapor deposition layer 25a, which is the outermost surface of the phase difference compensation element 32, are provided with antireflection films, respectively.

In the above description, the phase difference compensation elements 31, 31A, and 32 in which two layers of the oblique vapor deposition layer 25 are laminated have been described, but in the phase difference compensation element according to the present disclosure, the oblique vapor deposition layer 25 may be laminated in three or more layers. For example, as a phase difference compensation element 33 shown in FIG. 23, the oblique vapor deposition layers 25a and 25b are provided on one surface of the substrate 23, and an oblique vapor deposition layer 25c may be provided on the other surface.

The slow axis SP of the phase difference film 26 having three oblique vapor deposition layers 25 is parallel to a combined vector which is obtained by combining a directional vector along the major-axis direction, having the largest magnitude of the principal refractive index of the first oblique vapor deposition layer 25a, a directional vector along the major-axis direction, having the largest magnitude of the principal refractive index of the second oblique vapor deposition layer 25b, and a directional vector along the major-axis direction, having the largest magnitude of the principal refractive index of the third oblique vapor deposition layer 25c. The phase difference compensation element 33 is disposed such that an angle between the slow axis SP of the phase difference film 26 and the fast axis FL of the liquid crystal layer 76 is within a range of ±25°. As a result, the phase difference caused by the pre-tilt of the liquid crystal molecules 75 and the phase difference caused by the phase difference compensation element 33 have opposite polarities, so that the phase difference caused by the pre-tilt can be compensated.

Phase Difference Compensation Element According to Third Embodiment

In the above description, a phase difference compensation element having one or two or more layers of the oblique vapor deposition layer laminated has been described, but it is preferable that the phase difference compensation element may include not only the oblique vapor deposition layer but also a C-plate. As a phase difference compensation element according to a third embodiment, a case where the phase difference film includes a C-plate will be described.

Figure 24:
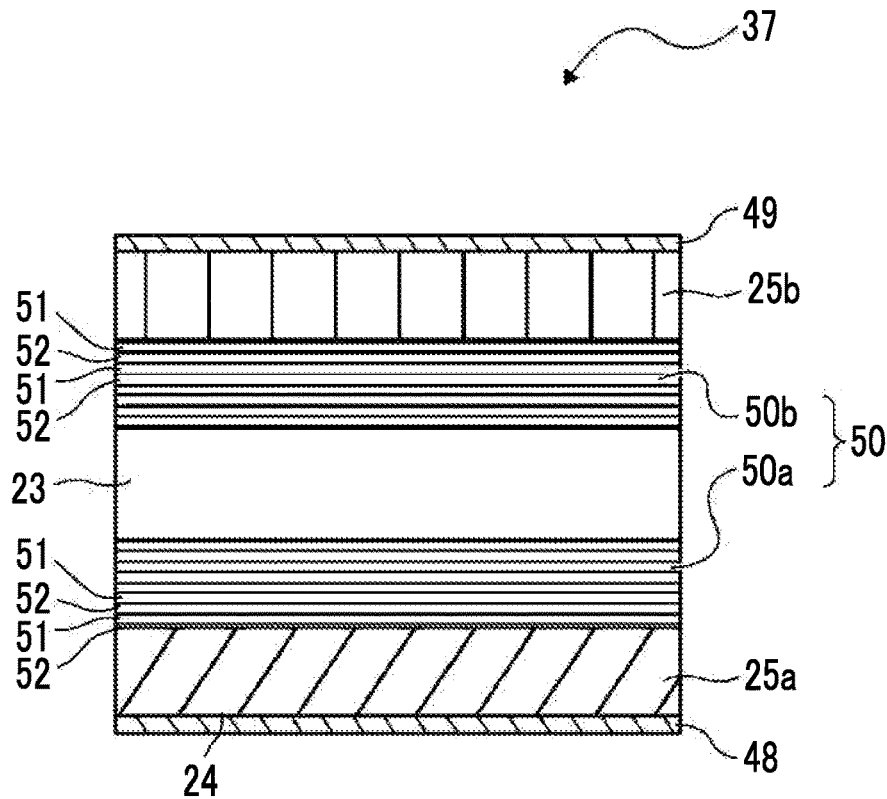
FIG. 24 is an explanatory diagram of a phase difference compensation element provided with a C-plate.

As shown in FIG. 24, a phase difference compensation element 37 according to the present embodiment includes a substrate 23, a C-plate 50, oblique vapor deposition layers 25a and 25b, and antireflection films 48 and 49. The C-plate 50 includes a first C-plate layer 50a provided on both surfaces of the substrate 23 and a second C-plate layer 50b. The first oblique vapor deposition layer 25a is provided on the first C-plate layer 50a, and the antireflection film 48 is provided on the first oblique vapor deposition layer 25a. In addition, the second oblique vapor deposition layer 25b is provided on the second C-plate layer 50b, and the antireflection film 49 is provided on the second oblique vapor deposition layer 25b.

As shown in FIG. 24, the C-plate 50 is a structural birefringence body composed of a multilayer thin film in which a layer 51 of high refractive index and a layer 52 of low refractive index are alternately laminated. The layer 51 of high refractive index is a thin film formed of a high refractive index material having a relatively high refractive index. The layer 52 of low refractive index is a thin film formed of a low refractive index material having a relatively low refractive index. The C-plate 50 exhibits no phase difference with respect to light which is perpendicularly incident in the plane, that is, light which is incident at an incidence angle of 0°, but has refractivity anisotropy which generates a phase difference with respect to light obliquely incident at an incidence angle of other than 0°.

Same as the second embodiment, the phase difference compensation element 37 including the two oblique vapor deposition layers 25a and 25b is disposed such that a synthetic slow axis SP coincides with the fast axis FL of the liquid crystal layer 76 (see FIG. 20). In this case, since phases of both are opposite to each other, the phase difference generated in the liquid crystal layer 76 can be compensated by the phase difference compensation element 37. Furthermore, in a case where the absolute value of the phase difference in the fast-axis orientation of the liquid crystal layer 76 and the phase difference in the slow-axis orientation of the phase difference compensation element 37 are the same, it is possible to satisfactorily compensate for the phase difference in the fast-axis orientation of the liquid crystal layer. Specifically, in a case where a direction perpendicular to the pre-tilt orientation of the liquid crystal layer 76 (that is, the fast axis of the liquid crystal layer 76) is at an orientation of 45°, a phase of the liquid crystal layer 76 at the orientation of 45° and a phase of the phase difference compensation element 37 at the orientation of 45° are opposite to each other, and in a case where the absolute values of the phase differences match, the phase difference at the orientation of 45° can be more preferably compensated.

In a case where the phase difference values of the liquid crystal layer 76 and the phase difference compensation element at the orientation of 45° do not match, it is preferable to compensate for the difference between the two with the C-plate. For example, in a case where the phase difference value of the liquid crystal layer at a polar angle of 15° and an orientation of 45° is defined as α, the phase difference value of the phase difference compensation element 37 at an incidence angle of 15° and an orientation of 45° is defined as b, and a>b, it is preferable to compensate for the difference a−b with a C-plate having a phase difference value c (=b−a) at the incidence angle of 15° and the orientation of 45°.

Figure 34:
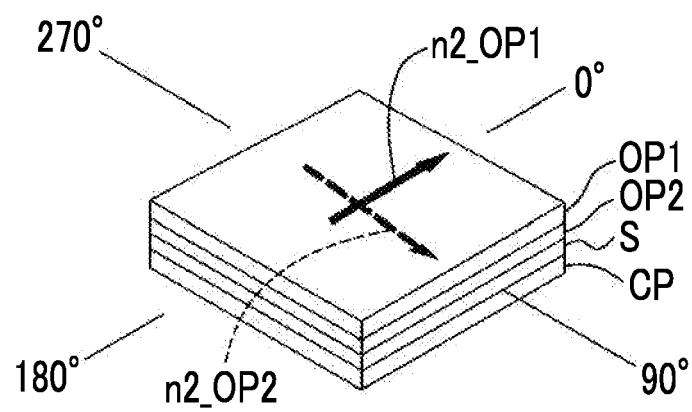
FIG. 34 is a perspective view showing a layer configuration of a phase difference compensation element of Test Example 2.

In a case of including the C-plate 50, a double-side type in which the first C-plate layer 50a and the second C-plate layer 50b are formed on both surfaces of the substrate 23 may be provided as the phase difference compensation element 37 of FIG. 24, or a single-side type in which the C-plate 50 is formed only one surface of the substrate 23 may be provided (see FIG. 34). In a case of the double-side type, the first C-plate layer 50a and the second C-plate layer 50b function as one C-plate 50. In addition, it is preferable that the C-plate 50 has an antireflection function in addition to the phase difference compensation function. The antireflection function can be incorporated into each of the multilayer films constituting the first C-plate layer 50a, the second C-plate layer 50b, and the C-plate 50. It is not necessary to separately provide an antireflection film between the substrate 23 and the C-plate 50 and between the C-plate 50 and the oblique vapor deposition layer 25, and the phase difference compensation element 37 can be made thinner.

In a case where the phase difference film 26 includes a plurality of oblique vapor deposition layers 25 as in the second embodiment and the third embodiment, an orientation of the slow axis is defined as ηs, and with respect to the surface of the oblique vapor deposition layer, a phase difference value with respect to light having a wavelength of 550 nm, which is incident at the orientation of ηs and a polar angle of 15°, is defined as A, and a phase difference value Re(15)(ηs+180) at an orientation of ηs+180° and the polar angle of 15° is defined as β. In this case, it is preferable that a phase difference value Re(15)(ηs+60) at an orientation of ηs+60° and the polar angle of 15° and a phase difference value Re(15)(ηs−60) at an orientation of ηs−60° and the polar angle of 15° are within a range of (A/2−β)±5 nm. All phase difference values are values with respect to light having a wavelength of 550 nm. It is more preferable that Re(15)(ηs+60) and Re(15)(ηs−60) are within a range of (A/2−β)±3 nm, and it is particularly preferable to be within a range of (A/2−β)±1 nm.

A trial product example of the phase difference compensation element including two oblique vapor deposition layers satisfying the above-described conditions will be described. Here, trial product examples 1 to 7 of the phase difference compensation element 31 provided with one layer of each of the oblique vapor deposition layers 25a and 25b on both surfaces of the substrate 23 as shown in FIG. 18 are produced. The two oblique vapor deposition layers 25a and 25b are laminated so that an open angle between the slow axes S1 and S2 of the two layers is 93°. The vapor deposition method is the same as that of the oblique vapor deposition layer E1 described above, and the trial product examples 1 to 7 having different front phase difference values are produced by changing a phase difference film thickness. In the trial product examples 1 to 7, a front phase difference value Re(0) of each oblique vapor deposition layer is changed from 32 nm to 20 nm. In the two oblique vapor deposition layers, a layer disposed on the light incidence side is referred to as a first oblique vapor deposition layer, and a layer disposed on the light emission side is referred to as a second oblique vapor deposition layer.

Figure 25:
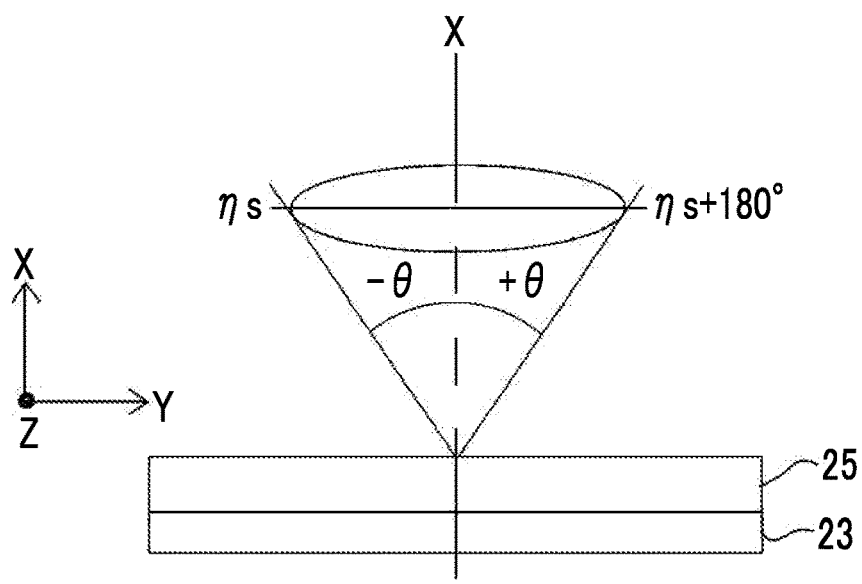
FIG. 25 is an explanatory diagram of a measuring method for a phase difference pattern.
Figure 26:
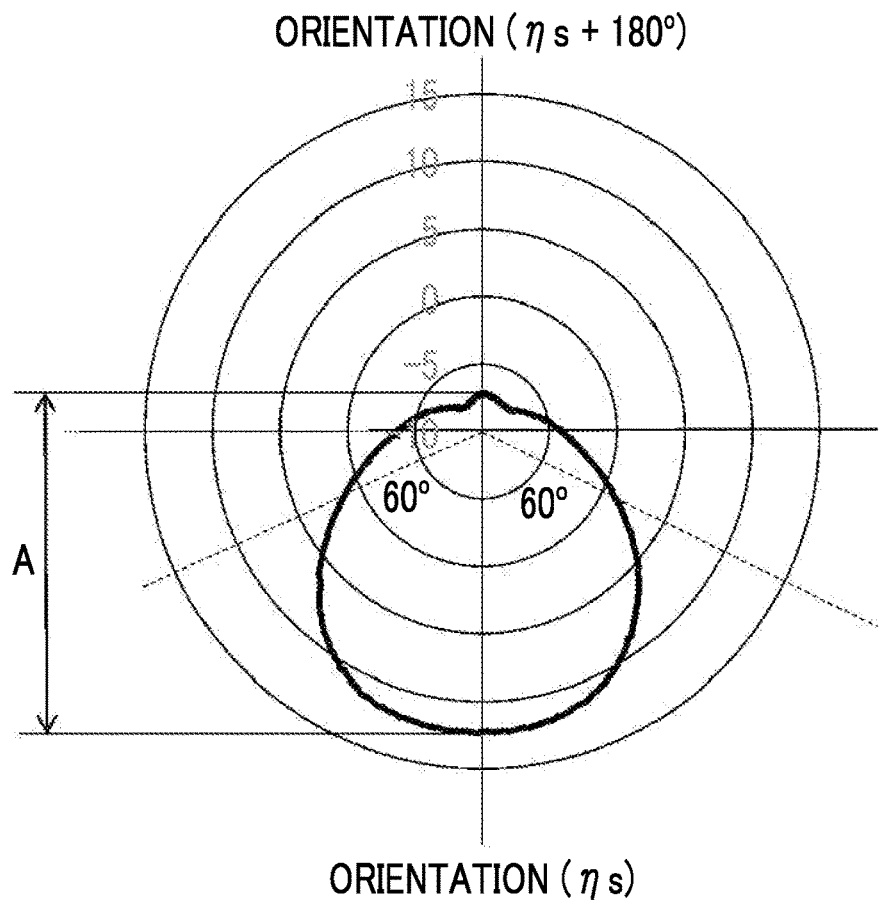
FIG. 26 is a diagram showing a phase difference pattern of a trial product example 1.

Each trial product example is measured using an Axoscan high-speed and high-accuracy Mueller matrix polarimeter of Axometrics, Inc. As shown in FIG. 25, a phase difference pattern showing azimuthal angle dependence of a phase difference value Re(15) at a polar angle of 15°, which is obtained by changing an azimuthal angle ηs by 360° from the polar angle θ15° with respect to the phase difference compensation element, is measured. A measurement wavelength is set to 550 nm. FIG. 26 is a phase difference pattern of the phase difference compensation element of the trial product example 1.

The phase difference pattern shown in FIG. 26 has a shape which is line-symmetrical with respect to the slow-axis orientation ηs, and has an elliptical shape which is close to a circle. In a case of having such a phase difference pattern, performance tolerance in a case where the phase difference compensation element deviates in axis with respect to the liquid crystal cell is higher than that of the phase difference compensation element in the related art (see Test Example 8 described later). A phase difference pattern having the same shape is obtained for the trial product examples 2 to 7.

The phase difference value Re(θ) is Re(θ)=(na−nb)×d/λ. Here, na is a refractive index of the orientation to be measured, nb is a refractive index of the orientation perpendicular to the orientation to be measured, d is a film thickness, and λ is the measurement wavelength. A negative value in FIG. 26 means that the phase difference value of the orientation of nb is measured in a case of na>nb.

With regard to each of the trial product examples 1 to 7, Table 4 shows the front phase difference value Re(0) of the first oblique vapor deposition layer, the front phase difference value Re(0) of the second oblique vapor deposition layer, a phase difference value Re(15)ηs=α at the slow-axis orientation ηs, a phase difference value Re(15)(ηs+180)=β at the orientation ηs+180°, a phase difference value D=A/2−β, a phase difference value Re(15)(ηs+60)=B at the orientation ηs+60°, and a phase difference value Re(15)(ηs−60)=C at the orientation ηs−60°. Here, A=α−β (see FIG. 26). In addition, Table 4 shows the results of calculation of Δ1=D−B and Δ2=D−C for each of them.

side, the C-plate 50 is provided on the surface of the second oblique vapor deposition layer 25b are produced. The two oblique vapor deposition layers 25a and 25b are laminated so that an open angle between the slow axes of the two layers is 93°. The vapor deposition method of the first oblique vapor deposition layer 25a and the second oblique vapor deposition layer 25b is the same as that of the oblique vapor deposition layer E1 described above, and the front phase difference value is changed by changing a film thickness. In the trial product examples 11 to 17, a front phase difference value Re(0) of each of the oblique vapor deposition layer 25a and 25b is changed from 32 nm to 20 nm. In a case where a slow-axis orientation of the phase difference film 26 is defined as ηs, the C-plate 50 is designed so that a phase difference value Re(15) at a polar angle of 15° is approximately 0 at an orientation of ηs+180°. For the C-plate 50, the phase difference value Re(30) at a polar angle of 30° is shown in the table.

Figure 28:
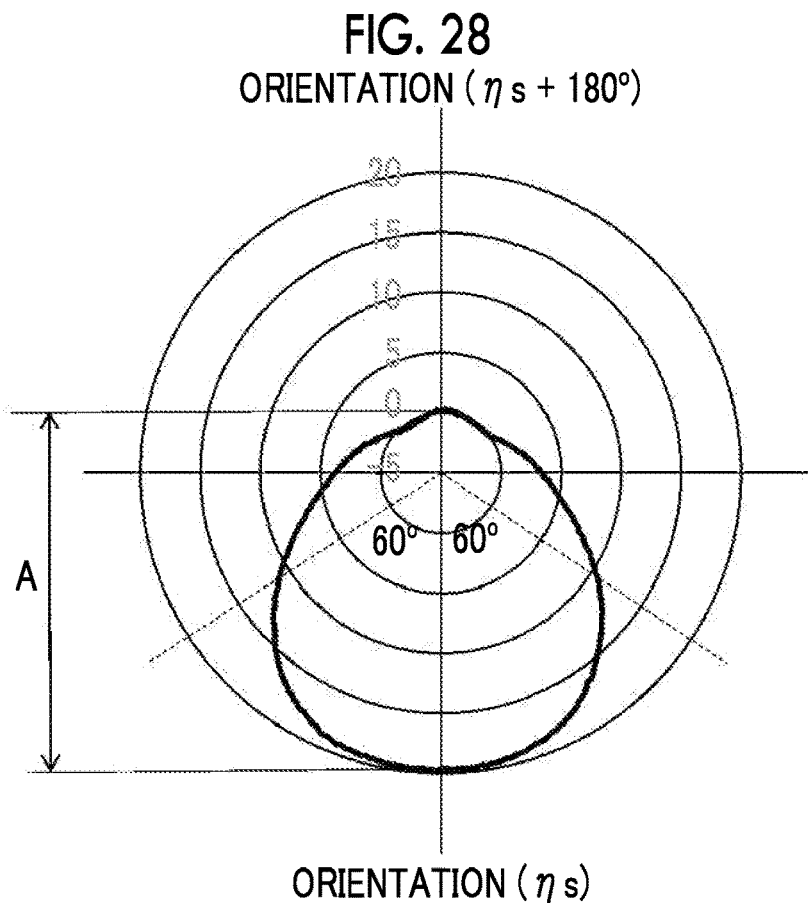
FIG. 28 is a diagram showing a phase difference pattern of the trial product example 11.

For each trial product example, the phase difference pattern is measured in the same manner as in the trial product examples 1 to 7. FIG. 28 is a phase difference pattern of the trial product example 11.

The phase difference pattern shown in FIG. 28 also has a shape which is line-symmetrical with respect to the slow-axis orientation ηs, and has an elliptical shape which is close to a circle. In a case of having such a phase difference pattern, performance tolerance in a case where the phase difference compensation element deviates in axis with respect to the liquid crystal cell is higher than that of the phase difference compensation element in the related art (see Test Example 8 described later). A phase difference pattern having the same shape is obtained for the trial product examples 12 to 17.

TABLE 4

|  | Trial product example 1 | Trial product example 2 | Trial product example 3 | Trial product example 4 | Trial product example 5 | Trial product example 6 | Trial product example 7 |
| --- | --- | --- | --- | --- | --- | --- | --- |
| Front phase difference Re(0) ηs of first oblique vapor deposition layer [nm] | 32 | 30 | 28 | 26 | 24 | 22 | 20 |
| Front phase difference Re(0) ηs of second oblique vapor deposition layer [nm] | 32 | 30 | 28 | 26 | 24 | 22 | 20 |
| Re(15)ηs = α [nm] | 12.4 | 11.6 | 10.8 | 10.3 | 9.3 | 8.5 | 7.7 |
| Re(15)(ηs + 180) = β [nm] | −7.9 | −7.4 | −6.9 | −6.4 | −5.9 | −5.4 | −4.9 |
| D = A/2 − β [nm] | 2.3 | 2.1 | 2.1 | 2.0 | 1.7 | 1.6 | 1.4 |
| Re(15)(ηs + 60) = B [nm] | 2.8 | 2.6 | 2.4 | 2.3 | 2.1 | 1.9 | 1.7 |
| Re(15)(ηs − 60) = C [nm] | 2.1 | 1.9 | 1.8 | 1.6 | 1.5 | 1.4 | 1.3 |
| Δ1 = D − B [nm] | −0.2 | −0.5 | −0.3 | −0.3 | −0.4 | −0.3 | −0.3 |
| Δ2 = D − C [nm] | 0.2 | 0.2 | 0.3 | 0.4 | 0.2 | 0.2 | 0.1 |

As shown in Table 4, Δ1 and Δ2 satisfy ±5 nm, and in this example, satisfy ±1 nm, which is particularly preferable. That is, Re(15)(ηs+60) and Re(15)(ηs−60) are within the range of (A/2−β)±1 nm.

Figure 27:
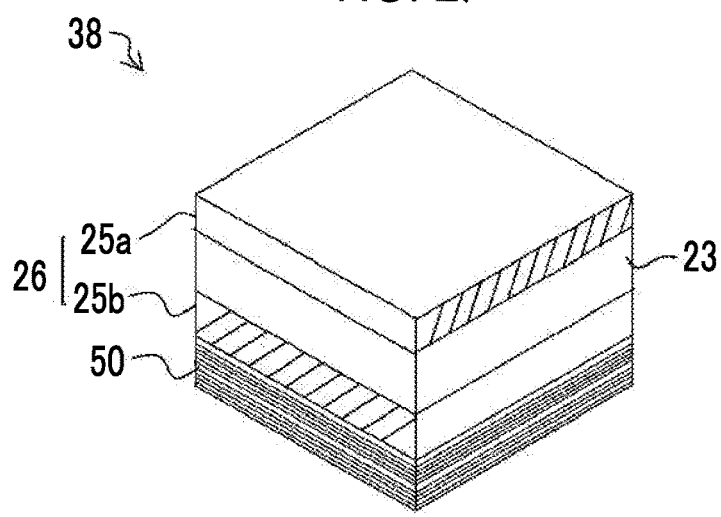
FIG. 27 is a diagram showing a layer configuration of trial product examples 11 to 17.

Next, a trial product example of a phase difference compensation element 38 including two oblique vapor deposition layers 25a and 25b and the C-plate 50 will be described. Here, trial product examples 11 to 17 of the phase difference compensation element 38 in which, as shown in FIG. 27, both surfaces of the substrate 23 are each provided with one layer of the oblique vapor deposition layer 25a or 25b, and in a case where the first oblique vapor deposition layer 25a is on the light incidence side and the second oblique vapor deposition layer 25b is on the light emission With regard to each of the trial product examples 11 to 17, Table 5 shows the phase difference value Re(30) of the C-plate at the polar angle of 30°, the front phase difference value Re(0) of the first oblique vapor deposition layer, the front phase difference value Re(0) of the second oblique vapor deposition layer, a phase difference value Re(15)ηs=α at the slow-axis orientation ηs, a phase difference value Re(15)(ηs+180)=R at the orientation ηs+180°, a phase difference value D=A/2−β, a phase difference value Re(15)(ηs+60)=B at the orientation ηs+60°, and a phase difference value Re(15)(ηs−60)=C at the orientation ηs−60°. Here, A=α−β. In addition, Table 5 shows the results of calculation of Δ1=D−B and Δ2=D−C for each of them.

TABLE 5

| | Trial product example 11 | Trial product example 12 | Trial product example 13 | Trial product example 14 | Trial product example 15 | Trial product example 16 | Trial product example 17 |
|---|---|---|---|---|---|---|---|
| Re(30) of C-plate [nm] | 28 | 26 | 26 | 24 | 22 | 20 | 18 |
| Front phase difference Re(0) ηs of first oblique vapor deposition layer [nm] | 32 | 30 | 28 | 26 | 24 | 22 | 20 |
| Front phase difference Re(0) ηs of second oblique vapor deposition layer [nm] | 32 | 30 | 28 | 26 | 24 | 22 | 20 |
| Re(15)ηs = α [nm] | 19.8 | 18.5 | 17.7 | 16.4 | 15.1 | 13.8 | 12.5 |
| Re(15)(ηs + 180) = β [nm] | −0.4 | −0.5 | 0.0 | 0.0 | −0.1 | 0.0 | 0.0 |
| D = A/2 − β [nm] | 10.1 | 9.5 | 8.9 | 8.2 | 7.5 | 6.9 | 6.2 |
| Re(15)(ηs + 60) = B [nm] | 10.2 | 9.5 | 9.3 | 8.6 | 7.7 | 7.2 | 6.5 |
| Re(15)(ηs − 60) = C [nm] | 9.5 | 8.8 | 8.7 | 8.0 | 7.4 | 6.7 | 6.0 |
| Δ1 = D − B [nm] | −0.1 | 0.0 | 1.0 | −0.4 | −0.2 | −0.3 | −0.3 |
| Δ2 = D − C [nm] | 0.6 | 0.7 | 0.2 | 0.2 | 0.1 | 0.2 | 0.2 |

As shown in Table 5, Δ1 and Δ2 satisfy ±5 nm, and in this example, satisfy ±1 nm, which is particularly preferable. That is, Re(15)(ηs+60) and Re(15)(ηs−60) are within the range of (A/2−β)±1 nm.

All of the phase difference compensation elements 21, 31, 31A, 32, 33, 37, and 38 according the embodiments described above can be applied to the liquid crystal display element 10. Hereinafter, a liquid crystal projector 110 including the liquid crystal display element 10 will be described.

Liquid Crystal Projector

Figure 29:
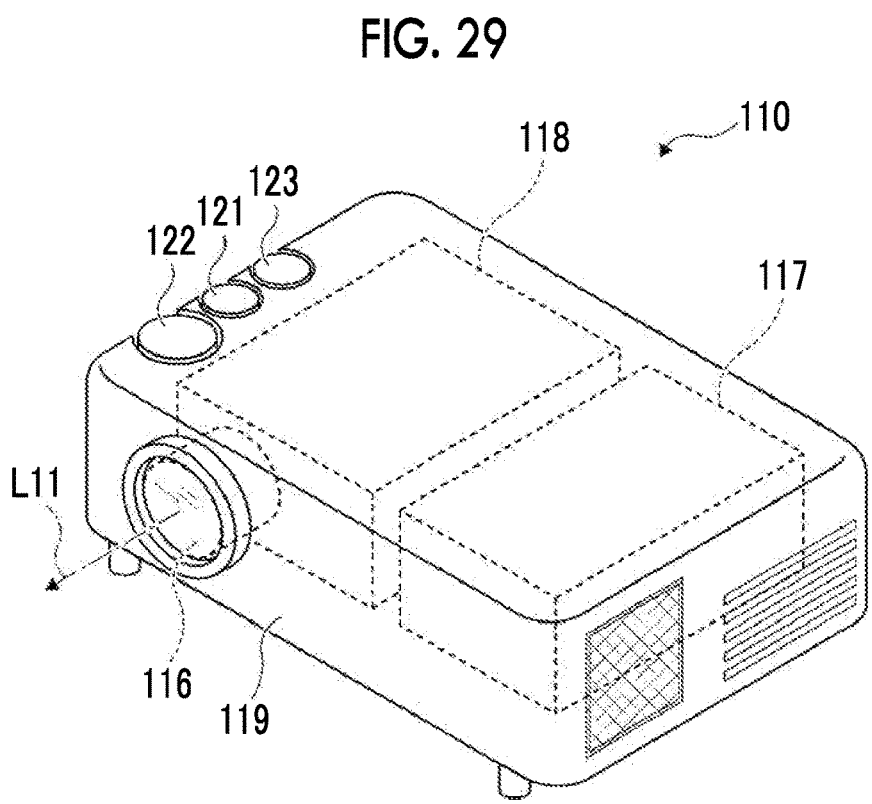
FIG. 29 is a perspective view showing an appearance of a liquid crystal projector.

As shown in FIG. 29, the liquid crystal projector 110 according to the present disclosure includes a projection lens 116, a projector driving unit 117, and a display optical system 118.

In addition, the liquid crystal projector 110 includes a zoom dial 121, a focus dial 122, a light quantity adjustment dial 123, and the like on an upper surface of a housing 119. Furthermore, a connection terminal (not shown) for connecting an external apparatus such as a computer is provided on a back surface of the housing 119.

Figure 30:
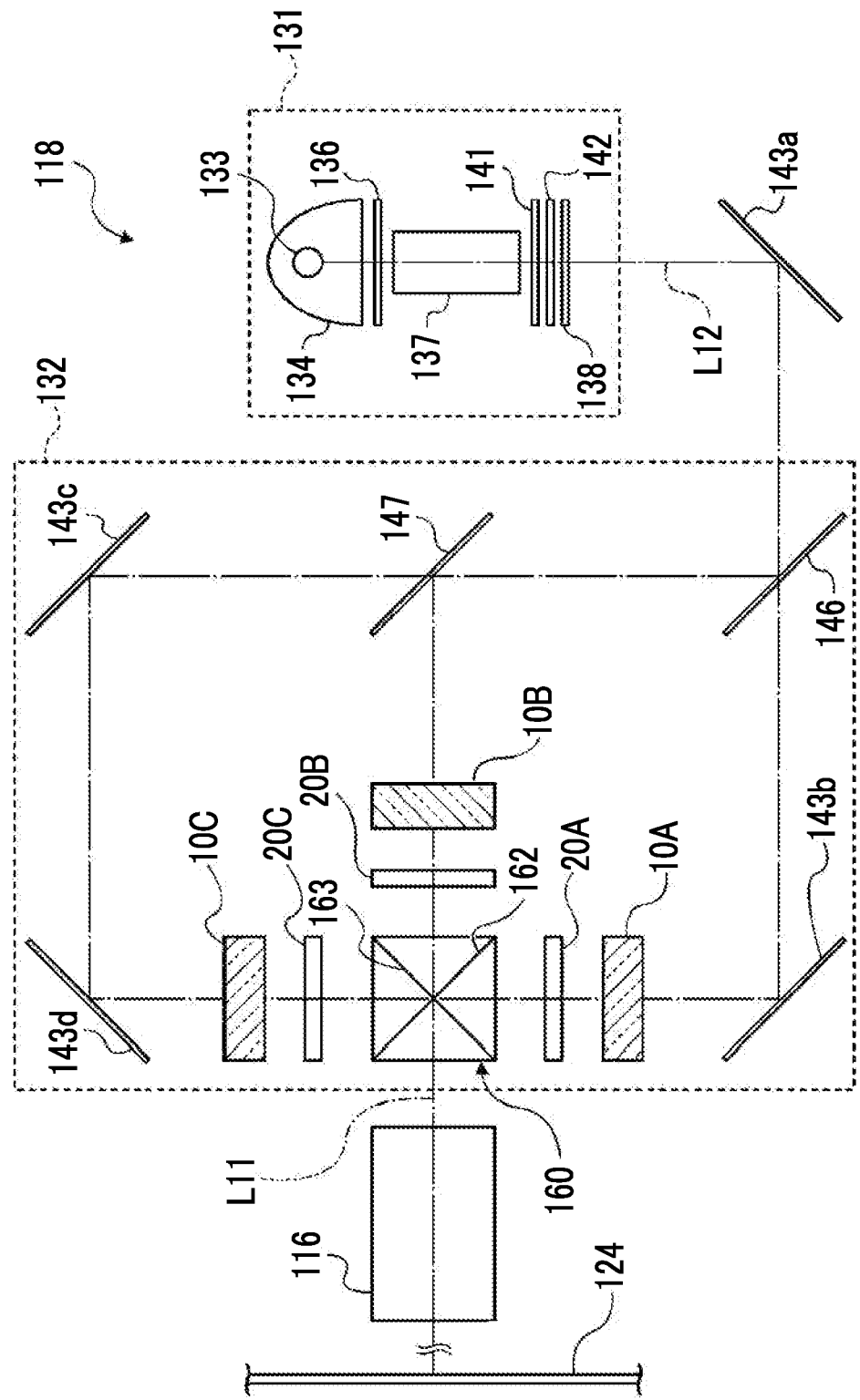
FIG. 30 is a block diagram showing an optical configuration of the liquid crystal projector.

The projection lens 116 magnifies projection light incident from the display optical system 118 and projects the light on a screen 124 (see FIG. 30). The projection lens 116 is composed of, for example, a zoom lens, a focus lens, a stop, and the like. The zoom lens and the focus lens are movably provided along a projection light axis L11. The zoom lens moves in response to an operation of the zoom dial 121 to adjust a display magnification of a projected image. In addition, the focus lens moves in response to movement of the zoom lens or an operation of the focus dial 122 to adjust a focus of the projected image. Furthermore, the stop adjusts a brightness of the projected image by changing an area of a stop opening according to an operation of the light quantity adjustment dial 123.

The projector driving unit 117 controls an electrical operation of each unit of the liquid crystal projector 110. For example, the projector driving unit 117 receives image data or the like from a computer or the like connected to the liquid crystal projector 110 and displays the image data on a liquid crystal display element described below.

In addition, the projector driving unit 117 includes motors which drive each unit of the projection lens 116, and drives each of these motors in response to operations such as the zoom dial 121, the focus dial 122, and the light quantity adjustment dial 123.

The display optical system 118 decomposes light emitted from a light source into red light, green light, and blue light, and transmits the light to liquid crystal display elements 10A, 10B, and 10C (see FIG. 30) displaying information of each color, respectively, and generates information light of each color. These information lights are combined to be the projection light, which is projected onto the screen 124 through the projection lens 116.

As shown in FIG. 30, the display optical system 118 is composed of a light source unit 131, an information light generation unit 132 which generates the information light from light emitted by the light source unit 131, and the like.

The light source unit 131 is composed of a lamp 133, a reflecting mirror 134, an ultraviolet ray cut filter 136, an integrator 137, a polarizing plate 138, a relay lens 141, a collimating lens 142, and the like.

The lamp 133 is a high-luminance light source such as a xenon lamp and emits natural white light which does not have a specific polarization direction. The white light emitted from the lamp 133 passes through the ultraviolet ray cut filter 136 and is incident on the integrator 137.

The ultraviolet ray cut filter 136 removes ultraviolet rays from the white light emitted from the lamp 133, and the white light prevents deterioration of brown color or the like in various filters (not shown) made of a polymer of an organic polymer or the like.

The reflecting mirror 134 is, for example, a mirror having an elliptical curved surface, and the lamp 133 is provided in a vicinity of one focal point of the elliptical curved surface. Furthermore, one end of the integrator 137 is provided in a vicinity of the other focal point. As a result, the white light emitted from the lamp 133 is efficiently guided to the integrator 137.

The integrator 137 is composed of, for example, a glass rod and a microlens array provided on an edge surface of the glass rod, and collects the white light emitted from the lamp 133 and guides it to the collimating lens 142 through the relay lens 141. An amount of light incident on the integrator 137 from the lamp 133 decreases as the distance from a light source optical axis L12 increases, and is unevenly distributed about the light source optical axis L12. The integrator 137 distributes the light having such a non-uniform light amount distribution substantially uniformly within a predetermined range about the light source optical axis L12. As a result, the projected image has a substantially uniform brightness over the entire surface of the screen 124.

The collimating lens 142 adjusts the light emitted from the integrator 137 to light parallel to the light source optical axis L12. The polarizing plate 138 converts unpolarized light incident from the collimating lens 142 into linearly polarized light having a polarization component (hereinafter, an S-polarization component) perpendicular to the paper surface. The light of the S-polarization component is guided to the information light generation unit 132 through a reflecting mirror 143a.

The information light generation unit 132 is composed of dichroic mirrors 146 and 147, liquid crystal display elements 10A, 10B, and 10C, phase difference compensation elements 20A, 20B, and 20C, a dichroic prism 160, and the like.

The dichroic mirror 146 is provided such that an angle between a normal direction of the surface thereof and an optical axis of incidence light is 45°. In addition, the dichroic mirror 146 transmits a red light component of the S-polarized white light incident from the light source unit 131 and guides the white light to a reflecting mirror 143b. The reflecting mirror 143b reflects the red light transmitted through the dichroic mirror 146 toward the liquid crystal display element 10A.

In addition, the dichroic mirror 146 reflects a green light component and a blue light component of the S-polarized white light incident from the light source unit 131 toward the dichroic mirror 147. The dichroic mirror 147 is provided such that an angle between a normal direction of the surface thereof and an optical axis of incidence light is 45 degrees. In addition, the dichroic mirror 147 reflects the green light component of the S-polarized light incident from the dichroic mirror 146 toward the liquid crystal display element 10B.

On the other hand, the dichroic mirror 147 transmits the blue light component of the S-polarized light incident from the dichroic mirror 146 and guides the light to a reflecting mirror 143c. The blue light component is reflected by the reflecting mirror 143c and a reflecting mirror 143d, and is incident on the liquid crystal display element 10C.

The liquid crystal display element 10A is the liquid crystal display element 10 shown in FIG. 1. The liquid crystal display element 10A is driven by the projector driving unit 117, and displays a red component in projection video data received from a computer or the like on a gray scale. By transmitting through the liquid crystal display element 10A, the red light is red information light having information on the red component of the projected image.

Similarly, the liquid crystal display element 10B is the liquid crystal display element 10 shown in FIG. 1, and displays a green component in the projection video data received from a computer or the like on a gray scale. By transmitting through the liquid crystal display element 10B, the green light is green information light having information on the green component of the projected image.

Furthermore, similarly, the liquid crystal display element 10C is the liquid crystal display element 10 shown in FIG. 1, and displays a blue component in the projection video data received from a computer or the like on a gray scale. By transmitting through the liquid crystal display element 10C, the blue light is blue information light having information on the blue component of the projected image.

The phase difference compensation element 20A compensates for the phase difference of the red information light incident on a dichroic prism 160 from the liquid crystal display element 10A. That is, the phase difference compensation element 20A compensates for the phase difference caused by the pre-tilt of the liquid crystal molecules.

Similarly, the phase difference compensation element 20B compensates for the phase difference of the green information light incident on the dichroic prism 160 from the liquid crystal display element 10B, and the phase difference compensation element 20C compensates for the phase difference of the blue information light incident on the dichroic prism 160 from the liquid crystal display element 10C.

The dichroic prism 160 is produced in a substantially cubic shape by using a transparent material such as glass, and has dichroic surfaces 162 and 163 perpendicular to each other inside the dichroic prism 160. The dichroic surface 162 reflects the red light and transmits the green light. On the other hand, the dichroic surface 163 reflects the blue light and transmits the green light.

Therefore, the dichroic prism 160 synthesizes the red, green, and blue information lights incident from liquid crystal display elements 10A, 10B, and 10C, respectively, and outputs them as the projection light. In addition, the projection light is led to the projection lens 116 to display the projected image on the screen 124 in full color.

In the liquid crystal projector 110, by using, as the phase difference compensation elements 20A, 20B, and 20C, the phase difference compensation elements 21, 31, 31A, 32, 33, 37, 38, and the like according to the embodiment of the present disclosure, it is possible to efficiently compensate for the phase difference caused by the pre-tilt of the liquid crystal molecules 75. As a result, it is possible to obtain a projected image in which the contrast is improved as compared with the conventional case.

EXAMPLES

Hereinafter, results of producing phase difference compensation elements of Examples and Comparative Examples and performing a contrast measurement will be described.

Liquid Crystal Panel

A liquid crystal panel used for the contrast measurement will be described.

Figure 31:
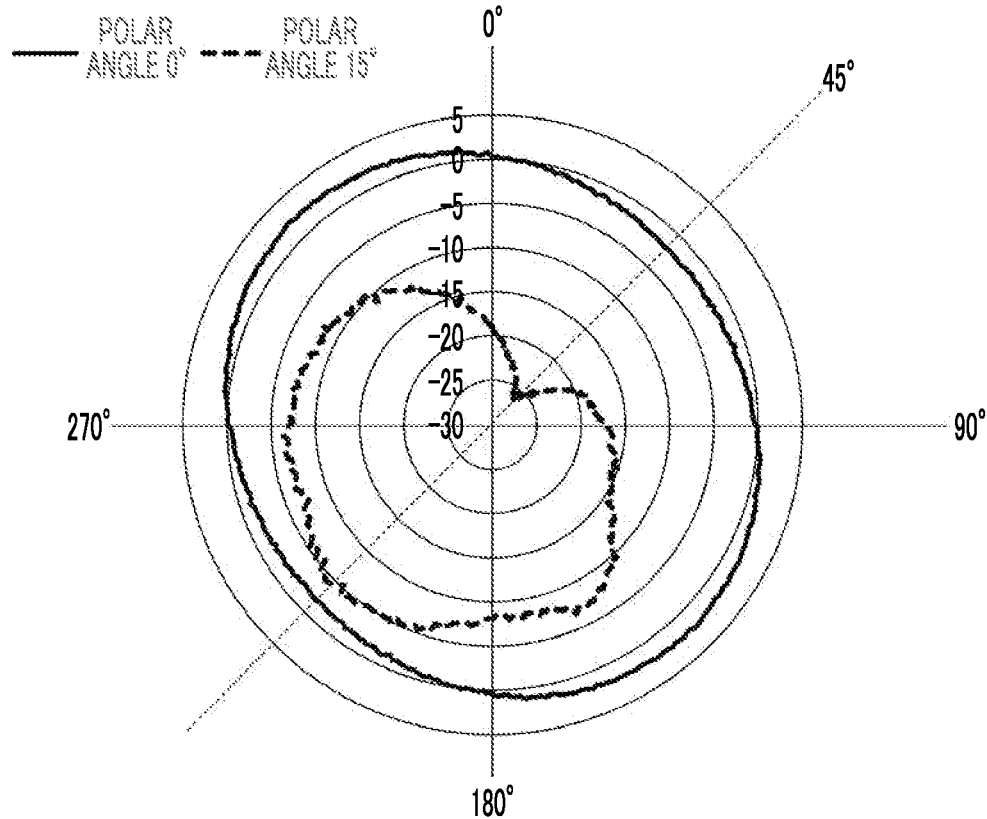
FIG. 31 is a diagram showing a phase difference pattern of a liquid crystal layer in a liquid crystal cell used in Test Example.

Here, a VA type liquid crystal is used as a liquid crystal layer in the liquid crystal cell. The liquid crystal layer has a fast axis at an azimuthal angle of 45° to 225°. FIG. 31 is a phase difference pattern showing azimuthal angle dependence of a phase difference value Re(0) of the liquid crystal layer at a polar angle of 0° and azimuthal angle dependence of a phase difference value Re(15) at a polar angle of 15°. The measurement was performed using an Axoscan high-speed and high-accuracy Mueller matrix polarimeter manufactured by Axometrics, Inc. For the measurement, light having a wavelength of 550 nm was used.

As shown in FIG. 31, a phase difference value Re(0)45 of the liquid crystal cell at an azimuthal angle of 45° and the polar angle of 0° was −1.9 nm, and a phase difference value Re(15)45 at the azimuthal angle of 45° and the polar angle of 15° was −25 nm. The azimuthal angle was set to 90°, 180°, and 270° clockwise in a case where a 12 o'clock orientation of the liquid crystal panel placed for the contrast measurement described later is set to 0°.

C-Plate

As a C-plate, a multilayer thin film in which silicon oxide was used as a low refractive index material, niobium oxide was used as a high refractive index material, and a thin film formed of the low refractive index material and a thin film formed of the high refractive index material were alternately laminated was formed. The C-plate was designed with an antireflection function. In Test Examples 1 to 6 and 8 described later, a first C-plate layer CP1 and a second C-plate layer CP2 were formed as a double-side type C-plate distributed and arranged on both surfaces of the substrate. In Test Example 7, a single-side type C-plate CP disposed on only one surface of the substrate was formed. In the tables of each example, a phase difference value Re(30) of the C-plate is shown using a value at an incidence angle of 30°.

The Re(30) value of the C-plate was selected so that a phase difference value of the phase difference film at an incidence angle of 15° in a fast-axis orientation ηs+180° was approximately 0 in combination with each O-plate. As an example, Tables 6 and 7 show layer configurations of the C-plate which has Re(30)=26 nm and includes an antireflection function. In Tables 6 and 7, Nb means a niobium oxide ($Nb_2O_5$) and Si means a silicon oxide ($SiO_2$).

Table 6 shows the layer configurations of the double-side type C-plate. In order to obtain Re(30)=26 nm, the layer of 39 shown in Table 6 and a multilayer film having a total film thickness of 931 nm are laminated on both surfaces of the substrate.

TABLE 6

Double-side type

| Layer No. | Sample | Film thickness (nm) |
|---|---|---|
| Oblique film side | | |
| 1 | Nb | 7 |
| 2 | Si | 29 |
| 3 | Nb | 17 |
| 4 | Si | 23 |
| 5 | Nb | 21 |
| 6 | Si | 21 |
| 7 | Nb | 35 |
| 8 | Si | 21 |
| 9 | Nb | 29 |
| 10 | Si | 23 |
| 11 | Nb | 23 |
| 12 | Si | 26 |
| 13 | Nb | 22 |
| 14 | Si | 23 |
| 15 | Nb | 23 |
| 16 | Si | 22 |
| 17 | Nb | 20 |
| 18 | Si | 22 |
| 19 | Nb | 21 |
| 20 | Si | 27 |
| 21 | Nb | 22 |
| 22 | Si | 23 |
| 23 | Nb | 24 |
| 24 | Si | 21 |
| 25 | Nb | 22 |
| 26 | Si | 21 |
| 27 | Nb | 22 |
| 28 | Si | 24 |
| 29 | Nb | 24 |
| 30 | Si | 24 |
| 31 | Nb | 37 |
| 32 | Si | 20 |
| 33 | Nb | 43 |
| 34 | Si | 25 |
| 35 | Nb | 21 |
| 36 | Si | 28 |
| 37 | Nb | 11 |
| 38 | Si | 56 |
| 39 | Nb | 5 |
| Substrate side | | |

Table 7 shows the layer configuration of the single-side type C-plate. In order to obtain Re(30)=26 nm, the layer of 82 shown in Table 7 and a multilayer film having a total film thickness of 1743 nm are laminated on one surface of the substrate.

TABLE 7

Single-side type

| Layer No. | Sample | Film thickness (nm) |
|---|---|---|
| Air side | | |
| 1 | Si | 76 |
| 2 | Nb | 79 |
| 3 | Si | 5 |
| 4 | Nb | 24 |
| 5 | Si | 20 |
| 6 | Nb | 21 |
| 7 | Si | 21 |
| 8 | Nb | 20 |
| 9 | Si | 20 |
| 10 | Nb | 20 |
| 11 | Si | 20 |
| 12 | Nb | 20 |
| 13 | Si | 20 |
| 14 | Nb | 20 |
| 15 | Si | 20 |
| 16 | Nb | 21 |
| 17 | Si | 20 |
| 18 | Nb | 21 |
| 19 | Si | 20 |
| 20 | Nb | 20 |
| 21 | Si | 20 |
| 22 | Nb | 20 |
| 23 | Si | 20 |
| 24 | Nb | 20 |
| 25 | Si | 20 |
| 26 | Nb | 20 |
| 27 | Si | 20 |
| 28 | Nb | 20 |
| 29 | Si | 20 |
| 30 | Nb | 21 |
| 31 | Si | 20 |
| 32 | Nb | 20 |
| 33 | Si | 20 |
| 34 | Nb | 21 |
| 35 | Si | 20 |
| 36 | Nb | 20 |
| 37 | Si | 20 |
| 38 | Nb | 20 |
| 39 | Si | 20 |
| 40 | Nb | 20 |
| 41 | Si | 20 |
| 42 | Nb | 20 |
| 43 | Si | 20 |
| 44 | Nb | 20 |
| 45 | Si | 20 |
| 46 | Nb | 20 |
| 47 | Si | 21 |
| 48 | Nb | 21 |
| 49 | Si | 20 |
| 50 | Nb | 20 |
| 51 | Si | 20 |
| 52 | Nb | 20 |
| 53 | Si | 20 |
| 54 | Nb | 20 |
| 55 | Si | 20 |
| 56 | Nb | 20 |
| 57 | Si | 20 |
| 58 | Nb | 20 |
| 59 | Si | 23 |
| 60 | Nb | 20 |
| 61 | Si | 20 |
| 62 | Nb | 20 |
| 63 | Si | 20 |
| 64 | Nb | 23 |
| 65 | Si | 20 |
| 66 | Nb | 20 |
| 67 | Si | 20 |
| 68 | Nb | 20 |
| 69 | Si | 20 |
| 70 | Nb | 21 |
| 71 | Si | 20 |
| 72 | Nb | 20 |
| 73 | Si | 20 |

TABLE 7-continued

Single-side type

| Layer No. | Sample | Film thickness (nm) |
|---|---|---|
| 74 | Nb | 21 |
| 75 | Si | 20 |
| 76 | Nb | 22 |
| 77 | Si | 20 |
| 78 | Nb | 20 |
| 79 | Si | 29 |
| 80 | Nb | 5 |
| 81 | Si | 16 |
| 82 | Nb | 6 |
| Substrate side | | |

Contrast Measuring Method

An optical engine of a commercially available liquid crystal projector was diverted, and as shown in FIG. 1, a liquid crystal panel for evaluation (liquid crystal display element 10) was configured of the polarizer 15, the liquid crystal cell 17, the phase difference compensation element of each sample as the phase difference compensation element 20, and the analyzer 19 in this order.

A plurality of samples were produced for each of Test Examples 1 to 8, and contrast was measured and evaluated. As a substrate of the phase compensation plate of each sample, a quartz plate having a thickness of 0.55 mm was used. The configuration of each sample will be described later.

A screen was disposed at a position where light passing through the analyzer 19 was projected, white display and black display were performed on the screen, and a ratio of an amount of light during the white display to an amount of light during the black display was regarded as a contrast value. The measurement was performed at a position in the center of the screen.

First, a contrast value of a liquid crystal panel not provided with the phase difference compensation element 20 was measured, and this contrast value was used as a reference A. A contrast value B in a case of a liquid crystal panel provided with the phase difference compensation element for each sample was measured, and a value obtained by dividing the contrast value B by the reference A was obtained as a gain=B/A. The contrast was evaluated by the gain as follows.

| Gain | Evaluation |
|---|---|
| More than 3.0 | A |
| 2.0 or more and 3.0 or less | B |
| 1.5 or more and less than 2.0 | C |
| Less than 1.5 | D |

Practically, it is required to be C or more, preferably B or more and more preferably A.

Test Example 1

Figure 32:
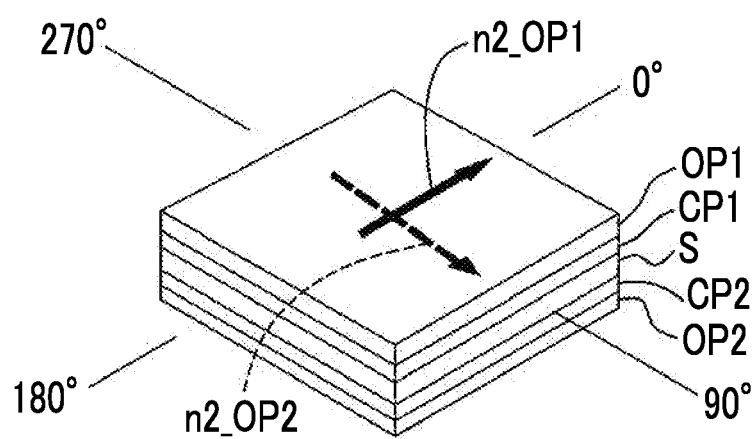
FIG. 32 is a perspective view showing a layer configuration of a phase difference compensation element of Test Examples 1 and 3.

In Test Example 1, as shown in FIG. 32, a phase difference compensation element in which the first C-plate layer CP1 and a first O-plate layer OP1 were provided on one surface of a substrate S, and the second C-plate layer CP2 and a second O-plate layer OP2 were provided on the other surface of the substrate S was produced. Here, the O-plate layer corresponds to the oblique vapor deposition layer described in the embodiment. The phase difference film of this example was composed of the first O-plate layer OP1, the second O-plate layer OP2, the first C-plate layer CP1, and the second C-plate layer CP2. A double-side type C-plate was composed of the first C-plate layer CP1 and the second C-plate layer CP2. The first O-plate layer OP1 and the second O-plate layer OP2 were produced by, using the first production method of the oblique vapor deposition layer described above, a vapor deposition in a state of a substrate installation angle $\omega=80°$ and the substrate S revolving with respect to the vapor deposition source. As a material for the first and second O-plate layers OP1 and OP2, tantalum oxide was used. On the other hand, the first C-plate layer CP1 and the second C-plate layer CP2 were produced by installing the substrate at a substrate installation angle $\omega=0$ and vapor-depositing the substrate. As shown in Table 1, the oblique vapor deposition layer formed by revolving the substrate at the substrate installation angle $\omega$ had optical anisotropy represented by a refractive index ellipsoid showing principal refractive indices of $n2>n3>n1$. Hereinafter, the maximum principal refractive index of the first O-plate layer OP1 is referred to as n21, and the maximum principal refractive index of the second O-plate layer OP2 is referred to as n22. In addition, a directional vector of the principal refractive index n21 of the first O-plate layer OP1 is referred to as n2_OP1, and a directional vector of the principal refractive index n22 of the second O-plate layer OP2 is referred to as n2_OP2.

The first C-plate layer CP1 and the second C-plate layer CP2 were formed on both surfaces of the substrate S, respectively, and the first O-plate layer OP1 which is the oblique vapor deposition layer was formed on the first C-plate layer CP1 by an oblique vapor deposition and the second O-plate layer OP2 which is the oblique vapor deposition layer was formed on the second C-plate layer CP2 by an oblique vapor deposition. For each sample, the directional vector n2_OP1 of the principal refractive index n21 of the first O-plate layer OP1 and the directional vector n2_OP2 of the maximum principal refractive index n22 of the second O-plate layer OP2 intersected each other, and a vapor deposition direction of the second O-plate layer OP2 was changed for each sample so that an open angle ε thereof was a value shown in Table 8. Film thicknesses of the first O-plate layer OP1 and the second O-plate layer OP2 were set so that the phase difference value Re(0) at a polar angle of 0° in each slow-axis orientation (orientation of the directional vector of the maximum principal refractive index n2) was 20 nm. In the production method of the oblique vapor deposition layer in the present test example, a design physical film thickness for Re(0)=20 nm was set to 375 nm.

Figure 33:
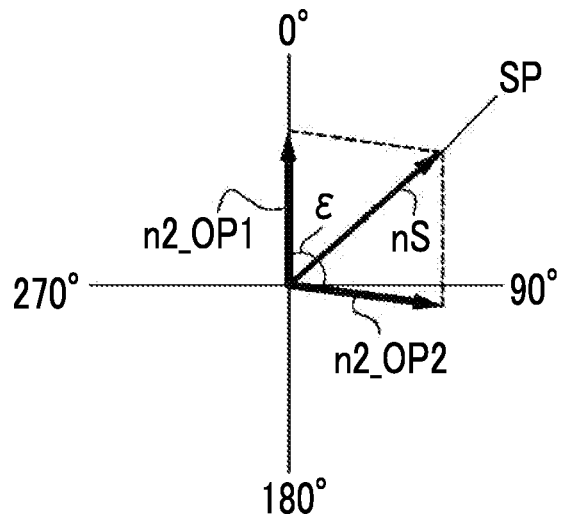
FIG. 33 is an explanatory diagram of a combined vector of a slow axis in a phase difference compensation element having a two-layer configuration.

As shown in FIG. 32, in a case where an orientation of the directional vector n2_OP1 of the principal refractive index n21 of the first O-plate layer OP1 was set to 0°, 90°, 180°, and 270° was set clockwise. As shown in FIG. 33, in a case where the directional vector n2_OP1 of the principal refractive index n21 of the first O-plate layer OP1 and the directional vector n2_OP2 of the principal refractive index n22 of the second O-plate layer OP2 were arranged at the open angle ε, an axis parallel to a combined vector nS obtained by combining the directional vectors corresponded to a slow axis SP of the phase difference film. As shown in Table 8, in this example, the slow-axis orientation of the phase difference film was changed by changing the open angle ε. A fast axis of the liquid crystal cell was set to an orientation of 45°, and Table 8 shows a deviation of the slow-axis orientation of the phase difference film for each sample from the 45° orientation, that is, a deviation between the slow-axis orientation of the phase difference film and the fast-axis orientation of the liquid crystal cell.

TABLE 8

| Test Example 1 Sample No. | Re(0) of OP1 [nm] | Re(0) of OP2 [nm] | Open angle ε [deg] | Slow-axis orientation of phase difference film [deg.] | Deviation between slow-axis orientation of phase difference film and fast-axis orientation of liquid crystal layer [deg.] | Gain | Evaluation |
|---|---|---|---|---|---|---|---|
| 1-1 | 20 | 20 | 93 | 45 | 0 | 3.1 | A |
| 1-2 | 20 | 20 | 95 | 46 | 1 | 3.0 | A |
| 1-3 | 20 | 20 | 100 | 51 | 6 | 2.6 | B |
| 1-4 | 20 | 20 | 105 | 52 | 7 | 2.5 | B |
| 1-5 | 20 | 20 | 110 | 59 | 14 | 2.3 | B |
| 1-6 | 20 | 20 | 90 | 45 | 0 | 2.9 | B |
| 1-7 | 20 | 20 | 89 | 62 | 17 | 2.0 | C |
| 1-8 | 20 | 20 | 88 | 70 | 25 | 1.5 | C |
| 1-9 | 20 | 20 | 87 | 83 | 38 | 0.9 | D |

In the samples 1-1 to 1-8, the deviation between the slow-axis orientation of the phase difference film and the fast-axis orientation of the liquid crystal cell was 25° or less, which corresponded to Examples of the technology of the present disclosure. In the sample 1-9, the deviation between the slow-axis orientation of the phase difference film and the fast-axis orientation of the liquid crystal cell was 38°, exceeding 25°, which corresponded to Comparative Example.

As shown in Table 8, in the samples 1-1 to 1-8 of Examples, an evaluation of a gain of 1.5 or more was obtained, and it was shown that the contrast was improved. On the other hand, in the sample 1-9 of Comparative Example, a sufficient gain could not be obtained.

Test Example 1 is a phase difference compensation element including the C-plate and the two oblique vapor deposition layers (the first O-plate layer OP1 and the second O-plate layer OP2), and is a phase difference compensation element including one oblique vapor deposition layer on each surface of the substrate. In the two oblique vapor deposition layers of such a phase difference compensation element, the open angle between the axes (slow axes) exhibiting the largest principal refractive index is preferably 88° or more and 110° or less, more preferably 90° or more and 110° or less, and particularly preferably 90° or more and 95° or less.

Test Example 2

In Test Example 2, as shown in FIG. 34, a phase difference compensation element in which the single-side type C-plate CP was provided on one surface of the substrate S, and the second O-plate layer OP1 and the second O-plate layer OP2 as the oblique vapor deposition layers were laminated on the other surface was produced. The phase difference film of this example was composed of the first O-plate layer OP1, the second O-plate layer OP2, and the C-plate CP. The production methods of the first and second O-plate layers OP1 and OP2 and the C-plate CP were the same as in Test Example 1.

The C-plate CP was formed on one surface of the substrate S, and the second O-plate layer OP2 and the first O-plate layer OP1 as the oblique vapor deposition layers were formed in this order on the other surface of the substrate S by an oblique vapor deposition. Same as Test Example 1, for each sample, the direction of the principal refractive index n21 of the first O-plate layer OP1 and the direction of the principal refractive index n22 of the second O-plate layer OP2 intersected each other, and a vapor deposition direction of the second O-plate layer OP2 was changed for each sample so that an intersecting angle (open angle) ε thereof was a value shown in Table 9. In addition, film thicknesses of the first O-plate layer OP1 and the second O-plate layer OP2 were set so that the phase difference value Re(0) at a polar angle of 0° in each slow-axis orientation (orientation of the directional vector of the maximum principal refractive index n2) was 20 nm. As shown in FIG. 34, in a case where an orientation of the principal refractive index n21 of the first O-plate layer OP1 was set to 0°, 90°, 180°, and 270° was set clockwise. A relationship between the directional vector n2_OP1 of the principal refractive index n21 of the first O-plate layer OP1 and the directional vector n2_OP2 of the principal refractive index n22 of the second O-plate layer OP2 was shown in FIG. 33 same as Test Example 1. As shown in FIG. 33, in a case where the directional vector n2_OP1 of the first O-plate layer OP1 and the directional vector n2_OP2 of the second O-plate layer OP2 were arranged at the open angle ε, an axis parallel to a combined vector nS obtained by combining the directional vectors corresponded to a slow axis SP of the phase difference film. As shown in Table 9, the slow-axis orientation of the phase difference film was changed by changing the open angle ε. A fast axis of the liquid crystal cell was set to an orientation of 45°, and Table 9 shows a deviation of the slow-axis orientation of the phase difference film for each sample from the 45° orientation, that is, a deviation between the slow-axis orientation of the phase difference film and the fast-axis orientation of the liquid crystal cell.

Table 9 shows results of performing the above-described contrast measurement using the phase difference compensation element for each sample of Test Example 2.

TABLE 9

| Test Example 2 Sample No. | Re(0) of OP1 [nm] | Re(0) of OP2 [nm] | Open angle ε [deg] | Slow-axis orientation of phase difference film [deg.] | Deviation between slow-axis orientation of phase difference film and fast-axis orientation of liquid crystal layer [deg.] | Gain | Evaluation |
|---|---|---|---|---|---|---|---|
| 2-1 | 20 | 20 | 30 | 75 | 30 | 1.1 | D |
| 2-2 | 20 | 20 | 40 | 70 | 25 | 1.5 | C |

TABLE 9-continued

| Test Example 2 Sample No. | Re(0) of OP1 [nm] | Re(0) of OP2 [nm] | Open angle ε [deg] | Slow-axis orientation of phase difference film [deg.] | Deviation between slow-axis orientation of phase difference film and fast-axis orientation of liquid crystal layer [deg.] | Gain | Evaluation |
|---|---|---|---|---|---|---|---|
| 2-3 | 20 | 20 | 45 | 70 | 25 | 1.5 | C |
| 2-4 | 20 | 20 | 50 | 68 | 23 | 1.8 | C |
| 2-5 | 20 | 20 | 60 | 61 | 16 | 2.5 | C |
| 2-6 | 20 | 20 | 65 | 56 | 11 | 2.7 | C |
| 2-7 | 20 | 20 | 70 | 55 | 10 | 2.8 | C |
| 2-8 | 20 | 20 | 75 | 54 | 9 | 2.9 | B |
| 2-9 | 20 | 20 | 80 | 49 | 4 | 3.0 | A |
| 2-10 | 20 | 20 | 85 | 46 | 1 | 3.1 | A |
| 2-11 | 20 | 20 | 90 | 45 | 0 | 2.9 | B |

In the samples 2-2 to 2-11, the difference between the slow axis of the phase difference film and the fast-axis orientation of the panel was 25° or less, which corresponded to Examples of the technology of the present disclosure. In the sample 2-1, the difference between the slow axis of the phase difference film and the fast-axis orientation of the panel was 30°, exceeding 25°, which corresponded to Comparative Example.

As shown in Table 9, in the samples 2-2 to 2-11 of Examples, an evaluation of a gain of 1.5 or more was obtained, and it was shown that the contrast was improved. On the other hand, in the sample 2-1 of Comparative Example, a sufficient gain could not be obtained.

Test Example 3

In Test Example 3, a phase difference compensation element having the same layer configuration as that of Test Example 1 shown in FIG. 32 was produced. That is, the phase difference film of this example was composed of the first O-plate layer OP1, the second O-plate layer OP2, the first C-plate layer CP1, and the second C-plate layer CP2.

The first C-plate layer CP1 and the second C-plate layer CP2 were formed on both surfaces of the substrate S, respectively, and the first O-plate layer OP1 which is the oblique vapor deposition layer was formed on the first C-plate layer CP1 by an oblique vapor deposition and the second O-plate layer OP2 which is the oblique vapor deposition layer was formed on the second C-plate layer CP2 by an oblique vapor deposition. For each sample, the direction of the principal refractive index n21 of the first O-plate layer OP1 and the direction of the principal refractive index n22 of the second O-plate layer OP2 intersected each other, and a vapor deposition direction of the second O-plate layer OP2 was set so that an open angle ε thereof was 93°. On the other hand, film thicknesses of the first O-plate layer OP1 and the second O-plate layer OP2 were set so that the phase difference value Re(0) at a polar angle of 0° in each slow-axis orientation was a value shown in Table 10. Same as Test Example 1, also in this example, as shown in FIG. 33, in a case where the directional vector n2_OP1 of the principal refractive index n21 of the first O-plate layer OP1 and the directional vector n2_OP2 of the principal refractive index n22 of the second O-plate layer OP2 were arranged at the open angle ε, an axis parallel to a combined vector nS obtained by combining the directional vectors corresponded to a slow axis SP of the phase difference film. As shown in Table 10, in this example, the slow-axis orientation of the phase difference film was changed by changing the phase difference value of the first O-plate layer OP1 or the second O-plate layer OP2. A fast axis of the liquid crystal cell was set to an orientation of 45°, and Table 10 shows a deviation of the slow-axis orientation of the phase difference film for each sample from the 45° orientation, that is, a deviation between the slow-axis orientation of the phase difference film and the fast-axis orientation of the liquid crystal cell.

Table 10 shows results of performing the above-described contrast measurement using the phase difference compensation element for each sample as the above-described phase difference compensation element 20.

TABLE 10

| Test Example 3 Sample No. | Re(0) of OP1 [nm] | Re(0) of OP2 [nm] | Open angle ε [deg.] | Slow-axis orientation of phase difference film [deg.] | Deviation between slow-axis orientation of phase difference film and fast-axis orientation of liquid crystal layer [deg.] | Gain | Evaluation |
|---|---|---|---|---|---|---|---|
| 3-1 | 20 | 20 | 93 | 45 | 0 | 3.1 | A |
| 3-2 | 20 | 21 | 93 | 34 | −11 | 2.7 | B |
| 3-3 | 20 | 22 | 93 | 24 | −16 | 2.4 | B |
| 3-4 | 20 | 23 | 93 | 24 | −23 | 1.8 | B |
| 3-5 | 20 | 24 | 93 | 19 | −25 | 1.5 | C |
| 3-6 | 20 | 25 | 93 | 19 | −26 | 1.4 | D |
| 3-7 | 20 | 26 | 93 | 17 | −28 | 1.2 | D |
| 3-8 | 21 | 20 | 93 | 46 | 1 | 3.1 | A |
| 3-9 | 22 | 20 | 93 | 64 | 19 | 2.3 | B |
| 3-10 | 23 | 20 | 93 | 72 | 27 | 1.3 | D |
| 3-11 | 24 | 20 | 93 | 76 | 31 | 1.2 | D |
| 3-12 | 25 | 20 | 93 | 76 | 31 | 1.1 | D |
| 3-13 | 26 | 20 | 93 | 80 | 35 | 1.1 | D |

In the samples 3-1 to 3-5, 3-8, and 3-9, the difference between the slow axis of the phase difference film and the fast-axis orientation of the panel was 25° or less, which corresponded to Examples of the technology of the present disclosure. In the samples 3-6, 3-7, and 3-10 to 3-13, the difference between the slow axis of the phase difference film and the fast-axis orientation of the panel was more than 25°, which corresponded to Comparative Examples.

As shown in Table 10, in the samples 3-1 to 3-5, 3-8, and 3-9 of Examples, an evaluation of a gain of 1.5 or more was obtained, and it was shown that the contrast was improved. On the other hand, in the samples 3-6, 3-7, and 3-10 to 3-13 of Comparative Examples, a sufficient gain could not be obtained.

Test Example 3 is a phase difference compensation element including the C-plate and the two oblique vapor deposition layers (the first O-plate layer OP1 and the second O-plate layer OP2), and is a phase difference compensation element including one oblique vapor deposition layer on each surface of the substrate. In such a phase difference compensation element, the two oblique vapor deposition layers had an open angle of approximately 90°±5°, and a difference between a front phase difference value of the oblique vapor deposition layer on the light incidence side and a front phase difference value of the oblique vapor deposition layer on the light emission side is preferably −4 nm to +2 nm, more preferably −3 nm to +2 nm, and particularly preferably 0 to +1 nm.

Test Example 4

Figure 35:
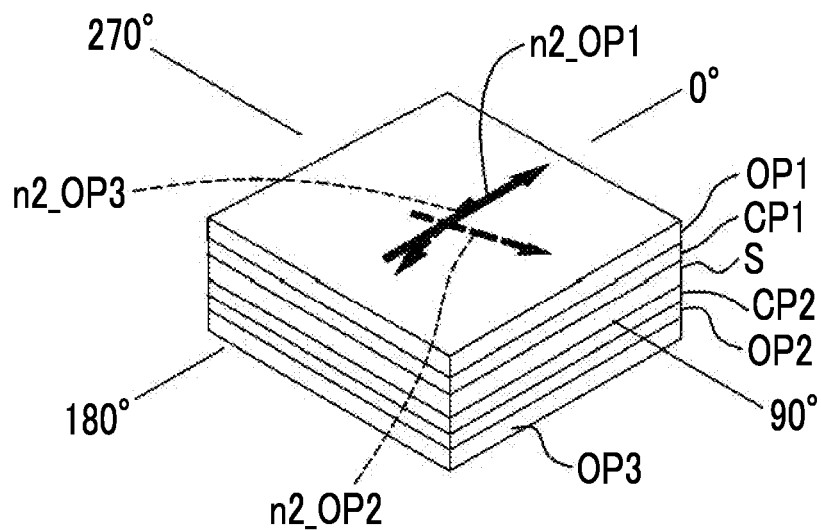
FIG. 35 is a perspective view showing a layer configuration of a phase difference compensation element of Test Examples 4 and 5.

In Test Example 4, as shown in FIG. 35, a phase difference compensation element in which the first C-plate layer CP1 and the first O-plate layer OP1 as the oblique vapor deposition layer were provided on one surface of the substrate S, and the second C-plate layer CP2 and the second O-plate layers OP2 and OP3 as the oblique vapor deposition layers were provided on the other surface of the substrate S was produced. The phase difference film of this example was composed of the first O-plate layer OP1, the second O-plate layer OP2, the third O-plate layer OP3, the first C-plate layer CP1, and the second C-plate layer CP2. A double-side type C-plate was composed of the first C-plate layer CP1 and the second C-plate layer CP2. The production methods of the first to third O-plate layers OP1, OP2, and OP3 and the first and second C-plate layers CP1 and CP2 were the same as in Test Example 1.

The first C-plate layer CP1 and the second C-plate layer CP2 were formed on both surfaces of the substrate S, respectively, and the first O-plate layer OP1 which is the oblique vapor deposition layer was formed on the first C-plate layer CP1 by an oblique vapor deposition and the second O-plate layer OP2 and the third O-plate layer OP3, which are the oblique vapor deposition layers, were laminated and formed on the second C-plate layer CP2 by an oblique vapor deposition. For each sample, the direction of the directional vector n2_OP1 of the principal refractive index n21 of the first O-plate layer OP1 and the direction of the directional vector n2_OP2 of the principal refractive index n22 of the second O-plate layer OP2 intersected each other, and a vapor deposition direction of the second O-plate layer OP2 was set so that an open angle ε1 thereof was 80°. In addition, the direction of the directional vector n2_OP2 of the principal refractive index n22 of the second O-plate layer OP2 and the direction of a directional vector n2_OP3 of a principal refractive index n23 of the third O-plate layer OP3 intersected each other, and a vapor deposition direction of the third O-plate layer OP3 was set so that an open angle ε2 thereof was a value shown in Table 11. In addition, film thicknesses were set so that a phase difference value Re(0) of the first O-plate layer OP1 at a polar angle of 0° in the slow-axis orientation was 20 nm, a phase difference value Re(0) of the second O-plate layer OP2 at a polar angle of 0° in the slow-axis orientation was 15 nm, and a phase difference value Re(0) of the third O-plate layer OP3 at a polar angle of 0° in the slow-axis orientation was 10 nm.

Figure 36:
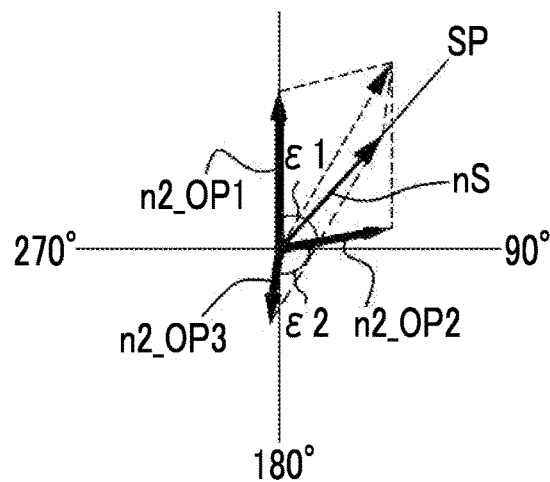
FIG. 36 is an explanatory diagram of a combined vector of a slow axis in a phase difference compensation element having a three-layer configuration.

Also in this example, as shown in FIG. 35, in a case where an orientation of the directional vector n2_OP1 of the principal refractive index n21 of the first O-plate layer OP1 was set to 0°, 90°, 180°, and 270° were set clockwise. As shown in FIG. 36, the directional vector n2_OP1 of the principal refractive index n21 of the first O-plate layer OP1 and the directional vector n2_OP2 of the principal refractive index n22 of the second O-plate layer OP2 were arranged at the open angle ε1. In addition, the directional vector n2_OP2 of the principal refractive index n22 of the second O-plate layer OP2 and the directional vector n2_OP3 of the principal refractive index n23 of the third O-plate layer OP3 were arranged at the open angle ε2. In this case, an axis parallel to a combined vector nS obtained by combining the directional vectors for the principal refractive indices n21, n22, and n23 of the three O-plate layers OP1, OP2, and OP3 corresponded to a slow axis SP of the phase difference film. As shown in Table 11, in this example, the slow-axis orientation of the phase difference film was changed by changing the open angle ε2 of the second O-plate layer OP2 and the third O-plate layer OP3. A fast axis of the liquid crystal cell was set to an orientation of 45°, and Table 11 shows a deviation of the slow-axis orientation of the phase difference film for each sample from the 45° orientation, that is, a deviation between the slow-axis orientation of the phase difference film and the fast-axis orientation of the liquid crystal cell.

Table 11 shows results of performing the above-described contrast measurement using the phase difference compensation element for each sample of Test Example 4.

TABLE 11

| Test Example 4 Sample No. | Re(0) of OP1 [nm] | Re(0) of OP2 [nm] | Open angle ε1 [deg.] | Re(0) of OP3 [nm] | Open angle ε2 [deg.] | Slow-axis orientation of phase difference film [deg.] | Deviation between slow-axis orientation of phase difference film and fast-axis orientation of liquid crystal layer [deg.] | Gain | Evaluation |
| --- | --- | --- | --- | --- | --- | --- | --- | --- | --- |
| 4-1 | 20 | 15 | 80 | 10 | 104 | 13 | −32 | 1.1 | D |
| 4-2 | 20 | 15 | 80 | 10 | 105 | 19 | −26 | 1.4 | D |
| 4-3 | 20 | 15 | 80 | 10 | 108 | 23 | −22 | 1.8 | C |
| 4-4 | 20 | 15 | 80 | 10 | 110 | 29 | −16 | 2.1 | B |
| 4-5 | 20 | 15 | 80 | 10 | 115 | 39 | −6 | 2.8 | B |
| 4-6 | 20 | 15 | 80 | 10 | 118 | 40 | −5 | 2.9 | A |
| 4-7 | 20 | 15 | 80 | 10 | 120 | 46 | 1 | 3.1 | A |

TABLE 11-continued

| Test Example 4 Sample No. | Re(0) of OP1 [nm] | Re(0) of OP2 [nm] | Open angle ε1 [deg.] | Re(0) of OP3 [nm] | Open angle ε2 [deg.] | Slow-axis orientation of phase difference film [deg.] | Deviation between slow-axis orientation of phase difference film and fast-axis orientation of liquid crystal layer [deg.] | Gain | Evaluation |
|---|---|---|---|---|---|---|---|---|---|
| 4-8 | 20 | 15 | 80 | 10 | 123 | 48 | 3 | 3.0 | A |
| 4-9 | 20 | 15 | 80 | 10 | 125 | 53 | 8 | 2.7 | B |
| 4-10 | 20 | 15 | 80 | 10 | 130 | 61 | 16 | 2.2 | B |
| 4-11 | 20 | 15 | 80 | 10 | 135 | 63 | 18 | 2.0 | C |
| 4-12 | 20 | 15 | 80 | 10 | 140 | 70 | 25 | 1.5 | C |
| 4-13 | 20 | 15 | 80 | 10 | 150 | 77 | 32 | 1.1 | D |

In the samples 4-3 to 4-12, the difference between the slow axis of the phase difference film and the fast-axis orientation of the panel was 25° or less, which corresponded to Examples of the technology of the present disclosure. In the samples 4-1, 4-2, and 4-13, the difference between the slow axis of the phase difference film and the fast-axis orientation of the panel was more than 25°, which corresponded to Comparative Examples.

As shown in Table 11, in the samples 4-3 to 4-12 of Examples, an evaluation of a gain of 1.5 or more was obtained, and it was shown that the contrast was improved. On the other hand, in the samples 4-1, 4-2, and 4-13 of Comparative Examples, a sufficient gain could not be obtained.

Test Example 5

In Test Example 5, a phase difference compensation element having the same configuration as that of Test Example 4 was produced. That is, the phase difference film of this example was composed of the first O-plate layer OP1, the second O-plate layer OP2, the third O-plate layer OP3, the first C-plate layer CP1, and the second C-plate layer CP2 (see FIG. 35).

In this example, the direction of the directional vector n2_OP1 of the principal refractive index n21 of the first O-plate layer OP1 and the direction of the directional vector n2_OP2 of the principal refractive index n22 of the second O-plate layer OP2 intersected each other, and a vapor deposition direction of the second O-plate layer OP2 was set so that an open angle ε1 thereof was 95°. In addition, the direction of the directional vector n2_OP2 of the principal refractive index n22 of the second O-plate layer OP2 and the direction of a directional vector n2_OP3 of a principal refractive index n23 of the third O-plate layer OP3 intersected each other, and a vapor deposition direction of the third O-plate layer OP3 was set so that an open angle ε2 thereof was 100°.

In addition, a film thickness of the first O-plate layer OP1 for each sample was set so that a phase difference value Re(0) of the first O-plate layer OP1 at a polar angle of 0° in the slow-axis orientation was a value shown in Table 12. In addition, film thicknesses were set so that a phase difference value Re(0) of the second O-plate layer OP2 at a polar angle of 0° in the slow-axis orientation was 5 nm and a phase difference value Re(0) of the third O-plate layer OP3 at a polar angle of 0° in the slow-axis orientation was 10 nm.

Also in this example, as shown in FIG. 36, an axis parallel to a combined vector nS obtained by combining the directional vectors for the principal refractive indices n21, n22, and n23 of the three O-plate layers OP1, OP2, and OP3 corresponded to a slow axis SP of the phase difference film. As shown in Table 12, in this example, by changing the phase difference value Re(0) of the first O-plate layer OP1, a fast axis of the liquid crystal cell was set to an orientation of 45°, and Table 12 shows a deviation of the slow-axis orientation of the phase difference film for each sample from the 45° orientation, that is, a deviation between the slow-axis orientation of the phase difference film and the fast-axis orientation of the liquid crystal cell.

Table 12 shows results of performing the above-described contrast measurement using the phase difference compensation element for each sample of Test Example 5 as the above-described phase difference compensation element 20.

TABLE 12

| Test Example 5 Sample No. | Re(0) of OP1 [nm] | Re(0) of OP2 [nm] | Open angle ε1 [deg.] | Re(0) of OP3 [nm] | Open angle ε2 [deg.] | Slow-axis orientation of phase difference film [deg.] | Deviation between slow-axis orientation of phase difference film and fast-axis orientation of liquid crystal layer [deg.] | Gain | Evaluation |
|---|---|---|---|---|---|---|---|---|---|
| 5-1 | 20 | 5 | 95 | 10 | 100 | 73 | 28 | 1.3 | D |
| 5-2 | 19 | 5 | 95 | 10 | 100 | 70 | 25 | 1.5 | C |
| 5-3 | 18 | 5 | 95 | 10 | 100 | 70 | 24 | 1.6 | C |
| 5-4 | 17 | 5 | 95 | 10 | 100 | 63 | 18 | 2.1 | B |
| 5-5 | 16 | 5 | 95 | 10 | 100 | 61 | 16 | 2.2 | B |
| 5-6 | 15 | 5 | 95 | 10 | 100 | 49 | 4 | 2.9 | B |
| 5-7 | 14 | 5 | 95 | 10 | 100 | 39 | −6 | 2.6 | A |
| 5-8 | 13 | 5 | 95 | 10 | 100 | 36 | −9 | 2.5 | B |
| 5-9 | 12 | 5 | 95 | 10 | 100 | 28 | −17 | 1.8 | C |
| 5-10 | 11 | 5 | 95 | 10 | 100 | 25 | −20 | 1.7 | C |
| 5-11 | 10 | 5 | 95 | 10 | 100 | 23 | −22 | 1.6 | C |
| 5-12 | 9 | 5 | 95 | 10 | 100 | 20 | −25 | 1.5 | C |
| 5-13 | 8 | 5 | 95 | 10 | 100 | 18 | −27 | 1.4 | D |
| 5-14 | 7 | 5 | 95 | 10 | 100 | 16 | −29 | 1.2 | D |

In the samples 5-2 to 5-12, the difference between the slow axis of the phase difference film and the fast-axis orientation of the panel was 25° or less, which corresponded to Examples of the technology of the present disclosure. In the samples 5-1, 5-13, and 5-14, the difference between the slow axis of the phase difference film and the fast-axis orientation of the panel was more than 25°, which corresponded to Comparative Examples.

As shown in Table 12, in the samples 5-2 to 5-12 of Examples, an evaluation of a gain of 1.5 or more was obtained, and it was shown that the contrast was improved. On the other hand, in the samples 5-1, 5-13, and 5-14 of Comparative Examples, a sufficient gain could not be obtained.

Test Example 6

Figure 37:
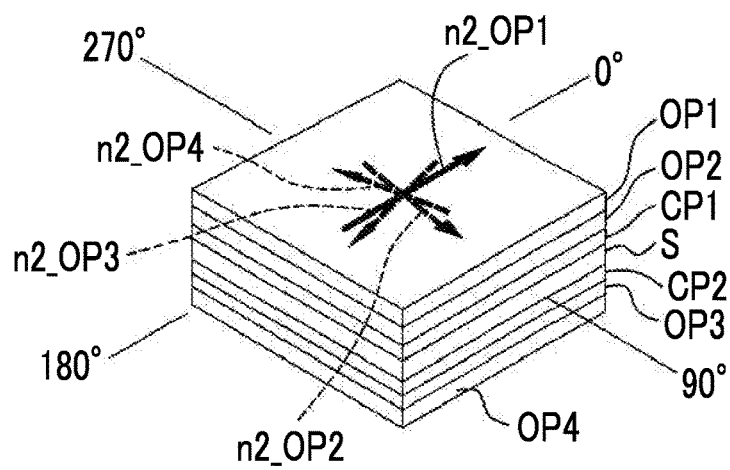
FIG. 37 is a perspective view showing a layer configuration of a phase difference compensation element of Test Example 6.

In Test Example 6, as shown in FIG. 37, a phase difference compensation element in which the first C-plate layer CP1 and the first and second O-plate layers OP1 and OP2 as the oblique vapor deposition layers were provided on one surface of the substrate S, and the second C-plate layer CP2 and the third and fourth O-plate layers OP3 and OP4 as the oblique vapor deposition layers were provided on the other surface of the substrate S was produced. The phase difference film of this example was composed of the first to fourth O-plate layers OP1, OP2, OP3, and OP4 and the first and second C-plate layers CP-1 and CP-2. A double-side type C-plate was composed of the first C-plate layer CP1 and the second C-plate layer CP2. The production methods of the first to fourth O-plate layers OP1, OP2, OP3, and OP4 and the first and second C-plate layers CP1 and CP2 were the same as in Test Example 1.

The first C-plate layer CP1 and the second C-plate layer CP2 were formed on both surfaces of the substrate S, respectively, and the second O-plate layer OP2 and the first O-plate layer OP1 which are the oblique vapor deposition layers was formed on the first C-plate layer CP1 by an oblique vapor deposition and the third O-plate layer OP3 and the fourth O-plate layer OP4, which are the oblique vapor deposition layers, were laminated and formed on the second C-plate layer CP2 by an oblique vapor deposition. For each sample, the direction of the directional vector n2_OP1 of the principal refractive index n21 of the first O-plate layer OP1 and the direction of the directional vector n2_OP2 of the principal refractive index n22 of the second O-plate layer OP2 intersected each other, and a vapor deposition direction of the second O-plate layer OP2 was set so that an open angle ε1 thereof was 93°. In addition, the direction of the directional vector n2_OP2 of the principal refractive index n22 of the second O-plate layer OP2 and the direction of a directional vector n2_OP3 of a principal refractive index n23 of the third O-plate layer OP3 intersected each other, and a vapor deposition direction of the third O-plate layer OP3 was set so that an open angle ε2 thereof was 88°. Furthermore, the direction of the directional vector n2_OP3 of the principal refractive index n23 of the third O-plate layer OP3 and the direction of a directional vector n2_OP4 of a principal refractive index n24 of the fourth O-plate layer OP4 intersected each other, and a vapor deposition direction of the fourth O-plate layer OP4 was set so that an open angle 3 thereof was 86°.

In addition, a film thickness of the first O-plate layer OP1 for each sample was set so that a phase difference value Re(0) of the first O-plate layer OP1 at a polar angle of 0° in the slow-axis orientation was a value shown in Table 13. In addition, film thicknesses were set so that a phase difference value Re(0) of the second O-plate layer OP2 at a polar angle of 0° in the slow-axis orientation was 15 nm, a phase difference value Re(0) of the third O-plate layer OP3 at a polar angle of 0° in the slow-axis orientation was 15 nm, and a phase difference value Re(0) of the fourth O-plate layer OP4 at a polar angle of 0° in the slow-axis orientation was 15 nm.

Figure 38:
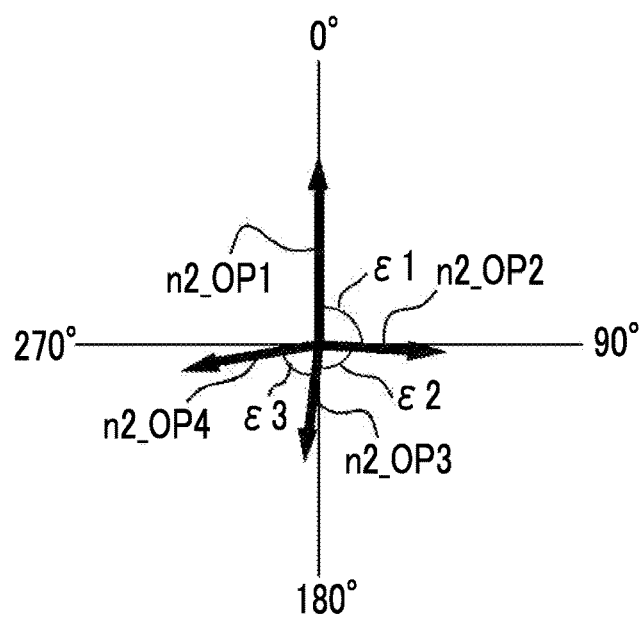
FIG. 38 is an explanatory diagram of a combined vector of a slow axis in a phase difference compensation element having a four-layer configuration.

As shown in FIG. 37, in a case where an orientation of the principal refractive index n21 of the first O-plate layer OP1 was set to 0°, 90°, 180°, and 270° was set clockwise. As shown in FIG. 38, the directional vector n2_OP1 of the principal refractive index n21 of the first O-plate layer OP1 and the directional vector n2_OP2 of the principal refractive index n22 of the second O-plate layer OP2 were arranged at the open angle ε1, and the directional vector n2_OP2 of the principal refractive index n22 of the second O-plate layer OP2 and the directional vector n2_OP3 of the principal refractive index n23 of the third O-plate layer OP3 were arranged at the open angle ε2. Further, the directional vector n2_OP3 of the principal refractive index n23 of the third O-plate layer OP3 and the directional vector n2_OP4 of the principal refractive index n24 of the fourth O-plate layer OP4 were arranged at the open angle 3. In this case, an axis parallel to a combined vector (not shown) obtained by combining the directional vectors n2_OP1, n2_OP2, n2_OP3, and n2_OP4 for the principal refractive indices n21, n22, n23, and n24 of each of the four O-plate layers OP1, OP2, OP3, and OP4 corresponded to a slow axis of the phase difference film. As shown in Table 13, in this example, the slow-axis orientation of the phase difference film was changed by changing the phase difference value Re(0) of the first O-plate layer OP1. A fast axis of the liquid crystal cell was set to an orientation of 45°, and Table 13 shows a deviation of the slow-axis orientation of the phase difference film for each sample from the 45° orientation, that is, a deviation between the slow-axis orientation of the phase difference film and the fast-axis orientation of the liquid crystal cell.

Table 13 shows results of performing the above-described contrast measurement using the phase difference compensation element for each sample of Test Example 6 as the above-described phase difference compensation element 20.

TABLE 13

| Test Example 6 Sample No. | Re(0) of OP1 [nm] | Re(0) of OP2 [nm] | Open angle ε1 [deg.] | Re(0) of OP3 [nm] | Open angle ε2 [deg.] | Re(0) of OP4 [nm] | Open angle ε3 [deg.] | Slow-axis orientation of phase difference film [deg.] | Deviation between slow-axis orientation of phase difference film and fast-axis orientation of liquid crystal layer [deg.] | Gain | Evaluation |
|---|---|---|---|---|---|---|---|---|---|---|---|
| 6-1 | 21 | 15 | 93 | 15 | 88 | 15 | 86 | 75 | 30 | 1.1 | D |
| 6-2 | 20 | 15 | 93 | 15 | 88 | 15 | 86 | 73 | 28 | 1.2 | D |
| 6-3 | 19 | 15 | 93 | 15 | 88 | 15 | 86 | 70 | 26 | 1.4 | D |
| 6-4 | 18 | 15 | 93 | 15 | 88 | 15 | 86 | 70 | 25 | 1.5 | C |

TABLE 13-continued

| Test Example 6 Sample No. | Re(0) of OP1 [nm] | Re(0) of OP2 [nm] | Open angle ε1 [deg] | Re(0) of OP3 [nm] | Open angle ε2 [deg.] | Re(0) of OP4 [nm] | Open angle ε3 [deg.] | Slow-axis orientation of phase difference film [deg.] | Deviation between slow-axis orientation of phase difference film and fast-axis orientation of liquid crystal layer [deg.] | Gain | Evaluation |
|---|---|---|---|---|---|---|---|---|---|---|---|
| 6-5 | 17 | 15 | 93 | 15 | 88 | 15 | 86 | 69 | 24 | 1.9 | C |
| 6-6 | 16 | 15 | 93 | 15 | 88 | 15 | 86 | 67 | 22 | 1.8 | C |
| 6-7 | 15 | 15 | 93 | 15 | 88 | 15 | 86 | 46 | 1 | 2.9 | B |
| 6-8 | 14 | 15 | 93 | 15 | 88 | 15 | 86 | 33 | −12 | 2.3 | B |
| 6-9 | 13 | 15 | 93 | 15 | 88 | 15 | 86 | 27 | −18 | 1.7 | C |
| 6-10 | 12 | 15 | 93 | 15 | 88 | 15 | 86 | 20 | −25 | 1.5 | C |
| 6-11 | 11 | 15 | 93 | 15 | 88 | 15 | 86 | 18 | −27 | 1.0 | D |

In the samples 6-4 to 6-10, the difference between the slow axis of the phase difference film and the fast-axis orientation of the panel was 25° or less, which corresponded to Examples of the technology of the present disclosure. In the samples 6-1 to 6-3, and 6-11, the difference between the slow axis of the phase difference film and the fast-axis orientation of the panel was more than 25°, which corresponded to Comparative Examples.

As shown in Table 13, in the samples 6-4 to 6-10 of Examples, an evaluation of a gain of 1.5 or more was obtained, and it was shown that the contrast was improved. On the other hand, in the samples 6-1 to 6-3, and 6-11 of Comparative Examples, a sufficient gain could not be obtained.

Test Example 7

Figure 39:
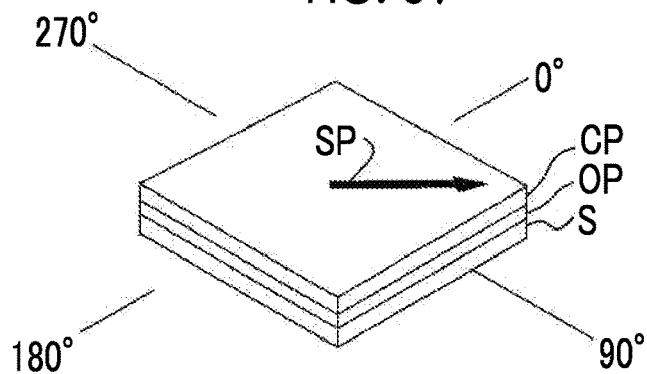
FIG. 39 is a perspective view showing a layer configuration of a phase difference compensation element of Test Example 7.

In Test Example 7, as shown in FIG. 39, a phase difference compensation element including an O-plate layer OP which is the oblique vapor deposition layer and a single-side type C-plate CP on one surface of the substrate S was produced. In this example, the phase difference film is composed of the O-plate layer OP and the C-plate layer CP. In this example, the O-plate layer OP was produced by, using the method of Type I of the second production method of the oblique vapor deposition layer described above, a vapor deposition by swinging the substrate at a substrate installation angle ω=70° with respect to the vapor deposition source. As a material of the O-plate layer OP, tantalum oxide was used. On the other hand, the C-plate CP was vapor-deposited at a substrate installation angle ω=0°. As shown in Table 2, the oblique vapor deposition layer formed by swinging the substrate at the substrate installation angle ω=70° had optical anisotropy represented by a refractive index ellipsoid showing principal refractive indices of n2>n3>n1. FIG. 39 shows the case where the slow axis SP is oriented at 45° which coincides with the fast-axis orientation of 45S of the liquid crystal layer of the liquid crystal panel, but the orientation of the slow axis SP in each sample was set as shown in Table 14.

The O-plate layer OP composed of the oblique vapor deposition layer was formed on one surface of the substrate S, and the C-plate was produced on the O-plate layer OP. For each sample, the film formation of the O-plate layer OP was carried out by swinging the O-plate layer OP on the +q side and the −q side in a range shown in Table 14 with the center of the substrate as an axis. In addition, the swing angle to the +q side and the −q side during the film formation of the O-plate layer OP was adjusted so that a Re(15) value in the slow-axis orientation of the phase difference film composed of the O-plate layer OP and the C-plate CP was 25 nm.

Table 14 shows results of performing the above-described contrast measurement using the phase difference compensation element for each sample of Test Example 7.

TABLE 14

| Test Example 7 Sample No. | +q range [deg.] | | −q range [deg.] | | Slow-axis orientation of phase difference film [deg.] | Deviation between slow-axis orientation of phase difference film and fast-axis orientation of liquid crystal layer [deg.] | Gain | Evaluation |
|---|---|---|---|---|---|---|---|---|
| 7-1 | 0 | 90 | 0 | 87 | 46 | 1 | 3.1 | A |
| 7-2 | 0 | 90 | 0 | 80 | 50 | 5 | 2.9 | B |
| 7-3 | 0 | 90 | 0 | 75 | 53 | 8 | 2.7 | B |
| 7-4 | 0 | 90 | 0 | 70 | 55 | 10 | 2.6 | B |
| 7-5 | 0 | 90 | 0 | 65 | 58 | 13 | 2.5 | B |
| 7-6 | 0 | 90 | 0 | 60 | 60 | 15 | 2.3 | B |
| 7-7 | 0 | 90 | 0 | 55 | 63 | 18 | 2.2 | B |
| 7-8 | 0 | 90 | 0 | 50 | 65 | 20 | 2 | B |
| 7-9 | 0 | 90 | 0 | 45 | 68 | 23 | 1.7 | C |
| 7-10 | 0 | 90 | 0 | 40 | 70 | 25 | 1.5 | C |
| 7-11 | 0 | 90 | 0 | 35 | 73 | 28 | 1.2 | D |
| 7-12 | 0 | 90 | 0 | 30 | 75 | 30 | 1.1 | D |
| 7-13 | 0 | 87 | 0 | 90 | 44 | −1 | 3.1 | A |
| 7-14 | 0 | 80 | 0 | 90 | 40 | −5 | 2.9 | B |
| 7-15 | 0 | 75 | 0 | 90 | 37 | −8 | 2.7 | B |
| 7-16 | 0 | 70 | 0 | 90 | 35 | −10 | 2.6 | B |
| 7-17 | 0 | 65 | 0 | 90 | 32 | −13 | 2.5 | B |
| 7-18 | 0 | 60 | 0 | 90 | 30 | −15 | 2.3 | B |
| 7-19 | 0 | 55 | 0 | 90 | 27 | −18 | 2.2 | B |
| 7-20 | 0 | 50 | 0 | 90 | 25 | −20 | 2 | B |
| 7-21 | 0 | 45 | 0 | 90 | 22 | −23 | 1.7 | C |

TABLE 14-continued

| Test Example 7 Sample No. | +q range [deg.] | | −q range [deg.] | | Slow-axis orientation of phase difference film [deg.] | Deviation between slow-axis orientation of phase difference film and fast-axis orientation of liquid crystal layer [deg.] | Gain | Evaluation |
|---|---|---|---|---|---|---|---|---|
| 7-22 | 0 | 40 | 0 | 90 | 20 | −25 | 1.5 | C |
| 7-23 | 0 | 35 | 0 | 90 | 17 | −28 | 1.2 | D |
| 7-24 | 0 | 30 | 0 | 90 | 15 | −30 | 1.1 | D |

In the samples 7-1 to 7-10 and 7-13 to 7-22, the difference between the slow axis of the phase difference film and the fast-axis orientation of the liquid crystal cell was 25° or less, which corresponded to Examples of the technology of the present disclosure. In the samples 7-11, 7-12, 7-23, and 7-24, the difference between the slow axis of the phase difference film and the fast-axis orientation of the liquid crystal layer was more than 25°, which corresponded to Comparative Examples.

As shown in Table 14, in the samples 7-1 to 7-10 and 7-13 to 7-22 of Examples, an evaluation of a gain of 1.5 or more was obtained, and it was shown that the contrast was improved. On the other hand, in the samples 7-11, 7-12, 7-23, and 7-24 of Comparative Examples, a sufficient gain could not be obtained.

Test Example 8

As shown in FIG. 32, a phase difference compensation element in which the first C-plate layer CP1 and the first O-plate layer OP1 as the oblique vapor deposition layer were provided on one surface of the substrate S, and the second C-plate layer CP2 and the second O-plate layer OP2 as the oblique vapor deposition layer were provided on the other surface of the substrate S was produced. The phase difference film of this example was composed of the first O-plate layer OP1, the second O-plate layer OP2, the first C-plate layer CP1, and the second C-plate layer CP2. A double-side type C-plate was composed of the first C-plate layer CP1 and the second C-plate layer CP2.

Samples 8-1 and 8-2 were formed into a film with each layer satisfying the conditions shown in Table 15.

TABLE 15

| Test Example 8 Sample No. | Relationship between principal refractive indices | Re(0) of OP1 [nm] | Re(0) of OP2 [nm] | Open angle ε [deg.] | Substrate installation angle ω [deg.] | Substrate revolution | Re(30) of C-plate [nm] |
|---|---|---|---|---|---|---|---|
| 8-1 | n2 > n3 > n1 | 32 | 32 | 87 | 70 | Y | 26 |
| 8-2 | n1 > n2 > n3 | 32 | 32 | 87 | 80 | N | 28 |

In the sample 8-1, the first O-plate layer OP1 and the second O-plate layer OP2 were produced by, using the first production method of the oblique vapor deposition layer described above, an oblique vapor deposition in a state of a substrate installation angle ω=70° and the substrate revolving with respect to the vapor deposition source. As a material for the first and second O-plate layers OP1 and OP2, tantalum oxide was used. On the other hand, the first and second C-plate layers CP1 and CP2 were vapor-deposited at a substrate installation angle ω=0°. As shown in Table 15, the oblique vapor deposition layer formed by revolving the substrate at the substrate installation angle of 70° had optical anisotropy represented by a refractive index ellipsoid showing principal refractive indices of n2>n3>n1. Therefore, the sample 8-1 corresponded to Example of the technology of the present disclosure.

In the sample 8-1, the first O-plate layer OP1 and the second O-plate layer OP2 were produced by an oblique vapor deposition at a substrate installation angle ω=80° without revolving the substrate with respect to the vapor deposition source. The film formation of the first and second C-plate layers CP1 and CP2 was the same as that of the sample 8-1. The oblique vapor deposition layer formed without revolving the substrate at the substrate installation angle of 80° had optical anisotropy represented by a refractive index ellipsoid showing principal refractive indices of n1>n2>n3. Therefore, the sample 8-2 corresponded to Comparative Example of the technology of the present disclosure.

In this example, the phase difference film was designed so that the slow-axis orientation was 135°.

Figure 40:
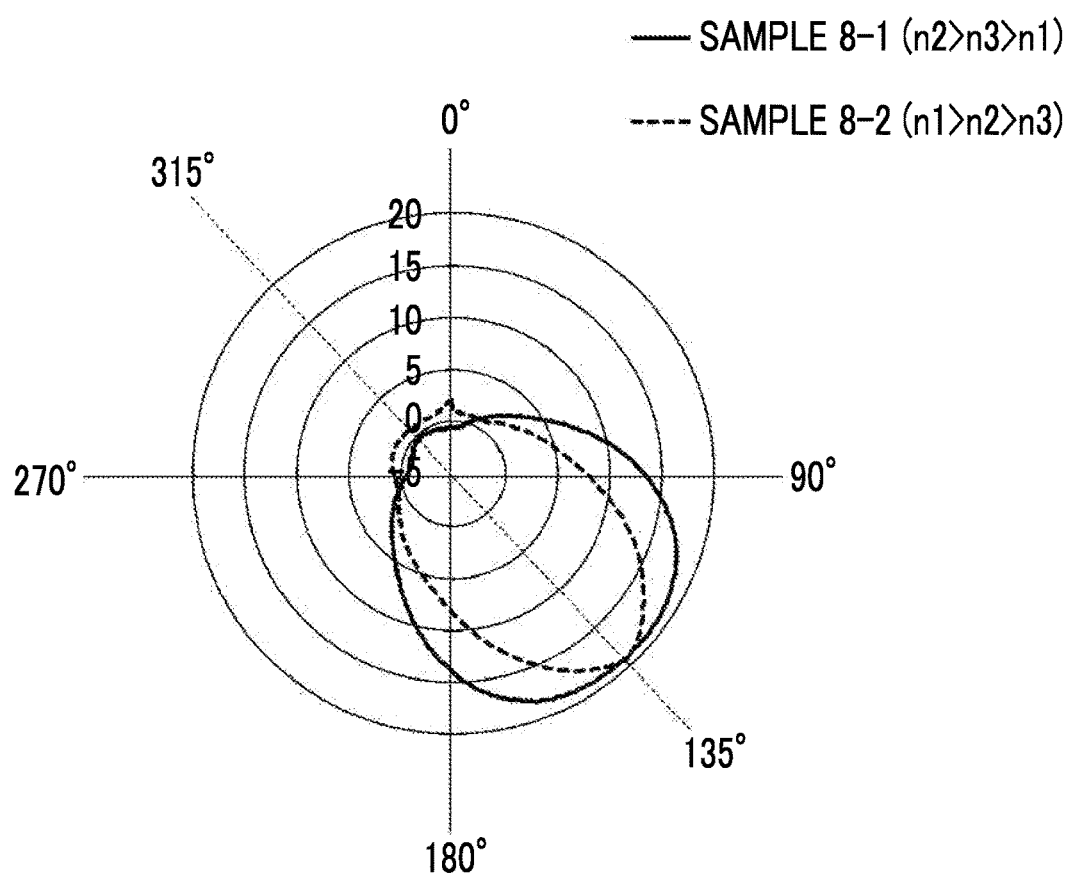
FIG. 40 is a diagram showing phase difference patterns of samples 8-1 and 8-2 of Test Example 8.

FIG. 40 shows phase difference patterns of the sample 8-1 and the sample 8-2, respectively. In a case where light having a wavelength of 550 nm was incident at an incidence angle of 15° inclined by θ=15° from the normal direction, the phase difference compensation element was rotated by 360° with respect to the phase difference film around the light incidence position (see FIG. 25). As a result, phase difference characteristic (phase difference pattern) of Re(15) 0° to 360° was measured. FIG. 40 is a diagram showing the phase difference pattern obtained by this measurement. The solid line is the characteristic of the sample 8-1 of Example, and the broken line is the characteristic of the sample 8-2 of Comparative Example.

As shown in FIG. 40, in each of the samples 8-1 and 8-2, the slow-axis orientation showing the maximum phase difference value was 135°, and the phase difference pattern had a line-symmetrical shape with the slow axis as a symmetrical axis. The phase difference pattern of the sample 8-1 had an elliptical shape which is thicker than that of the phase difference pattern of the sample 8-2.

The slow-axis orientation of the phase difference film in the actually produced phase difference compensation element has a deviation from the designed orientation, such as a film thickness deviation from a design value of each oblique vapor deposition layer, which occurs during the production, a film thickness difference of each oblique vapor deposition layer, and a deviation from a design value of the open angle between the slow axes of each oblique vapor deposition layer.

In a case where the slow-axis orientation of the phase difference film coincides with the fast-axis orientation of the liquid crystal cell, the contrast gain is high due to best phase difference compensation. As described above, in a case where the slow-axis orientation of the phase difference film has a deviation from the designed orientation, since the fast-axis orientation of the liquid crystal cell is not parallel to the slow-axis orientation of the phase difference film, the gain is lowered. Since the phase difference pattern of the sample 8-2 is finer than the phase difference pattern of the sample 8-1, the decrease in contrast gain due to the deviation is remarkable. In other words, since the phase difference pattern of the sample 8-1 is thicker than the phase difference pattern of the sample 8-2, it is possible to suppress the decrease in contrast gain due to the deviation.

Test Example 9

Same as the sample 8-1, a plurality of samples of the phase difference compensation element including the phase difference film of Example, in which the first O-plate layer and the second O-plate layer satisfied n2>n3>n1, the sample having different slow-axis orientation of the phase difference film, were produced. In addition, same as the sample 8-2, a plurality of samples of the phase difference compensation element including the phase difference film of Comparative Example, in which the first O-plate layer and the second O-plate layer satisfied n1>n2>n3, the sample having different slow-axis orientation of the phase difference film, were produced. In this case, the slow-axis orientation of the phase difference film was adjusted by changing an open angle of the slow axis of the first O-plate layer OP1 and the slow axis of the second O-plate layer OP2. For the phase difference compensation element of each sample, a liquid crystal panel was assembled in combination with a liquid crystal cell having a fast axis at 135°, and the contrast measurement was performed. A difference between the slow-axis orientation of the phase difference film and the fast-axis orientation of the liquid crystal cell is defined as an "amount of axial deviation", and FIG. 41 shows results of examining a relationship between the amount of axial deviation and the contrast gain of the liquid crystal.

Figure 41:
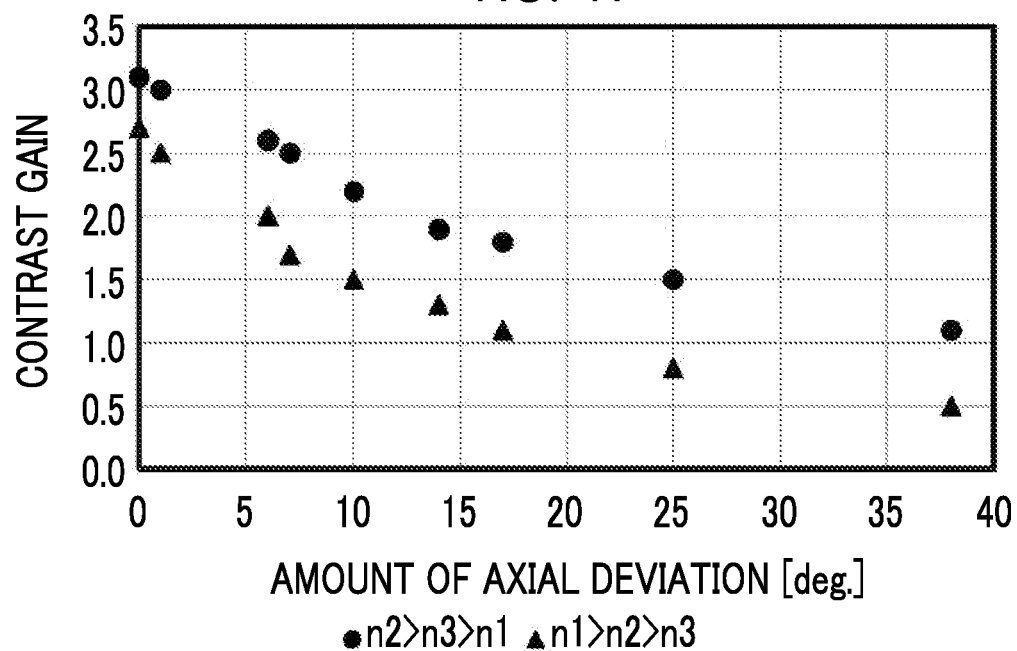
FIG. 41 is a diagram showing a change in contrast gain with respect to an amount of axial deviation between each slow axis and fast axis of a liquid crystal layer for Examples and Comparative Examples.

As can be seen from FIG. 41, the contrast gain in a case where the amount of axial deviation=0 is higher in Examples than in Comparative Examples. In addition, the influence of the amount of axial deviation on the contrast gain is smaller in Examples. In Examples, the gain value was 1.5, which is practically acceptable even in a case where the amount of axial deviation was 25°, but in Comparative Examples, the gain was less than 1.5 in a case where the amount of axial deviation exceeded 10°, and sufficient phase difference compensation could not be achieved.

As described above, it was found that, as compared with Comparative Examples, Examples of the phase difference compensation element according to the embodiment of the present disclosure had the effect of improving the contrast and a small decrease in contrast due to the axial deviation. The small decrease in contrast due to the axial deviation means a large performance tolerance with respect to a manufacturing variation. In a case where the performance tolerance is large, it is possible to suppress a wasting of the phase difference compensation element due to the manufacturing variation, so that a manufacturing cost can be suppressed.

What is claimed is:

1. A phase difference compensation element that is used in combination with a liquid crystal cell provided with a liquid crystal layer in which an optical axis of liquid crystal molecules is inclined and that compensates for a phase difference of light generated in the liquid crystal layer, the phase difference compensation element comprising:
a substrate; and
a phase difference film having at least one oblique vapor deposition layer on at least one substrate surface of the substrate,
wherein the oblique vapor deposition layer exhibits refractivity anisotropy represented by a biaxial refractive index ellipsoid as an optical characteristic by having a columnar structure body inclined with respect to a normal line of the substrate surface,
in three principal refractive indices in the refractive index ellipsoid, in a case where a principal refractive index of the columnar structure body in a longitudinal direction is defined as n1, and in an ellipse perpendicular to the longitudinal direction of the columnar structure body, in a case where a principal refractive index in a major-axis direction is defined as n2 and a principal refractive index in a minor-axis direction is defined as n3, n2 is a largest among the three principal refractive indices,
the major-axis direction is a direction in a plane of the oblique vapor deposition layer, which is perpendicular to an axis obtained by projecting the longitudinal direction of the columnar structure body onto a surface of the oblique vapor deposition layer,
in a case where the oblique vapor deposition layer is one layer, a slow axis of the phase difference film is parallel to the major-axis direction,
in a case where the oblique vapor deposition layer is a plurality of layers, the slow axis of the phase difference film has a magnitude of n2 which is a maximum principal refractive index in each oblique vapor deposition layer,
in a case where a vector along the major-axis direction is a directional vector, the slow axis of the phase difference film is parallel to a combined vector obtained by combining the directional vectors of the oblique vapor deposition layers, and
the phase difference compensation element is disposed in an aspect in which an intersecting angle between a slow-axis direction of the phase difference film and a fast-axis direction of the liquid crystal layer, which is a direction perpendicular to a direction in which the inclined optical axis of the liquid crystal molecules is projected onto the substrate surface, is −25° to +25°.

2. The phase difference compensation element according to claim 1,
wherein a relationship between magnitudes of the three principal refractive indices of the refractive index ellipsoid is n2>n3>n1.

3. The phase difference compensation element according to claim 1,
wherein the phase difference film includes a plurality of the oblique vapor deposition layers, and
in a case where an orientation of the slow axis is defined as ηs, a phase difference value Re(15)ηs in the orientation ηs with respect to light having a wavelength of 550 nm, which is incident on the surface of the oblique vapor deposition layer at a polar angle of 15°, is defined as α, a phase difference value Re(15)(ηs+180) in an orientation ηs+180° with respect to the light incident on the surface of the oblique vapor deposition layer at the polar angle of 15° is defined as β, and A=α−β, each of a phase difference value Re(15)(ηs+60) in an orientation is +60° with respect to the light incident on the surface of the oblique vapor deposition layer at the polar angle of 15° and a phase difference value Re(15)(ηs−60) in an orientation ηs−60° with respect to the light incident on the surface of the oblique vapor deposition layer at the polar angle of 15° is within a range of (A/2−β)±5 nm.

4. The phase difference compensation element according to claim 2,
wherein the phase difference film includes a plurality of the oblique vapor deposition layers, and
in a case where an orientation of the slow axis is defined as ηs, a phase difference value Re(15)ηs in the orientation ηs with respect to light having a wavelength of 550 nm, which is incident on the surface of the oblique vapor deposition layer at a polar angle of 15°, is defined as α, a phase difference value Re(15)(ηs+180) in an orientation ηs+180° with respect to the light incident on the surface of the oblique vapor deposition layer at the polar angle of 15° is defined as β, and A=α−β, each of a phase difference value Re(15)(ηs+60) in an orientation is +60° with respect to the light incident on the surface of the oblique vapor deposition layer at the polar angle of 15° and a phase difference value Re(15)(ηs−60) in an orientation ηs−60° with respect to the light incident on the surface of the oblique vapor deposition layer at the polar angle of 15° is within a range of (A/2−β)±5 nm.

5. The phase difference compensation element according to claim 1, further comprising:
a C-plate which is a structural birefringence body composed of multilayer thin films in which a thin film consisting of a high refractive index material and a thin film consisting of a low refractive index material are alternately laminated.

6. The phase difference compensation element according to claim 2, further comprising:
a C-plate which is a structural birefringence body composed of multilayer thin films in which a thin film consisting of a high refractive index material and a thin film consisting of a low refractive index material are alternately laminated.

7. The phase difference compensation element according to claim 3, further comprising:
a C-plate which is a structural birefringence body composed of multilayer thin films in which a thin film consisting of a high refractive index material and a thin film consisting of a low refractive index material are alternately laminated.

8. A liquid crystal display element comprising:
a liquid crystal cell provided with a liquid crystal layer in which an optical axis of liquid crystal molecules is inclined; and
a phase difference compensation element for compensating for a phase difference generated in the liquid crystal layer,
wherein the phase difference compensation element includes a substrate and a phase difference film having at least one oblique vapor deposition layer on at least one substrate surface of the substrate,
the oblique vapor deposition layer exhibits refractivity anisotropy represented by a biaxial refractive index ellipsoid as an optical characteristic by having a columnar structure body inclined with respect to a normal line of the substrate surface,
in three principal refractive indices in the refractive index ellipsoid, in a case where a principal refractive index of the columnar structure body in a longitudinal direction is defined as n1, and in an ellipse perpendicular to the longitudinal direction of the columnar structure body, in a case where a principal refractive index in a major-axis direction is defined as n2 and a principal refractive index in a minor-axis direction is defined as n3, n2 is a largest among the three principal refractive indices,
the major-axis direction is a direction in a plane of the oblique vapor deposition layer, which is perpendicular to an axis obtained by projecting the longitudinal direction of the columnar structure body onto a surface of the oblique vapor deposition layer,
in a case where the oblique vapor deposition layer is one layer, a slow axis of the phase difference film is parallel to the major-axis direction,
in a case where the oblique vapor deposition layer is a plurality of layers, the slow axis of the phase difference film has a magnitude of n2 which is a maximum principal refractive index in each oblique vapor deposition layer,
in a case where a vector along the major-axis direction is a directional vector, the slow axis of the phase difference film is parallel to a combined vector obtained by combining the directional vectors of the oblique vapor deposition layers, and
the liquid crystal display element is disposed in an aspect in which an intersecting angle between a slow-axis direction of the phase difference film and a fast-axis direction of the liquid crystal layer, which is a direction perpendicular to a direction in which the inclined optical axis of the liquid crystal molecules is projected onto the substrate surface, is −25° to +25°.

9. A liquid crystal projector comprising:
the liquid crystal display element according to claim 8; and
a projection optical system for enlarging and projecting an image displayed by the liquid crystal display element.

* * * * *